(12) United States Patent
Chien

(10) Patent No.: US 10,509,304 B2
(45) Date of Patent: Dec. 17, 2019

(54) LED PROJECTION LIGHT HAS FEATURES

(71) Applicant: Tseng-Lu Chien, Walnut, CA (US)

(72) Inventor: Tseng-Lu Chien, Walnut, CA (US)

( * ) Notice: Subject to any disclaimer, the term of this patent is extended or adjusted under 35 U.S.C. 154(b) by 0 days.

(21) Appl. No.: 14/944,953

(22) Filed: Nov. 18, 2015

(65) Prior Publication Data
US 2016/0313636 A1 Oct. 27, 2016

Related U.S. Application Data

(60) Continuation-in-part of application No. 14/539,267, filed on Nov. 12, 2014, which is a division of (Continued)

(51) Int. Cl.
*G03B 21/14* (2006.01)
*G03B 21/20* (2006.01)
(Continued)

(52) U.S. Cl.
CPC ............ *G03B 21/2053* (2013.01); *F21S 4/28* (2016.01); *F21S 8/035* (2013.01); *F21S 8/038* (2013.01); *F21S 9/022* (2013.01); *F21S 10/002* (2013.01); *F21V 14/02* (2013.01); *F21V 21/08* (2013.01); *F21V 21/14* (2013.01); *F21V 23/04* (2013.01); *F21V 29/00* (2013.01); *G01S 3/7864* (2013.01); *G03B 21/142* (2013.01);
(Continued)

(58) Field of Classification Search
CPC .............. G03B 21/2053; G03B 21/206; G03B 21/142; G03B 21/2033; G03B 21/14; G03B 21/145; G03B 23/08; G03B 23/10; G03B 23/105; F21V 8/035; F21V 23/04; F21V 23/02
See application file for complete search history.

(56) References Cited

U.S. PATENT DOCUMENTS 7,104,656 B2 * 9/2006 Dwyer ................. H04N 9/3141
348/E5.143
8,303,150 B2 * 11/2012 Chien .................. H04N 5/2354
362/249.02
(Continued)

*Primary Examiner* — William C. Dowling
(74) *Attorney, Agent, or Firm* — Bacon & Thomas, PLLC

(57) ABSTRACT

An AC or DC powered LED or-and laser projection light may have more than one function, which may include conventional all-purpose light device has built-in or add projection functions using existing light device's its-own light housing with project-kits or project-assembly has built-in light sources to project a light beam, image, or digital-data from display-unit. The said project light is a desk top light, floor light, garden light, emergency light, night light, motion sensor light, power fail light, seasonal light, Christmas light and/or ornament, licensee products, cartoon character related products, blue tooth light, moving and or multifunction light; with rechargeable or non-rechargeable energy storage kits having preferred circuit, switch, sensor, timer, IC electric parts, and accessories. The said LED and display-unit is within non-leakage light-beam assembly and project-lens is install on (1) opening of LED light highest housing-body or (2) above the inner non-leakage light-beam assembly which formed by desired combination of tube, tray, holder, housing-parts has wall to surround the LED and display-unit.

36 Claims, 36 Drawing Sheets

Related U.S. Application Data application No. 12/914,584, filed on Oct. 28, 2010, now Pat. No. 8,721,160, application No. 14/944,953, which is a continuation-in-part of application No. 12/886,832, filed on Sep. 21, 2010, said application No. 14/539,267 is a division of application No. 12/318,470, filed on Dec. 30, 2008, now abandoned, said application No. 12/886,832 is a division of application No. 12/292,153, filed on Nov. 12, 2008, now Pat. No. 7,871,192.

(51) Int. Cl.

| | | |
|---|---|---|
| *G03B 29/00* | (2006.01) | |
| *F21S 8/00* | (2006.01) | |
| *F21V 29/00* | (2015.01) | |
| *F21S 9/02* | (2006.01) | |
| *F21S 10/00* | (2006.01) | |
| *F21V 14/02* | (2006.01) | |
| *F21V 21/08* | (2006.01) | |
| *F21V 21/14* | (2006.01) | |
| *F21V 23/04* | (2006.01) | |
| *G01S 3/786* | (2006.01) | |
| *F21S 4/28* | (2016.01) | |
| *H04N 9/31* | (2006.01) | |
| *F21Y 115/30* | (2016.01) | |
| *F21Y 115/10* | (2016.01) | |
| *F21V 9/08* | (2018.01) | |
| *F21V 21/22* | (2006.01) | |
| *F21V 21/29* | (2006.01) | |
| *F21V 21/30* | (2006.01) | |
| *F21W 121/00* | (2006.01) | |
| *F21Y 101/00* | (2016.01) | |

(52) U.S. Cl.
CPC ......... *G03B 21/145* (2013.01); *G03B 21/206* (2013.01); *G03B 21/208* (2013.01); *G03B 21/2033* (2013.01); *G03B 21/2046* (2013.01); *G03B 29/00* (2013.01); *H04N 9/3141* (2013.01); *F21V 9/08* (2013.01); *F21V 21/22* (2013.01); *F21V 21/29* (2013.01); *F21V 21/30* (2013.01); *F21V 23/0471* (2013.01); *F21V 23/0492* (2013.01); *F21W 2121/00* (2013.01); *F21Y 2101/00* (2013.01); *F21Y 2115/10* (2016.08); *F21Y 2115/30* (2016.08); *Y10S 362/80* (2013.01)

(56) References Cited

U.S. PATENT DOCUMENTS

| | | | |
|---|---|---|---|
| 8,408,736 B2* | 4/2013 | Chien | H04N 5/2354 362/235 |
| 8,879,782 B2* | 11/2014 | Garlington | G03B 21/10 353/46 |
| 9,157,589 B2* | 10/2015 | Chien | F21S 8/035 |
| 9,267,660 B1* | 2/2016 | Wang | F21V 5/04 |
| 2011/0007496 A1* | 1/2011 | Chien | H04N 5/2354 362/157 |
| 2015/0070938 A1* | 3/2015 | Chien | F21S 9/02 362/644 |
| 2015/0276178 A1* | 10/2015 | Chien | F21S 8/035 362/95 |
| 2016/0097499 A1* | 4/2016 | Chien | F21S 9/02 362/644 |
| 2016/0097969 A1* | 4/2016 | Sum | A41G 1/005 353/15 |
| 2016/0209013 A1* | 7/2016 | Chien | F21V 29/00 |
| 2016/0313636 A1* | 10/2016 | Chien | G03B 29/00 |

* cited by examiner

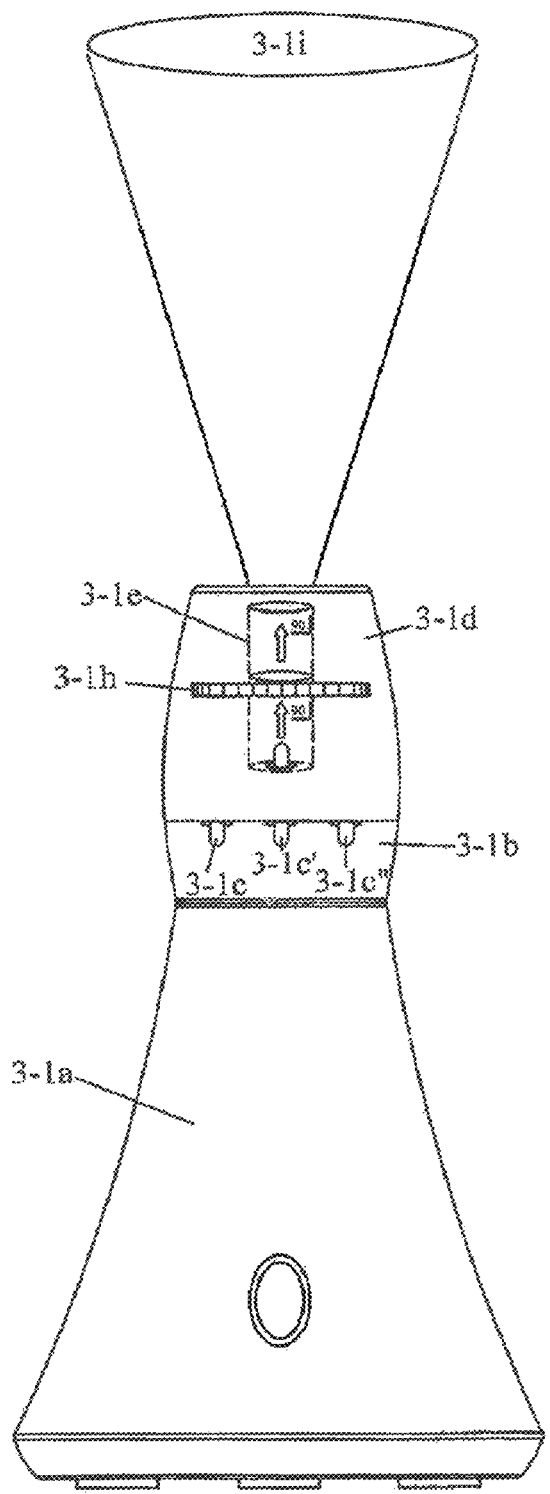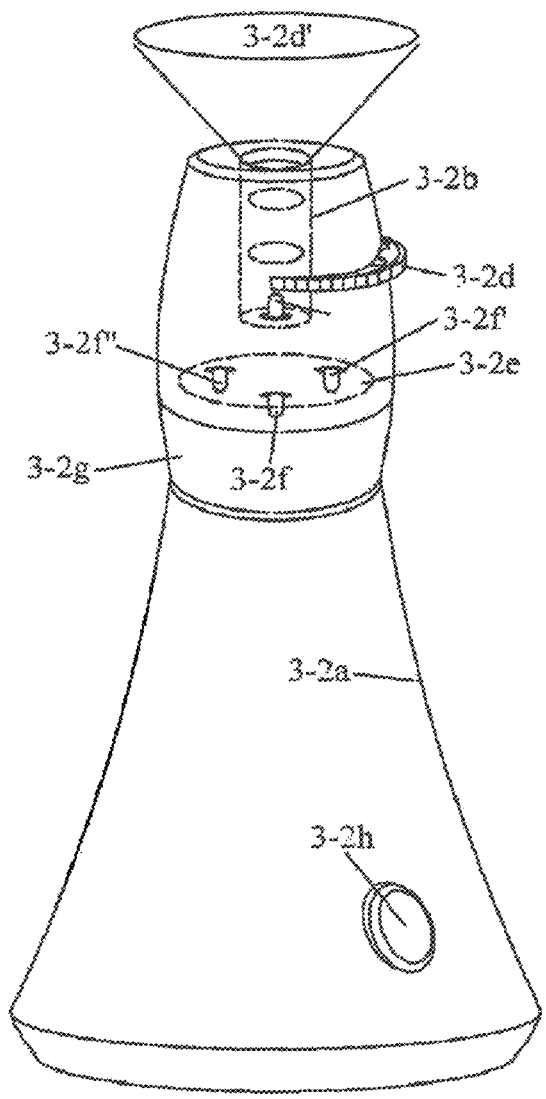
FIG. 3-1
FIG. 3-2

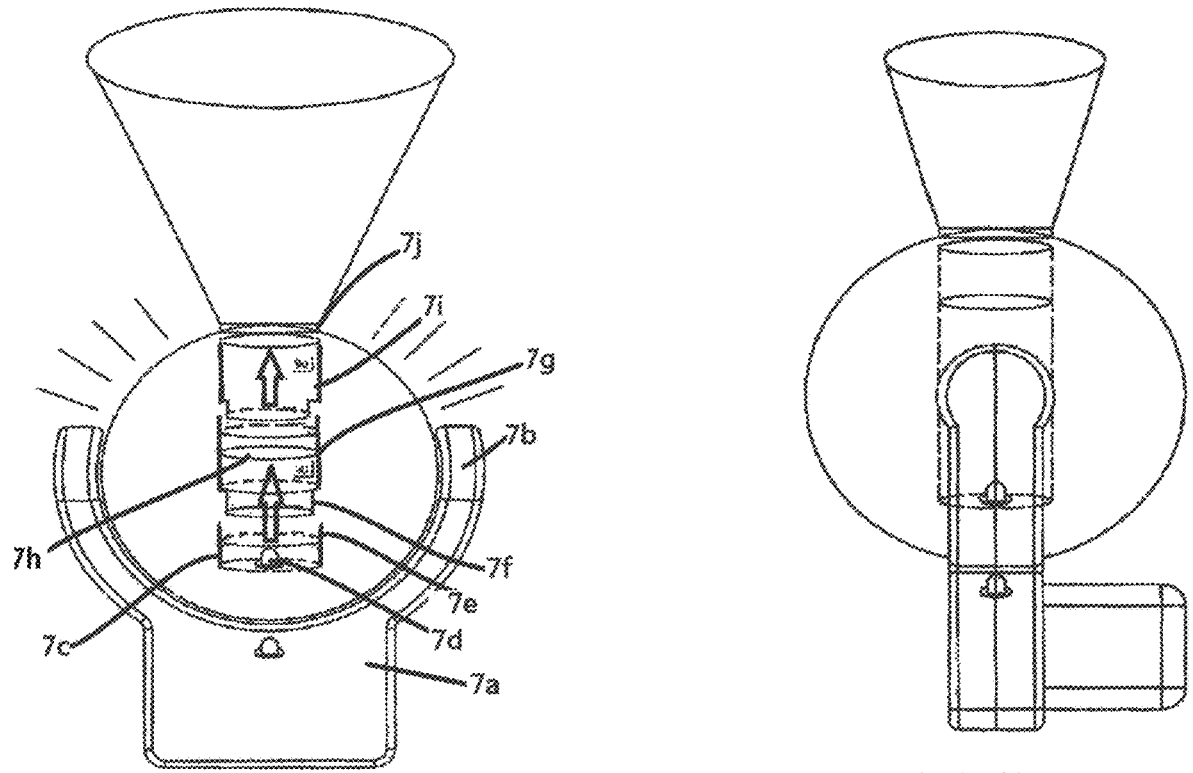
FIG. 7
FIG. 7-1
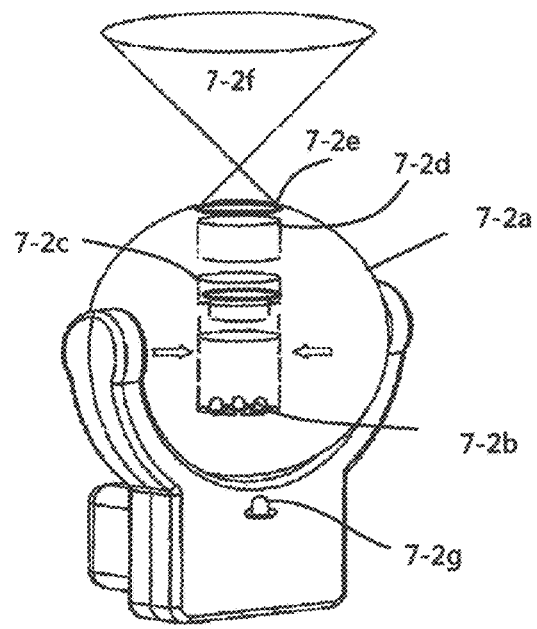
FIG. 7-2

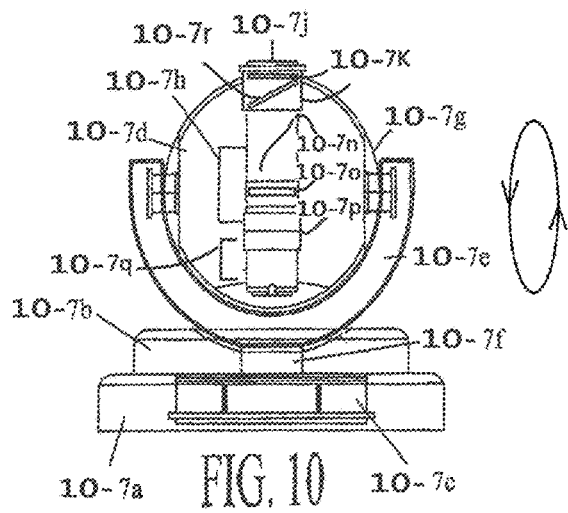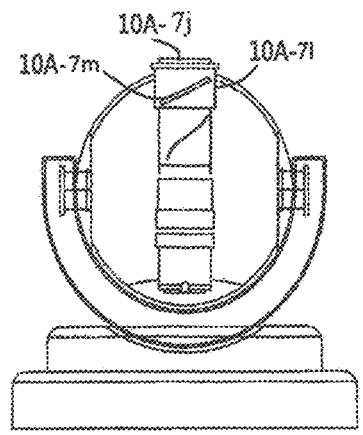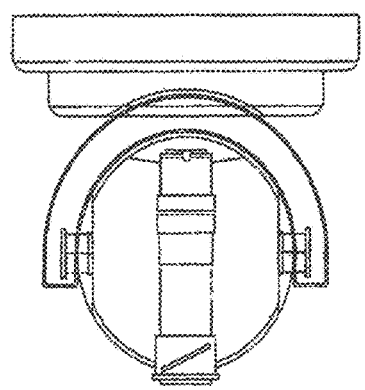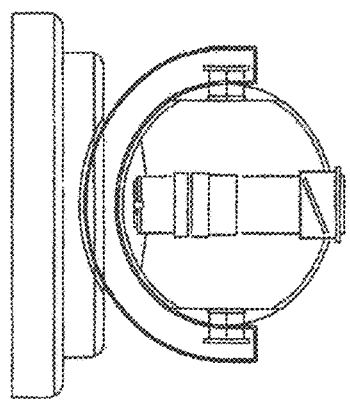
FIG. 10　　FIG. 10A　　FIG. 10B　　FIG. 10C DC Battery pack ⟵ Interchange ⟶ AC power sealed-unit DC Battery pack ⟵ Interchange ⟶ AC power sealed-unit

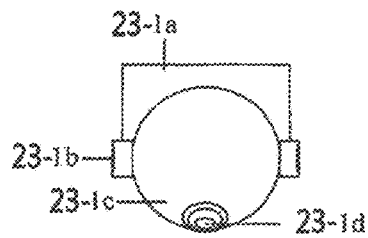
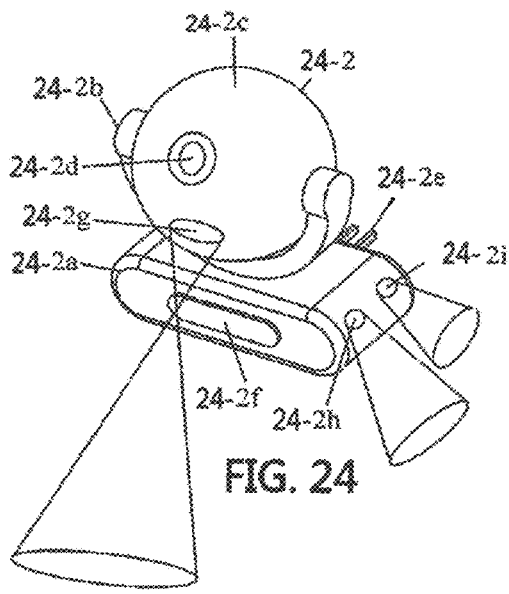
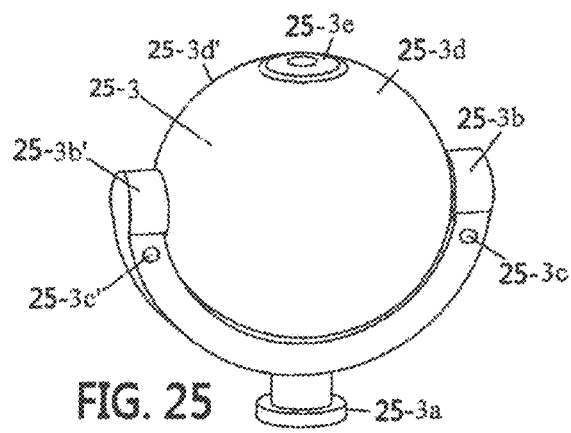
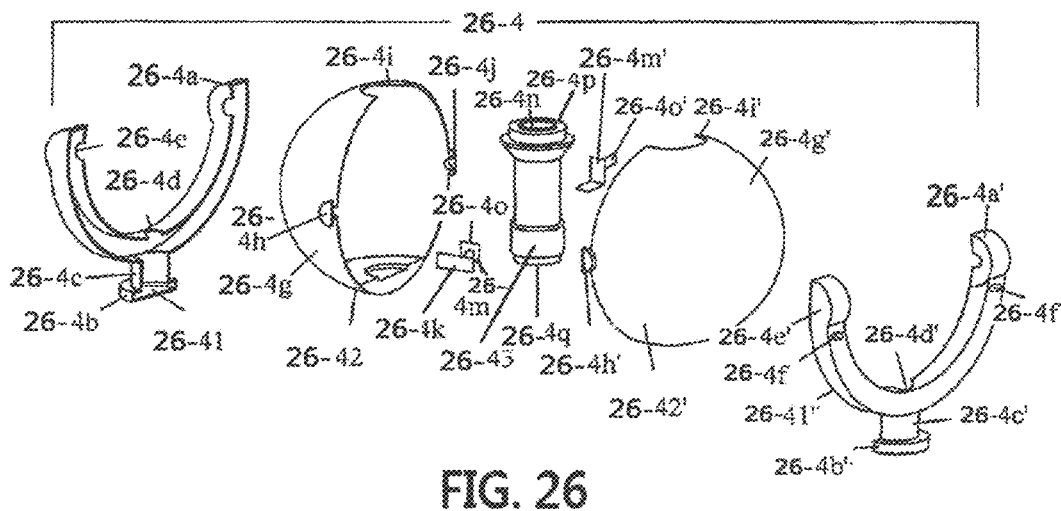

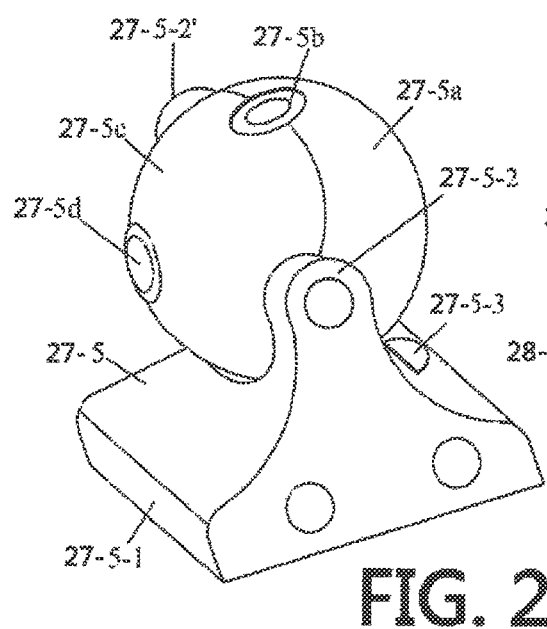
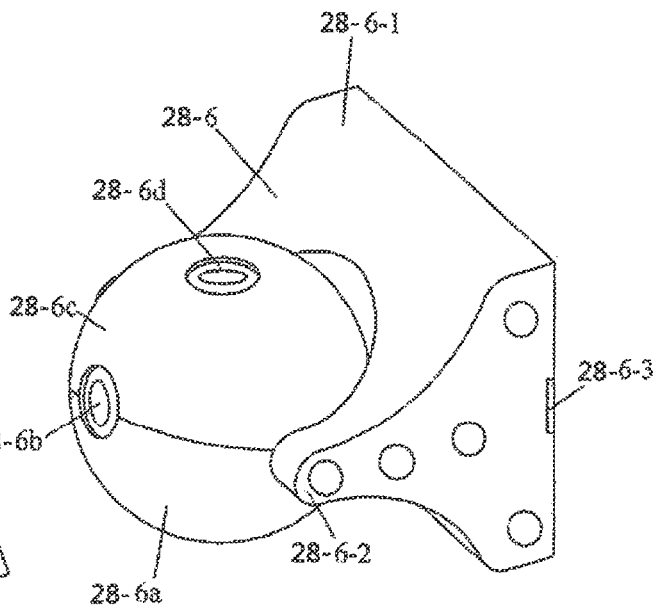
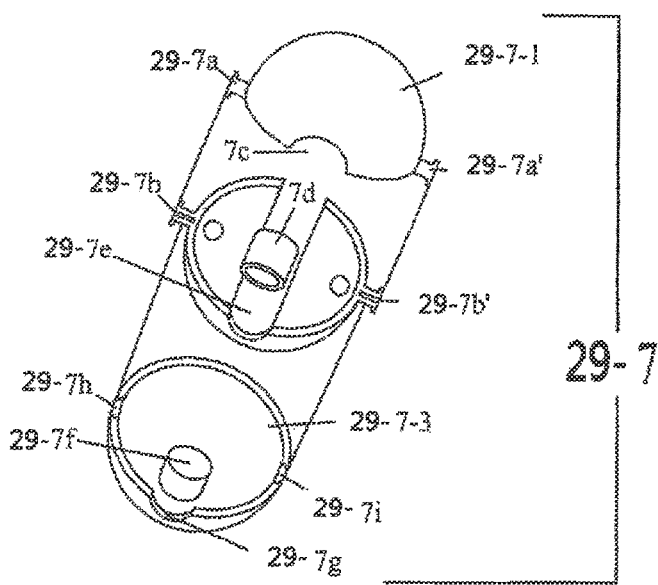
FIG. 27
FIG. 28
FIG. 29

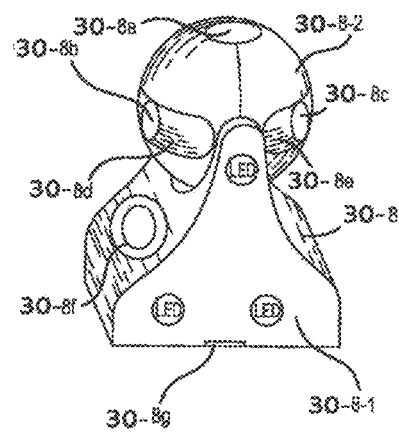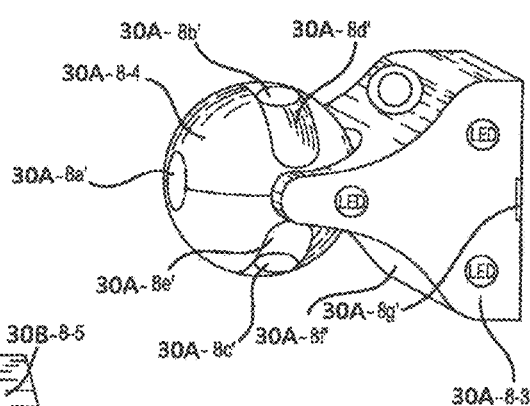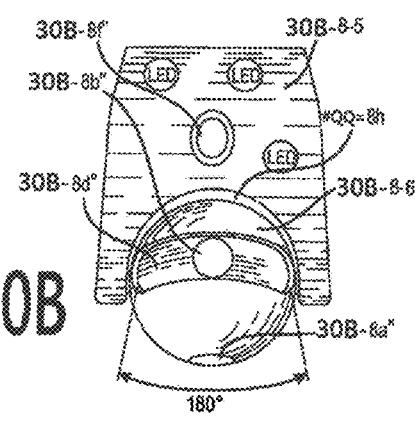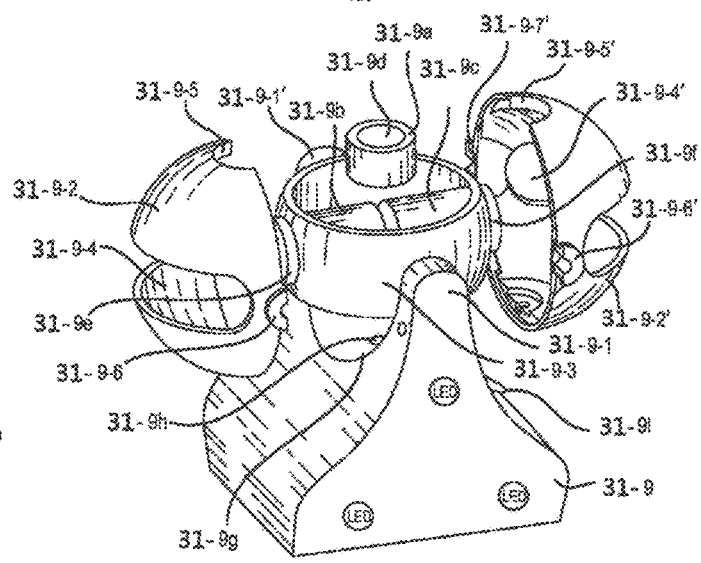

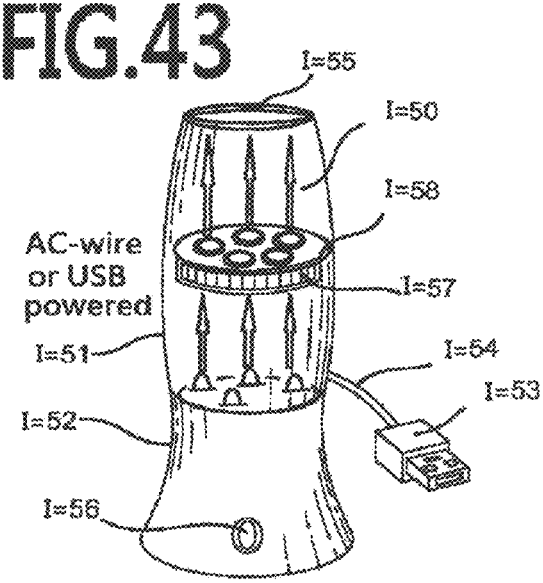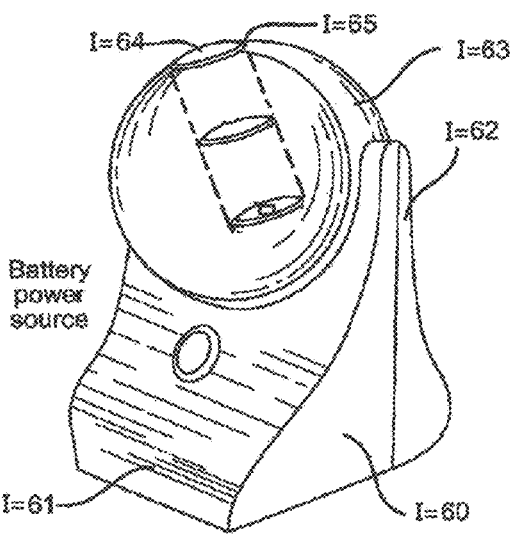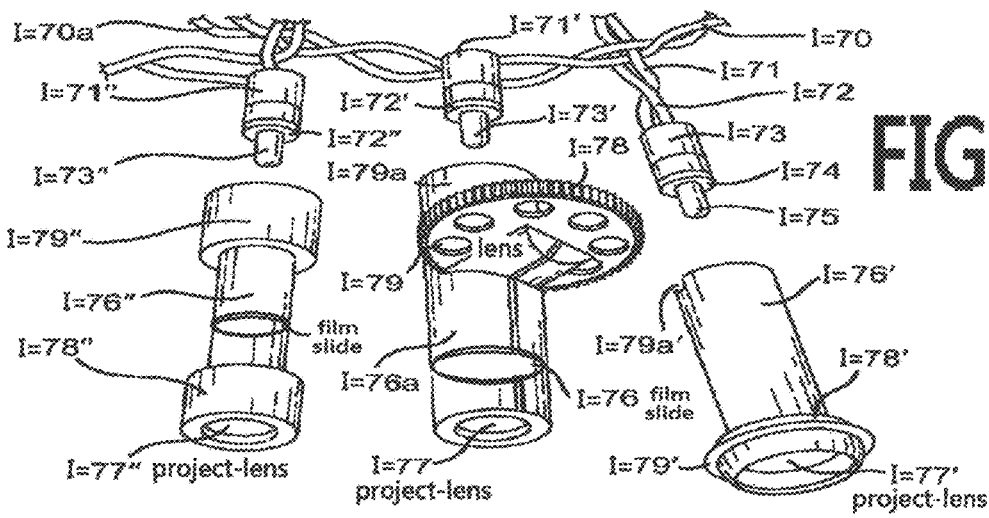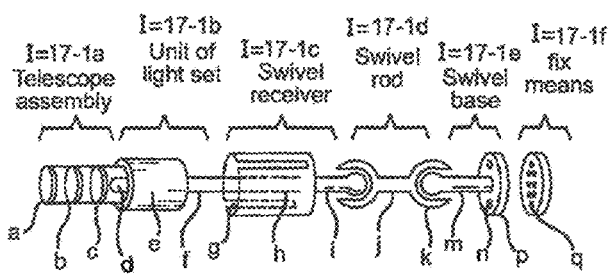

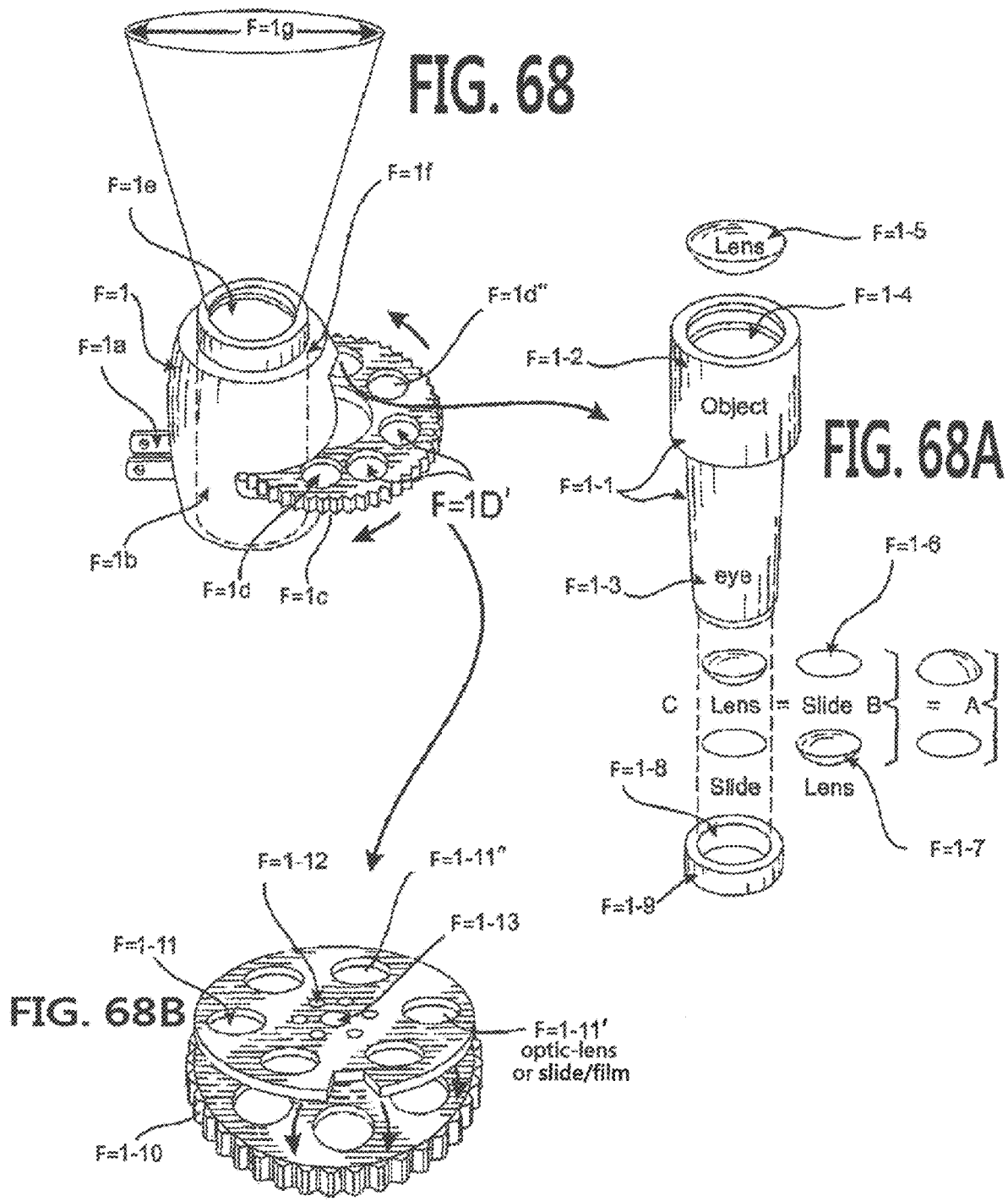

LED PROJECTION LIGHT HAS FEATURES

This application is a continuation-in-part of U.S. patent application Ser. No. 12/886,832, filed Sep. 21, 2010, which is a divisional of U.S. patent application Ser. No. 12/292, 153, filed Nov. 12, 2008. This application is also a continuation-in-part of U.S. patent application Ser. No. 14/539,267, flied Nov. 12, 2014, which is a divisional of U.S. patent application Ser. No. 12/914,584, filed Oct. 28, 2010, now U.S. Pat. No. 8,721,160, and a divisional of U.S. patent application Ser. No. 12/318,470, filed Dec. 30, 2008, and now abandoned.

BACKGROUND OF THE INVENTION

This application has subject matter in common with the Inventor's U.S. patent application Ser. Nos. 12/624,621, 12/622,100, 12/318,471, 12/318,470, 12/318,473, 12/292, 153, 12/232,505, 12/232,035, 12/149,963, 12/149,964, 12/073,095, 12/073,889, 12/007,076, 12/003,691, 12/003, 809, 11/806,711, 11/806,285, 11/806,284, 11/566,322, 11/527,628, 11,527,629, 11/498,874, 12/545,992, 12/806, 711, 12/806,285, 12/806,284, 12/566,322, 12/527,628, 12/527,629, 12/527,631, 12/502,661, 11/498,881, 11/255, 981, 11/184,771, 11/152,063, 11/094,215, 11/092,742, 11/092,741, 11/094,156, 11/094,155, 10/954,189, 10/902, 123, 10/883,719, 10/883,747, 10/341,519, 12/545,992, 12/292,580, 12/710,918, 12/622-000, 12/710,561, 12/711, 456, 12/771,003, 12/876,507, and 12/887,700.

The above-listed are directed to LED lighting for outdoor or indoor applications that use optics theory to provide novel lighting effects and that are powered by alternating current (AC) or direct current (DC) supplied by electric wire and plug connections to an electrical outlet, a battery, a transformer, a solar cell, or any other power source. The optics theory may be used to create a plurality of LED light beams to provide illumination for close area(s), or to illuminate remote area(s) by projection and may include any combination of additional features from the above-listed applications, such as the provision of more than one light source, more than one function, more than one optics, more than one projection, and/or super power saving circuitry and cost saving concepts. In addition to including features described in the above applications, the LED lighting arrangements of the current invention may further include a projection light which has a motion sensor safety device to shut down the laser beam when kids approach the laser projection light The current invention, like the LED light arrangements of some of the copending applications, may include an LED projection light having more than one function, because a single projection light function is not good for people to use and wastes people's money if people buy an LED projection light only for one single function. For example, the laser projection light device as briefly discussed above may be incorporated with display-unit(s) made up of a hologram or grating or other skill to project splendid image patterns.

The current invention shares advantages of previously disclosed LED or laser projection lights and provides new advantages as follows:

(I) It generates no heat, does not require as big a space as a conventional C-7 incandescent bulb, and has a low power consumption so that batteries will last a long time, especially when a time delay is added to control the power consumption.

(II) The LED light beams are narrow so that a smaller optics lens can be used to save a lot of cost, which is especially suitable for key chain laser light designs of the type powered by several button batteries.

(III) The narrow emission angle from the laser light source also more easily enables the laser beam to pass through a hologram, grating or other display-units to present splendid light patterns to viewers.

The current invention introduces projection of a display-unit's digital data which may be stored inside digital memory such as a memory card or memory stick of a digital camera, phone, computer, communication device, or other electronic device which has digital data storage, so as to project not only a steady image but also a motion picture, movie, DVD, cartoon, digital photo, digital commercial material, digital photos with a continuously changeable display-unit, such digital data normally being shown on an LCD or TFT which is very expensive for computer, consumer electric products, and communication devices because people view the images directly, whereas projection only requires a tiny LCD or TFT because projection can project the changeable data up to a hundred or thousand times larger on a desired surface to let people view a super large image and even a wall size image to let people view the image as long as the digital data have good pixels. The current invention can easily to use super high power LED or LED(s) or Laser unit(s) to provide good production effects, with a very simple circuit having digital data reading capability to let the digital data show on the display-unit(s). The LED or Laser projection light can have all kinds of the most popular digital storage' input slots, in which case the current invention can easily read all the digital data storage and show all data in super big images. This concept is illustrated in FIGS. 5 and 5-1 with a preferred construction in FIG. 4. Furthermore, the digital data can also be obtained wirelessly using a variety of networks or channels including WIFI, the Internet, WLAN, GPS, AGPS, and GPIS, with up-to-date messages, images, screens, data, information, drawings, and/or relative position transfer. It is very useful for people to view all of the wireless-field data present on the LCD or TFT screen and magnify it by the LED or laser projection light to a large image that allows all changeable updated digital data such as Google™ maps, the Cartoon Channel™, Internet TV, You Tube™ digital data, Facebook™, and all kind of Internet portal's digital data to be seen. The continuously changing updated digital data can be magnified from ten to hundred thousand times bigger to provide a super lower cost because the digital-unit(s) only need a small size of LCD or TFT.

A suitable small-size TFT can be selected from the marketplace. These include 1", 1.5", 1.8", and 2.4" TFTs with different pixels pixel specifications such as (96×64), (128×128), (320RGB×240) or any other specification for a small TFT. The variety of TFTs that may be selected include two preferred models: 1.67" (128RGB×160) and 1.76" (176RGB×160) because of their high resolution and small size. It will be appreciated that special custom made TFTs with small size and high pixel resolution will still fall within the current invention scope for the screen of the digital display-unit(s), as may OEL, OLED or other proposed or under-development display screen technologies.

(IV) The LED or Laser projection light of the current invention may also include additional functions disclosed in the above-listed applications, which are instead of or in addition to projection of images or digital data from digital data storage, including functions of a desk top light, floor light, garden light, emergency light, safety light, anti-burglar light, under water light, street light, reading light, night light, light fixture, motion sensor light, power fail light, photo sensing light, dimmable light, spot light, seasonal light, Christmas light, promotion light, commercial light, sign, motion sensor light, blue tooth light, moving device, car light, vehicle light, boat light, aircraft light, multi-purpose LED or laser light with rechargeable or non-rechargeable energy storage kits and preferred circuit, switch, sensor, timer, IC, electric parts and accessories.

(V) The current invention may also be in the form of a low-end LED or Laser projection light which can have just one display-unit for projecting a single image, or a plurality display-units, for example 6, 8, or "N" slides, films, or cartoon characters in a rotatable disc or round-shape to provide a continuous image display unit that automatically or manually changes the display-unit(s) to change the image by of a motor and gear-set, push button, spring, and teeth, or any other skills, methods, and/or designs that can be used to make a low-end LED projection light. The laser projection light may further incorporate hologram, grating with tiny films made by plastic injection or stamping at very low cost for the low-end market.

(VI) Laser project light devices are considered by people to be very dangerous for kids because kids might stare directly at the optics. The current invention uses one sensor which is similar to the proximity sensor in a man's toilet, to activate a circuit and shut-off the laser beams and prevent kids from directly staring at the laser beam or LED beams. All of the optics, optics lenses, and related accessories and parts of this embodiment may otherwise be similar to embodiments that do not include the extra sensor.

The seven major improvements described above may also use the following features (A) to (M):

A. The LED light device of the invention may include features of the LED light device described in copending U.S. patent application Ser. No. 11/806,284, in which LED elements are incorporated with an optics medium to diffuse the light emitted by the LEDs and provide an area light illumination suitable for a night light.

B. The LED light device of the invention may include features of the multiple light source LED light device described in copending U.S. patent application Ser. No. 11/255,981, in which first and second LED elements are arranged in a matrix to face in one or multiple directions, and to have different positions, orientations, or locations, with some of the LED(s) acting as a night light and other LED(s) acting as an emergency light.

C. The LED light device of the invention may also use features of the multiple LED light source light device described in U.S. patent application Ser. No. 11/255,981, in which the first and second LED elements each includes a plurality of LEDs that face in more than one direction or are situated at different locations, positions, and/or orientations to illuminate multiple areas.

D. The LED light device may include at least one mechanical or electric switch having at least one function selected from on/off, auto, timer, time delay, flashing, partial on, partial off, partial flash, partial chasing, partial random, partial fade-in and fade-out, on and off duration for each blinking function, power saving selection, blinking function selection, persistence of vision, blinking of one LED or multiple LEDs, on and off percentage of each blinking cycle, power saving setting or selection, LED or LEDs group reset selection, or any LED light functions for a plurality of LEDs available from the marketplace.

E. The LED light device of the invention may also utilize features of the light device described in U.S. patent application Ser. No. 11/806,285, in which the LED can be any type of LED specification with single color or multiple colors, and all said LEDs can change color, or the number of illuminated LEDs can be changed, to provide different light functions by of a controller, switch, and/or sensor.

F. The LED light device of the present invention may also use features of the multiple function LED light described in U.S. patent application Ser. No. 11/806,285, in which the LED can incorporate other functions including, by way of example, an electrical outlet, air freshener, motion sensor, beacon light, warning light, chasing lights, flashlight, bug repelling device, mosquito repelled device, mouse repelling device, sonic repelling device, projection device, and/or persistence of vision device with blinking LED(s).

G. The LED light device of the present invention may also use features of the multiple light source LED light device described in U.S. patent application Ser. No. 11/255,981, which includes an LED or LEDs for indicating battery status such as low battery capacity, full capacity, or half capacity with preferred colors to indicate the status of the batteries, or to show the device on duty status.

H. The LED light device of the present invention may also feature of the LED device with special effects described in U.S. patent application Ser. No. 12/710,561, in which the LED(s) blink at a rate that is faster than the human eye's response time of $1/24$ to $1/16$ second to cause the illusion of continuous illumination and reduce power consumption.

I. The LED light device of the present invention may also use the feature of the LED light device of U.S. patent application Ser. No. 12/710,561, in which the said blinking frequency is quicker than the human eye's scan speed of within $1/48$ second, i.e., faster than 48 Hz, of the on/off percentage of each blinking cycle is adjusted accordingly, to provide a power saving setting or selection.

J. The LED light device of the invention may have a battery with a voltage higher than the LED trigger voltage, or a voltage lower than the LED trigger voltage while incorporating a voltage boosting electrical circuit to raise the battery voltage up to the LED trigger voltage.

K. The LED light device of the invention may use a control to cause the LED or
LEDs to turn-on and turn-off for a certain percentage of each cycle, as described above, in order to utilize the persistence of vision to save power.

L. The LED light device of the invention may also include circuitry for achieving the cost saving feature described above in which the total batteries' voltage is less than the LED(s)' trigger voltage to cause the LED(s) to turn on and turn off according to predetermined functions, effects, color, and/or brightness.

M: The LED light of the invention may utilize interchangeable 120V AC and battery power sources as described in U.S. patent application Ser. Nos. 12/232,505, 12/292,153, 12/318,473, 12/318,470, 12/318,471, 12/622,000, 12/624,621, 12/710,561, 12/710,918, 12/711,456, 12/771,003, and 12/876,507.

N: The LED light device of the present invention may also be included in projection kits selected from the following:
(1) projection kits that can change position in any of three dimensions, (2) projection kits that do not change position,
(3) projection kits that can be added, or moved-out, or change position along all axes in three-dimensional space,
(4) projection kits that are rotatable,
(5) projection kits that can tilt,
(6) projection kits having adjustable focus,
(7) projection kits with changeable display-units,
(8) projection kits that can incorporate an LCD or TFT display-unit to show moving and changeable digital data images,
(9) projection kits that can incorporate digital memory or data storage to display a plurality of images stored inside the digital memory or digital storage,
(10) projection kits having a desired number of projection to offer more than one projection image or light beams from a single LED projection light
(11) projection kits having tubular for housing an optics, optics lens assembly, convex lens, concave lens, display-units, slide, film, LCD display, TFT display, image presentation, transparent material, and/or translucent to provide desired image or light beam performance.
(12) project kits having tubular including a plurality of pieces arranged to install one or more of an LCD display, TFT display, film, slide, paper, transparent material, translucent material, photo display, and disc pack for a display unit to present a desired image or light beam to a viewer.
(13) projection kits with a laser projection light that incorporates a hologram, grating, or other optics display-units to present splendid light patterns with adjustable to change the pattern with a steady or moving image, and having a kids' safety sensor
to shut down the laser beam when people approach the laser projection light.
(14) projection kits with projection display-units to display digital data received from any wireless network or system, such as WIFI, the Internet, WLAN, GPS, AGPS, GPIS or any other wireless network or medium to provide an up-to-date message, image, screen, data, information, drawing, and/or relative position transfer.

In the case of wireless digital data display, it is very useful for people to view all wireless-field data present on the LCD or TFT screen and magnify by of an LED or Laser projection light so that the changeable or updated digital data can more easily be seen. The data might be, for example, a Google map, the cartoon channel, Internet TV, You Tube digital data, Facebook, or all kinds of Internet stations' digital data. This can also apply to wired digital data connections with magnification of the continuously changing or updated digital data ranging anywhere from ten to one hundred thousand times bigger image at super lower cost because the digital-unit(s) need only be a small size LCD or TFT.

The small size TFT can be selected from available 1", 1.5", 1.8", or 2.4" screen sizes with resolutions of (96×64), (128×128), (320RGB×240) pixels, or any other specifications of a small TFT. Two preferred TFT models include 1.67" (128RGB×160) and 1.76" (176RGB×160) models because of their good pixel resolution and small size. It will be appreciated that special custom-made TFTs with small size and high resolution could also be used for the LED or Laser projection light of the current invention and that the Digital Display-Unit(s) may involve new technologies such as OEL or OLED.

BRIEF DESCRIPTION OF THE DRAWINGS

FIGS. 3, 3-1, and 3-2 show a second preferred embodiment of the current invention, in the form of an LED or laser projection light having more than one function and including a plurality of slides within a rotatable disc to change the slides and offer a plurality of different images for projection to desired areas, one of the functions being that of a night light powered by batteries, an adaptor, a transformer, or an input from a solar power, wind power, or chemical power source, USB power device, power storage device, USB Power bank. project light to project the motion picture, changeable digital data, changeable LCD or TFT display-unit data, changeable digital data storage inside digital memory card or memory stick, cartoon, changeable photos, time (designed IC with changeable time signal), date, wireless transmitting environment data. The changeable image can get while make change of following things including any combination from (1) a moving device, (2) motor & gear-set assembly, (3) animation device, (4) electric parts & accessories to change the display-unit which including (a) slide, (b) film, (c) digital data on LCD display, (d) digital data on digital storage, (e) digital data on digital memory by automatically or manually changing- to change the image. (f) digital data come from wireless-field. The said all or device are powered by battery or 120 Volt power source, indoor power source, outdoor power source, capacitor, or other energy storage components. This embodiment not only has LED project light but also night light+weather station+movie projection+Digital data projection+cartoon projection+motion picture projection.

FIGS. 4, 5, and 5-1 show a third preferred embodiment of the current invention, in the form of an LED or laser projection light for projecting a motion picture, changeable digital data, changeable LCD or TFT display-unit data, changeable digital data stored inside a digital memory card or memory stick, a cartoon, changeable photos, and/or time, date, and environment data.

FIGS. 6, 7, 7-1, 7-2 show a fourth preferred embodiment of the current invention, in the form of an LED or Laser projection light to project light beams with adjustable focus and second function kits for a night light powered by a battery or 120V power source, indoor power source, outdoor power source, capacitor, or other energy storage components. The LED or Laser projection light projects super high brightness light beams from a super high power LED or LEDs which may be selected from a 1 watt to 100 Watt LED or LEDs or other laser unit(s) available from the marketplace. Suitable adjustable focus mechanisms or an add/remove/change projection are disclosed for example in copending U.S. patent application Ser. Nos. 12/876,507, 12/771,003, 12/711,456, 12/646,621, 12/622,000.

FIGS. 8, 9, 10, 10A-10C, 11, 12, 12A, 13, 14, 15, 16, 17, 18, 19, 20, 21, 22A-22F, 23, 24, 25, 26, 27, 28, 30, 30A-30B, 31, 32, 33, 34A, 34B, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 68A, and 68B show concepts, methods, ideas, acknowledgments, constructions, and theory disclosed in the above-listed copending or commonly-owned applications and applicable to projection or projection kits with a lot of features may also be utilized in connection with the preferred embodiments, without departing from the scope of the invention.

DETAILED DESCRIPTION OF THE PREFERRED EMBODIMENTS

Preferred embodiments of the invention include an LED or Laser projection light having more than one function provides both a narrow light beam emitting direction and a concentrated light beam that enables the light beam to easily pass through the display-kit and project a desired image or light beams on desired areas, the LED or Laser projection light including at least one LED or laser projection light having a geometric shape and construction that enables at least one LED unit or laser unit to project a light beam through a display-unit containing an image, time, date, weather, temperature, humility, motion picture, photos, digital data, wireless digital data, cartoon, digital memory data, digital file storage data, hologram, grating, or other light-affecting to predetermined areas with a desired color, brightness, size, light intensity, clearance, and/or resolution.

The LED or laser projection light may be implemented using one more second-function kits to enable the projection light to also serve as a desk top light, floor light, garden light, emergency light, safety light, anti-burglar light, underwater light, street light, reading light, night light, light fixture, motion sensor light, power fail light, photo sensing light, dimmable light, spot light, seasonal light, Christmas light or ornament, licensee products, cartoon character related products, promotion light, commercial light, sign, motion sensor light, Bluetooth light, moving device, car light, vehicle light, boat light, aircraft light, and/or multi-purpose LED light or laser with rechargeable or non-rechargeable energy storage kits having preferred circuit, switch, sensor, timer, IC, electric parts and accessories as necessary to meet functional requirements.

The power source for the preferred LED light, LED unit(s), or laser unit(s) may be selected from the group including a 120V AC current, batteries, adaptors, a USB power source, a transformer, a generator, a solar cell, wind power, or a chemical power source and related circuitry to cause the said LED or LED(s) to turn on and off according to a predetermined function, brightness, color, timing, period of time, duty, cycle, and/or duration.

The LED light, LED units, or laser units may incorporate additional desired electric parts and accessories selected from a power saving IC, cost saving circuit, integrated circuit (I.C.), sensor, switch, contact, conductive, and other electric components to cause the LED, LED unit(s), or laser unit(s) to provide a predetermined performance. The above-mentioned second-function kits may use the same or a different power source than the projection light, and may add, in addition to the listed functions, any kind of conventional LED light or laser device function available from the marketplace.

Figure 1:
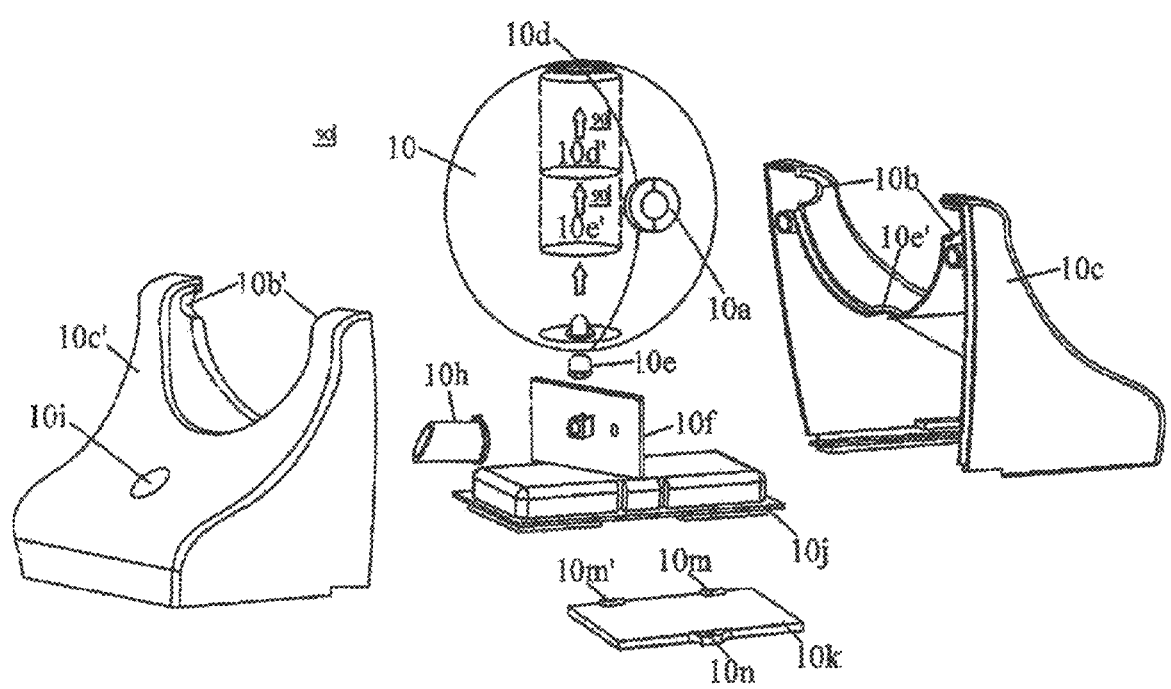
FIGS. 1, 2, 2-1, and 2-2 show a first preferred embodiment of the current invention, in the form of an LED or laser projection light having more than one function for a battery powered device and single projection kits and built-in night light.
Figure 2:
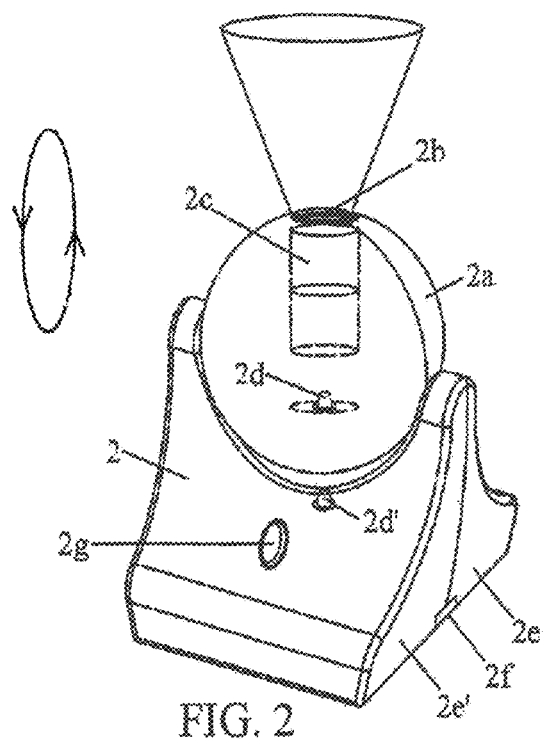
Figures 1, 2:
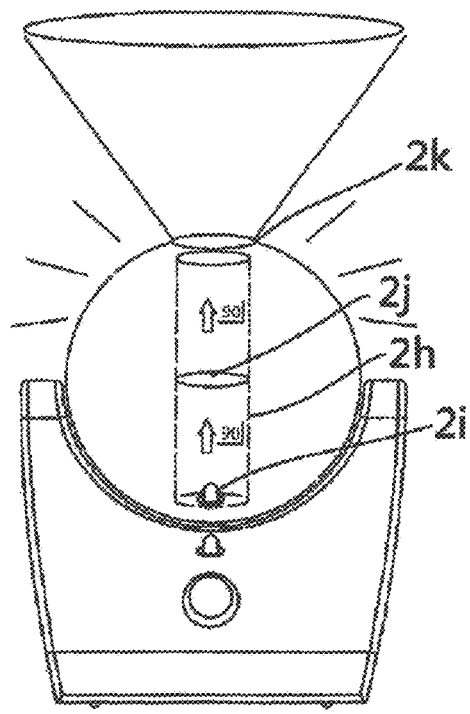
Figure 2:
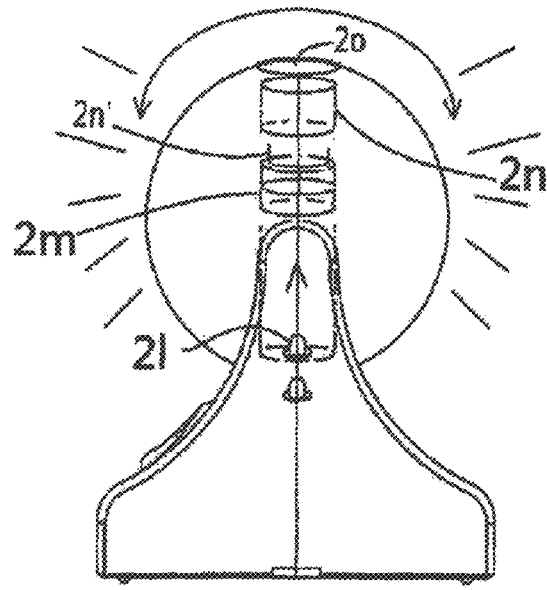

FIGS. 1, 2, 2-1, and 2-2 show a first preferred embodiment of the current invention, in the form of an LED or Laser projection light having more than one function as mentioned above, the light being a battery powered device. As shown in FIG. 1 the LED or laser projection light has tube-assembly (10e') is arranged within a ball shaped housing (10) and in which a tubular assembly (10e') has inner image forming-unit (10d') and LED(s) or Laser unit(s) (10e) are insert into the one of the tube-assembly (10e') which the light beam are arranged to emit light beams to inner display-unit(s) (10d') to project a desire image or light beam onto preferred area(s) with pre-determined brightness, colors, size, sharpness, and/or clearance of the image or light beam.

The ball (10) has two ears (10a) that fit into the two holders (10b) of right and left housing halves (10c) (10c') so as to enable the ball (10) to rotate 360 degrees about one axis. The light unit can thus project an image or light beam to any location because the unit is powered by batteries or other power source so the unit can easily be moved to any position and the ball rotated to precisely position the image or light beam at any desired position. This is the basic model and most economical cost for the LED project light which only has (1) 1pc LED (10e)
(2) 1 tube assembly (10e') which inner diameter just allow LED body (10e) can fit within
(3) Tiny display-unit (slide) (10d') just can fit within the one of tube assembly (10e') inner diameter
(4) One smallest magnify project-lens (10d) (Fit-into housing top opening) which just cover top of the tube assembly (10e') inner diameter so it is the smallest and most lowest cost.

The function for this simple and most preferred embodiment has the features (a) The LED (10e) light beam is emit to the top display-unit (slide) (10d') and emit to the top magnify project-lens (10d) (Fit-into housing top opening) in perpendicular or vertical or 90 degree so the bigger-size of image will not has the image ratio or deviation to lose from the display-unit (slide) tiny-image ratio and tiny-image. This is very important improvement than US Prior art Mr. Black to try to make image parallel to the LED light beam traveling direction which too easily to loose correct ratio for any image such as people it will have big head and short leg. It also overcome the US prior art Sutton for the project-lens fit within the tube-assembly not on the top of housing opening or above top of the inner-housing top tube assembly, so Sutton image will be same as the limited by the taller tube or side housing parts to block-out and cannot spread out to wider area than the current invention.

(b) The tube is designed to fit just allow the narrow LED light beam maybe only 15 degree viewing angle to emit into the smallest tube inner-diameter, so this will make the related expensive display-unit (slide) and top magnify project-lens (10d) (Fit-into housing top opening) both become smaller. Both the slide and magnify project-lens (10d) (Fit-into housing top opening) more bigger-size will cost multiple times cost. So this is current invention other features to let people enjoy nice bigger-size projection image but use the lowest cost to has.

(c) The current invention created the bigger-size image which up to tens to hundred thousand time than the tiny-size display-unit (10d') within the smallest tube-diameter and only use the physics refraction theory of (Object - - - Lens & focus) to get clear and bigger-size slide's image shown on the ceiling or opposite walls indoor or outdoor which remote-away from the said LED project light location and the current invention has no complicated reflection+diffusion or any other optics theory for current invention to waste money and may get bad image.

The current invention also may has optional added second-function kit of the first preferred embodiment provides a night-time use light which has at least a second LED (10e) on a circuit board (10f) with switch (10g) to control the LEDs or laser unit(s) (10e) (10e') to turn-on or turn-off according to a pre-determined function, duration, time delay, cycle, and/or performance. The switch (10h) may be pushed to turn-on the LEDs or Laser unit(s) (10e) (10e') and has a built-in timer (not shown) that continuously turns on the LEDs or Laser unit(s) (10e) (10e') for a 10 to 60 minute period and turns off after the time period. This will save a lot of power consumption and prevent people from forgetting to turn off the LED or Laser projection light. The circuit (10f) of the current invention is powered by batteries or other transformer-set or USB-set or AC Plug-wired (not shown) within a battery compartment (10j) with a screw-fastened battery cover (10k) which has two insert ends (10m) (10m') and a screw end (10n) to cover the inner batteries (not shown). An alternative power source may use rechargeable batteries which have been charged by another energy source such as a transformer, adaptor, solar module, wind power, chemical power, or generator via necessary electric parts and accessories, such as wires, male-jack and receiving-port, a AC-Plug with or without wire harness, and/or storage to cause the other energy source to supply power to the rechargeable batteries, capacitor, or any energy storage parts and accessories inside the LED or laser projection light. Any alternative method, skill, arrangement, construction, or function may also fall within the current invention scope.

FIGS. 2, 2-1, and 2-2 area assembled views of the LED or laser projection light (2) of FIG. 1, with tubular assembly (2c) and LED or laser unit(s) (2d) inside the 360 degree rotatable ball (2a) installed on a base housing (2e) (2e') having switch to control the LEDs or laser unit(s) (2d) as a projection light and LEDs or laser unit(s) (2d') of a second-function kit as a night time use light. This is an example of how the current invention provides the *LED or laser projection light with more than one function.

Figure 3:
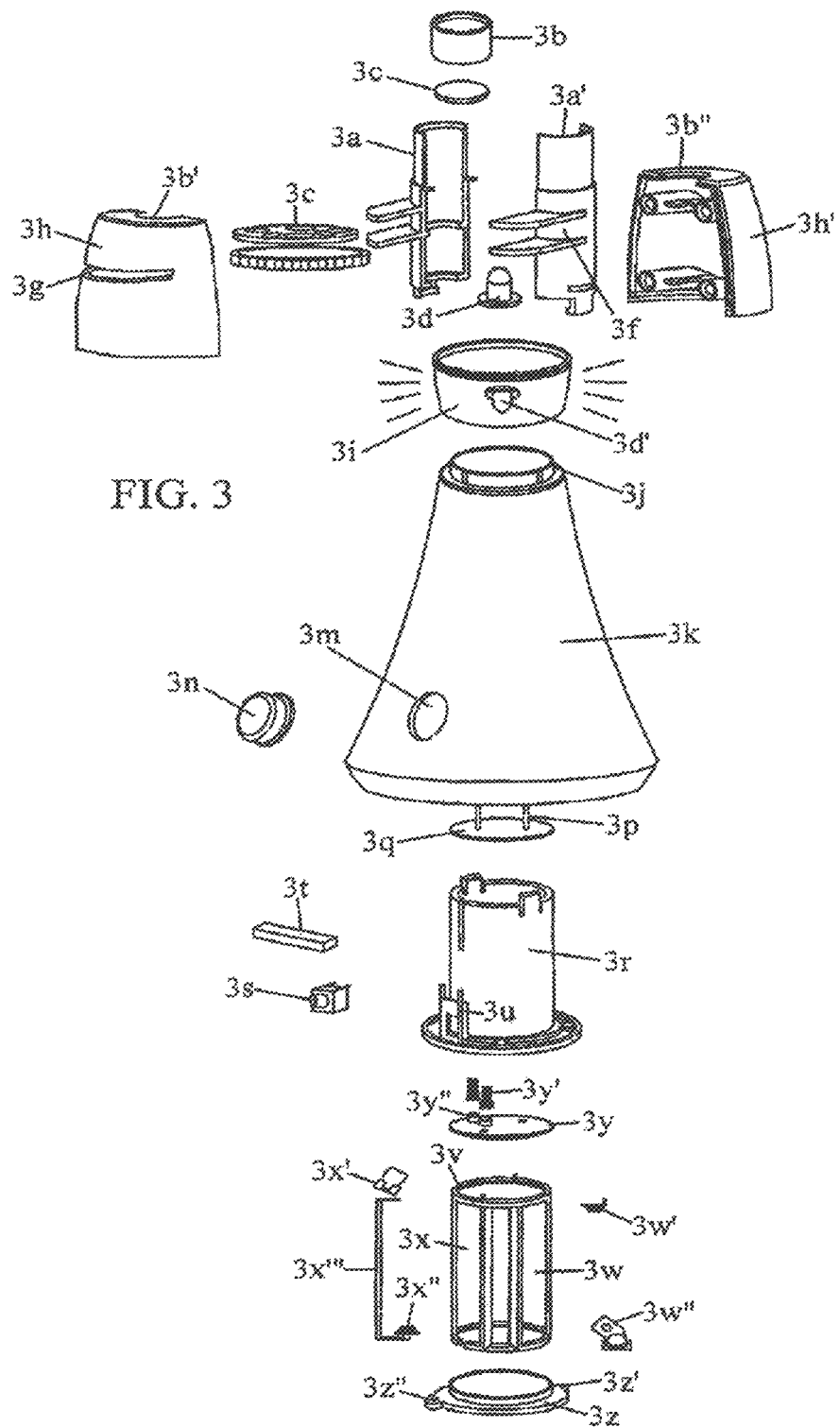

FIGS. 3, 3-1, and 3-2 show a second preferred embodiment of the current invention for all kind of application while the housing change to desired geometric shape, in the form of an LED or laser projection light having more than one function, and which has a plurality of slides within a rotatable disc to change the slides and offer a plurality of different images for projection to desired areas. The second-function kit for this embodiment is a night time use light which has a variety of LEDs or laser unit(s) to supply sufficient light to a lower portion of the LED or laser projection light, and which is powered by batteries or an adaptor, transformer, or inputs from a solar power, wind power, or chemical power source.

As shown in FIG. 3, the LED or laser projection light includes tubes assembly (3a)(3b) has parts and accessories to cause light beams from LED (3d) to pass through the display-unit (3e) and project lens (3c) to project the desired image or light beams to a desired location. The display-unit(s) (3e) of this embodiment have a plurality of slides (3e) in a donut-design to fit within the rotatable disc so that one of the slides or film (3e) is positioned to project a selected one image on the desired location. The donut can load a desired number of slides, films, stencils, logos, art, photos, or digital data thereon and the LED or laser projection light to have a changeable image performance using a single LED or laser projection light. The projection-assembly or-and tube-assembly of FIG. 3 are assembled with right and left housings (3h) (3h') and the tubular-assembly (3a) (3a') fitting within the two cut-out areas of housing-parts (3b') (3b"). The disc has a portion that passes through the opening (3g) of the project-assembly body (3h) to allow people to rotate the disc and change the display-units (3e) to change the image to another image. The LED or laser projection light (3d) of this embodiment arrange to insert into at least one of tube-assembly parts, and this embodiment because consider space limitation so preferred to extend into sits en the lens (3i) which has its LED or laser unit(s) (3d) as a light source for projection and also has $2^{nd}$ LED or laser light source (3d') to cause this lens (3i) to serve as night time use light for the second-function kit.

The lens sits on the base (3k), which has an opening to install a switch (3m) or sensor to control the inner circuit (3q). The inner circuit (3q) sits on the top of the inner channel (3r) which has a compartment (3u) to install switch (3s) and holder (3t). The inner channel (3r) has a battery contact plate (3y) which has a base (3y") to allow installation of elastic conductive-kits (3y') to top location circuit (3q) to cause the LEDs or laser unit(s) to turn on and turn off according to a pre-determined performance. The contact plate (3y) has conductive (3w) (3w''') (3x')(3x")(3x''') that fit within the battery compartment (3u) to deliver electricity from the batteries (not shown) to the conductive (3w) (3w''') (3x')(3x")(3x''') and the contact plate (3y) to connect to circuit (3q) under control of the switch and illuminate the LEDs or laser unit(s)(3d) (3d').

The LED or laser light of this preferred embodiment has a plurality of changeable slides, films, photos, stencils, grating-piece and/or display-units to allow the LED or laser projection light to project a plurality of different images to desired areas and has optional a second function kit that forms a night time use light to allow inner LEDs or laser unit(s) to emit light from a project lens to provide an LED or laser projection light having more than one function. The second function kit is not limited to a night time use light or to any particular kind of light source but rather may have any kind of light device function, including functions of a second or multiple projection lights with different light sources to project light beams, images, or digital data from digital data storage, as well as functions of a desk top light, floor light, garden light, emergency light, safety light, anti-burglar light, underwater light, street light, reading light, night light, light fixture, motion sensor light, power fail light, photo sensing light, dimmable light, spot light, seasonal light, Christmas light and/or ornament, licensed product, cartoon character related product, promotion light, commercial light, sign, motion sensor light, blue tooth light, moving device, car light, vehicle light, boat light, aircraft light, and/or multiple purpose LED or laser light, the light device including rechargeable or non-rechargeable energy storage kits with preferred circuit, switch, sensor, timer, IC, electric parts and accessories to provide perfect functionality as required by the marketplace. All such alternative methods, skill, arrangements, constructions, and functions may still fall within the current invention scope.

As shown in FIG. 3-1, the LED or laser projection light powered by batteries or other equivalent function energy source as above discussed not only can project a plurality of different images on a predetermined area but also may provide a super bright night time use light with LEDs or laser unit(s) (3-1c) (3-1c') (3-1c") for super brightness to cause the light to be emitted down to the base area for a night time or dark time light. FIG. 3-2 shows a focus-adjustable LED or laser projection light that can project the image shown on a close area with desired clearance, sharpness and brightness to provide a splendid projection or laser image presentation. The focus adjustment by move the lens extend or retract back by quickly tread-kits as FIG. 12 (SS=9f) or FIG. 11 (ss-8e) or FIG. 10 longer tread arrangement.

Figure 4:
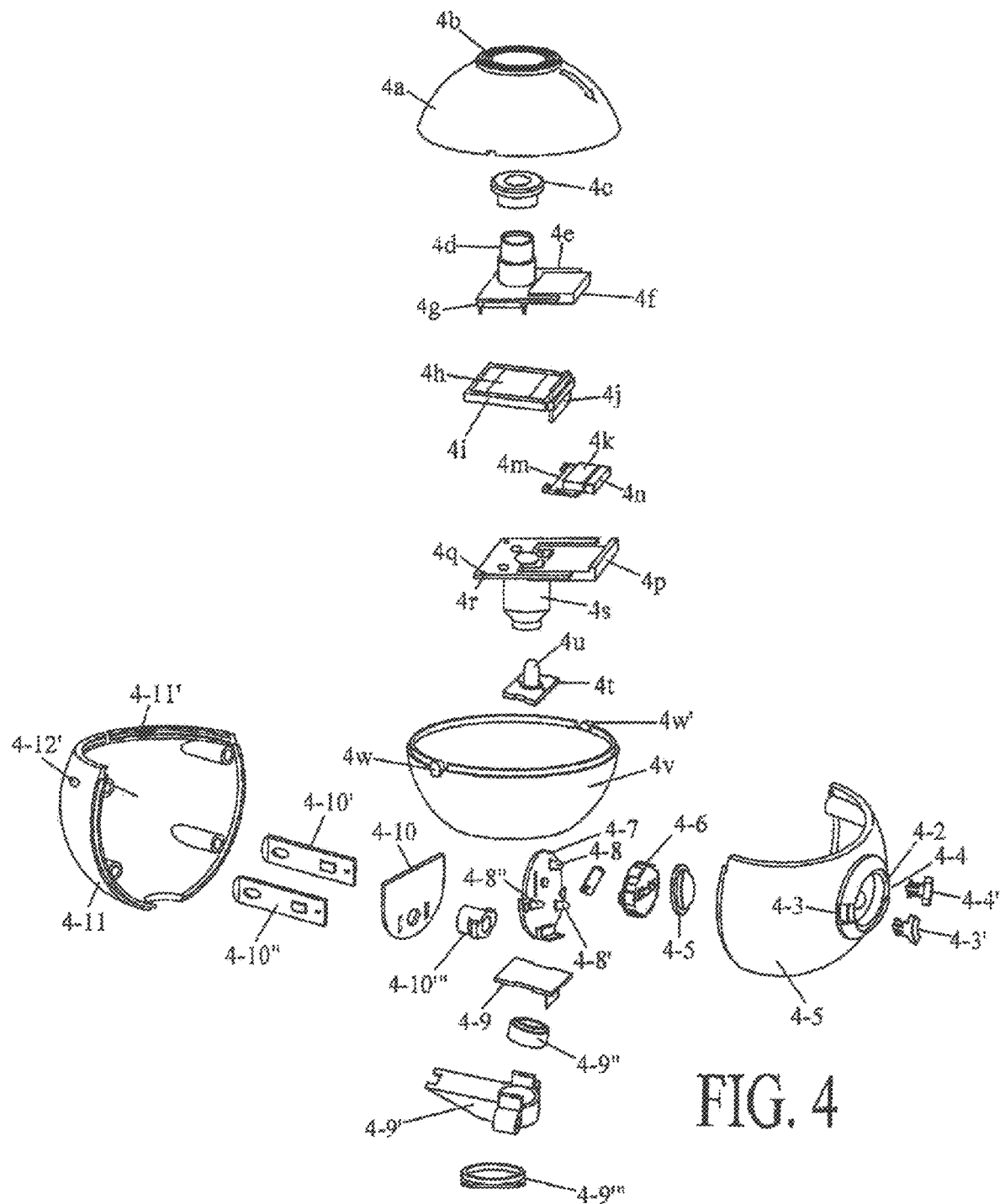
Figure 5:
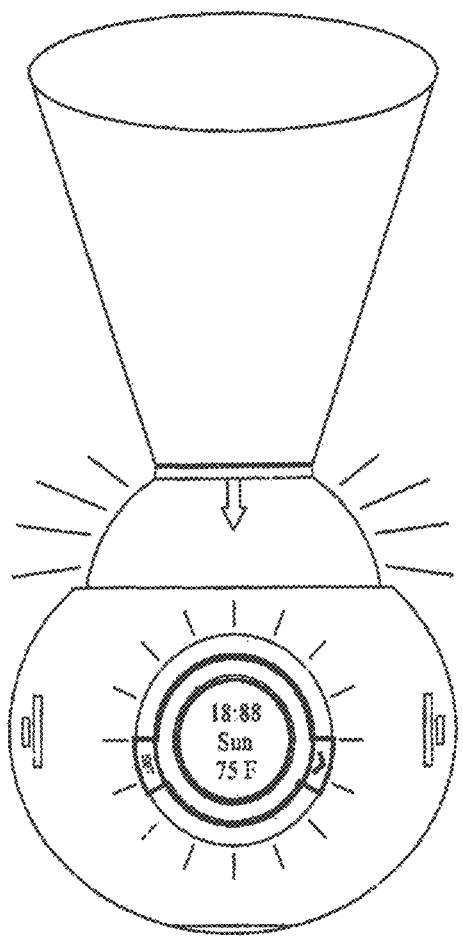
Figures 1, 5:
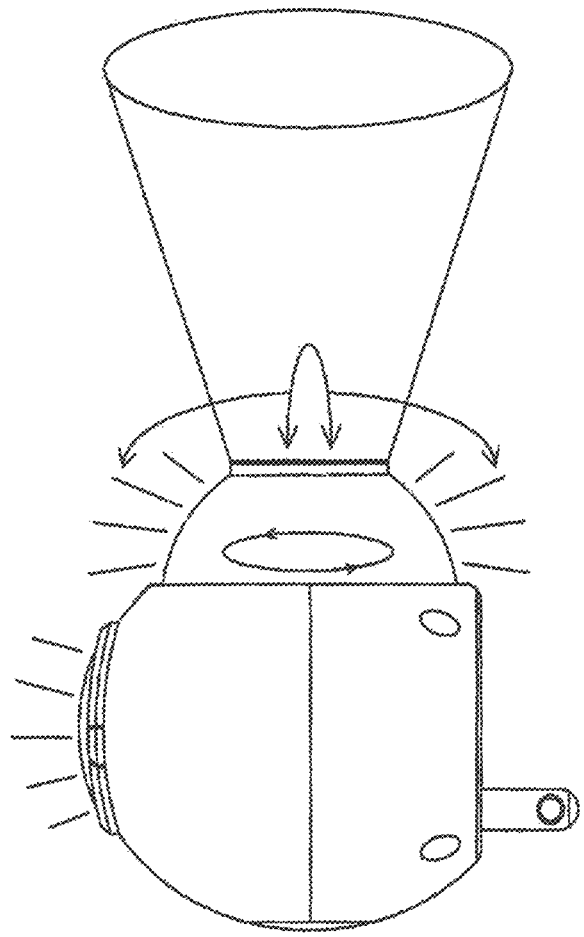

FIGS. 4, 5, and 5-1 show a third preferred embodiment of a LED or Laser projection light arranged to project a motion picture, changeable digital data, changeable LCD or TFT display-unit data, changeable digital data stored inside a digital memory card or memory stick, cartoon, changeable photos, time, date, and/or environment data. Changing of the image can be accomplished by any combination of automatic or manual changing kits including (1) a moving device, (2) a motor and gear-set assembly, (3) an animation device, (4) electric parts and accessories to change the display-unit, the display-unit including (a) a slide, (b) a film, (c) digital data on an LCD TFT screen display, (d) digital data on digital storage, and/or (e) digital data on digital memory by automatically or manually changing. The kits or device may be powered by a battery or 120V power source, indoor power source, outdoor power source, capacitor, or other energy storage components. This embodiment not only has an LED projection light but also a night time use light, weather station, movie projection, digital data projection, and/or cartoon projection.

FIG. 4 shows an updatable projection which can project digital display-unit(s) (4h) in the form of very tiny LCD or TFT screens fit-into one of tube-assembly or holder or tray (4i) (4j) which has wall surrounded and assembled with top other tube-parts (4f) also has wall surrounded to prevent the light beam emit out or leakage from the lower light source (4u) which fit-on the small PCB (4t) to the display-unit (4h) and go through the top project-lens (not shown) inside adjustable-focus-unit (4c) which is located on above and top of highest inner-housing tube of tube-assembly or fit-into top-opening of top-of-housing.

From FIG. 4 the said Laser or-and LED light device which has more than one tubes or holders or frames of tube-assembly that show the digital data on an LCD or TFT similar to the screen of a conventional cellular phone screen, DVD screen, MP4 screen, digital camera screen, digital video camera display, and/or computer screen such as the screen of an iPhone™, iPad™, etc. Such screens must have a relatively large size or have high visibility in order to enable people to clearly see the displayed images, which is costly. The current invention does not require display-units of large size or high visibility because the image will be magnified from ten to hundreds or thousands times. Hence, the cost is very low for this miniature size of screen. But it will be appreciated that the digital data has to have a certain clarity and sharpness or high pixel resolution so that the image can be projected to a large size and still have good clarity and sharpness.

The digital display-unit (4h) sits on a tray (4i) to enable the display-unit to be well protected from any impact and drop that might otherwise cause damage and also has wall (4i) surrounded display-unit (4h) and wall (4i) is assembled with top tube (4d)-with-base (4e) to prevent from light-beam leakage out from display-unit (4h) to out of the tube-with-base of tube-assembly. The tray of display-unit (4h) has wall (4i) has at least one side to arrange the plurality of the electric contact- and related parts and accessories (4j) (4k) (4n) (4m) and connect with lower tube-with-base (4s) own wall (4p) to fit the conductive-piece which delivery electric-signals from the data-source such as pin-sets, conductive wires, conductive ribbons, resilient conductive, conductive rubbers, conductive paper, conductive film, or any multiple piece electric contact to allow the digital data to be delivered from the digital storage to the digital display-units.

The parts and accessories, such as pole (4g), hole (4q), holder (4n)(4j), board (4p), lower plate (4r), and top plate (4f) are all designed to hold the digital display-units (4h) and deliver the electric signal from digital storage such as a memory card, memory stick, or other memory storage electric device to the digital display-unit(s) (4h) and all has walls to prevent from the light beam leakage out so light source (4u) insert into the and light beam emit from lower tube-with-base (4s) to all inner plate or holder (4f) (4j) (4n) to the top tube-with-base (4d) all parts of tube-assembly has no light-beams leakage-out and this light-beam has image or-and patterns will emit out from the top housing-opening project-lens and spread out to wider areas. The conductive piece from the digital storage (not shown) to digital display-unit (4h) is not shown because it can be any available conductive piece.

A tubular assembly of FIG. 4 has each parts including tube-with-base (4s), holder (4n), tray (4j), tube-with-base (4f) and focus-adjust-unit (4c) each has wall (4i) to prevent from the light-beam leakage while traveling. The said tubular assembly emit light go through top the said digital display-unit (4h) includes, an upper tubular having an adjustable-focus unit (4c) installed on above the top of highest inner-housing tube (4d), which is formed in one piece with the top tube (4d)-with-plate (4f) to allow the display-unit's (4h) data to be projected out to the desired area and also can adjustable the focus of image like FIG. 10 and FIG. 10A to 10C and FIG. 11 and FIG. 12 and FIG. 12A all has the focus-adjustable-kit (10-7k) (10A-7i) (11-8e) (11-8c'). The upper tube-with-base (4d) has top adjust-focus-kit's optics-lens within (not shown). The lower tubular has a tube (4s) and inner with a desired number of LEDs (4u) to let the LED light beams pass through and hit the digital display-units (4h). The whole tubular assembly, including the upper tubular-parts and lower tubular-parts, are fitted within a top and lower ball (4a) (4v) with two extensions (4w) (4w') to fit into the main housing groove (4-11') and cause the ball to rotate 360 degrees along the y-axis and tilt to the up-and-down or right-and-left to a certain degree to allow the image or light beam to be projected anywhere the user desires.

FIG. 4 shows a digital display-unit (4h) that serves as a digital time display with a weather station to show the time, date, temperature, and week through a front window or opening (4-4). The time-related parts and accessories (4-6) supply all the data for the digital display-unit (4h) and also offer data to a screen for window (4-4) so that both the digital display-unit and window have the same data at any time, the digital storage-unit of this embodiment and the time-related parts and accessories (4-6) using conductive parts to offer digital data to the digital display-unit (4h). The circuit board (4-7) connect with light source(s) serves as back light and night light for the window and upper ball so that this embodiment not only offers digital data projection but also has a lower portion window time display and night light for the ball, and a back light for the window message display, so the LED projection light of this embodiment has more than three functions. FIG. 4 shows an LED projection light having more than one function that is powered by a plug-in power source, but that also can be powered by batteries or rechargeable batteries or powered by another energy source as discussed above. The digital display-unit (4h) and window display (4-6) may have the same or different power sources as the second or third function kits, depending on market requirements.

FIGS. 5 and 5-1 show further FIG. 4 details of the third preferred embodiment that do not require further discussion here as they are all discussed in detail above.

From FIGS. 6, 7, 7-1, and 7-2 show a fourth preferred embodiment having an LED projection light to project light beams with focus adjustment and a second function kit for a night time use light powered by a battery or 120V power source, indoor power source, outdoor power source, capacitor, or other energy storage components with preferred conductive-piece to connect with power source. The LED projection light projects a super high brightness light beam while inside LED unit(s) incorporate a super high power LED of from 1 watt to 100 watts available from the marketplace. The adjustable focus, or add/remove/change projection functions can use features described in co-pending application Ser. Nos. 12/876,507, or 12/771,003, 12/711, 456, 12/646,621, 12/622,000, or 12/318,470.

Figure 6:
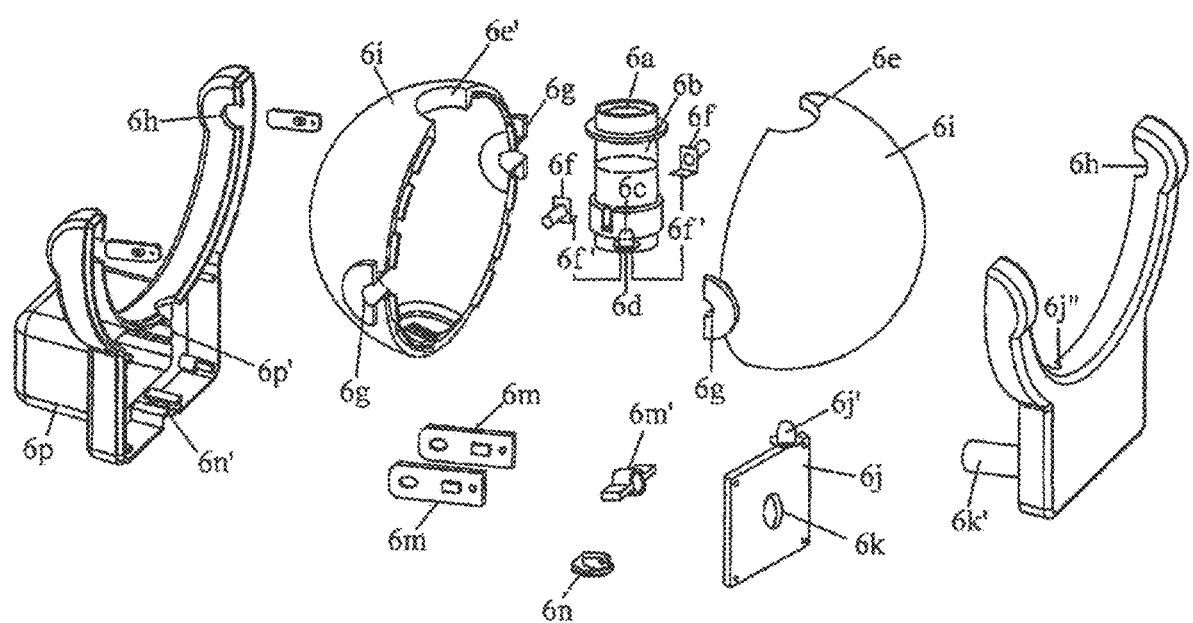

FIG. 6 shows an embodiment similar to the first preferred embodiment FIGS. 1 and 2. The difference is that the LED projection light of this embodiment has a night light powered by a plug-in power source as shown in FIGS. 6 7, 7-1, and 7-2. The other differences shown in these drawings are the inclusion of a focus-adjustment to enable the LED projection light to project the image or light beam similar with focus adjustable a flash light or torch light and/or with desired clarity, sharpness, size, brightness, and distance and the capability of rotating about any combination of the x-axis, y-axis, z-axis to cause the image or to projected to anywhere desired.

The present invention can utilizes features described in prior applications and patents of the inventor, including:
1. U.S. Ser. No. 12/232,505(#CC-2008) now U.S. Pat. No. 7,832,917 issue date Nov. 16, 2010,
2. U.S. Ser. No. 12/907,443 (CC-1) now U.S. Pat. No. 7,871,192 issue date Mar. 6, 2012,
3. U.S. Ser. No. 12/292,153 (DD-2008) now U.S. Pat. No. 7,871,192 issue date Jan. 18, 2011,
4. U.S. Ser. No. 12/876,507 (SS-2010) now U.S. Pat. No. 8,083,377 issue date Dec. 27, 2011,
5. U.S. Ser. No. 12/318,471 (GG-2008) now U.S. Pat. No. 8,002,456 issue date Aug. 23, 2011,
6. U.S. Ser. No. 13/019,331 (GG-1) now U.S. Pat. No. 8,231,160 issue date Jul. 31, 2002, and inventors pending filing case
7. U.S. Ser. No. 12/914,584 (FF-1) Division of Ser. No. 12/318,470 (FF-2008) Filed on Dec. 30, 2008.
8. U.S. Ser. No. 12/834,435 (DD-1) Continue of Ser. No. 12/292,153 (DD-2008) Filed on Nov. 12, 2008
9. U.S. Ser. No. 14/275,184 (FF-II) Continue of Ser. No. 12/318,470 (FF-2008) Filed on Dec. 30, 2008
10. U.S. Ser. No. 14/539,267 (FF-III) Continue of Ser. No. 12/318,470 (FF-2008) Filed on Dec. 30, 2008
11. U.S. Ser. No. 12/984,953 (AAA-10) filed on
12. U.S. Ser. No. 12/886,832 (TT-1) Filed on Sep. 21, 2010

These applications disclose LED lights having at least has one of the LED light source preferred for white color light beam not close to Blue color, kelvin temperatures around 3,000 not 6,000K so the sufficient brightness white light beam to pass though the display-unit(s) and lighted the said display-unit(s) and go through the said convex lens to create a relative image basing on the focus theory. To adjust the said display-unit related to the optics-lens (Any desire assembly) for position, location, orientation, distance will created different image for different of color, size, position, orientation and image, Hereof, the display-unit(s) preferred is a colorful film, slide, character's art, geometric art, motion picture display, digital data display, LCD screen, TFT screen, Lcos display, screen which contain data, colors, number, signals, message, logo, sign, design, art work so can project the bigger-size image and magnify by the said Optics Lens shown on the areas or surface which has at least 1 feet to desired distance which is far away from the said LED light device. This is different with US prior arts Mr. Black for (1) The image present to the surface where are parallel with the LED light beam traveling-out direction. The current invention all the Object/slide/film/screen/display-unit all arrange is perpendicular or vertical to LED light beam traveling direction so the Image also present is close perpendicular or vertical to LED light beam. Furthermore, (2) The Major Different with Mr. Black disclosure for small size image like all market hand held or toy device which the image-size is very small almost less than inch that is same as the optic-lens to the wall distance. The current invention the bigger-size image (around 3 feet diameter) is tens to hundred or thousand times bigger than the tiny-image (around ¼ to ½ inch diameter) on the object/slide/film/screen/display and big-image show on the surface where the distance from the optics-lens to surface between the 6-30 feet. And (3) The Mr. Black use the optics-theory is reflective to make the straight light beam to change direction. The current invention do not use any reflective lens or kits to make the straight LED light beam to change direction. So the different optics-theory applied to Mr. Black and current invention (4) The Mr. Black need to use reflective device, lens, kits to make light beam change direction so need a bigger tube combination to install the TILT reflective-lens so all the other parts and accessories to fit within the Bigger tube also need bigger. The current invention the tube inner diameter preferred as small as possible so can allow all narrow viewing angle LED light beam to hit into.

(5) The smaller tube so the inner object/display-unit/slide/film/screen/display also can become smaller, so cost dropped (6) while smaller tube use the refractive optics-lens to magnify the tiny-image also can use smaller for this very expensive magnify optics-lens, so this is the big improvement of current invention than Mr. Black or other market out-of-date incandescent bulb for projection light which the image or light is not been seen from light device, the image or light to be seen from the remote away distance which at least has 1 feet away distance.→This is for basic definition for so called Project Light device).

The current invention has tube-like assembly can well install the said object/display-unit(s) and optics-lens/optics-lens assembly, the said tube-like assembly between the Image output-end and LED. The LED may also install within the tube-like assembly Ls lower-end and the other image output-end has optics-lens to magnify or refraction the small display-unit image become bigger viewing-size or wide-size to be seen on top ceiling, opposite wall, surrounding walls. The current invention bigger-size image cannot be shown on the outlet-wall because to project the bigger-size image on outlet-wall need very complicated lens assembly and very expensive lens cost to overcome the image been deforming or torched or strange-image from top to toe for ratio problem.

The brief application basing on above definition of "project" meaning to compare the market other LED light which has number of the said opening(s), hole(s), cutout(s) to allow inner LED or LEDs light source or incandescent bulb or halogen bulb to emit light from the light source though the opening, holes, cutout to form the shaped-image or colorful image which belong to optics-theory's "PIN-HOLE" image which as co-inventor's other co-pending filing. These kind of the devices use different concept, construction, parts, design, and without the current invention major parts including:

L 1. Lack of Tube-like assembly to prevent light leakage out to reduce the light brigntness into the display-unit(s)

L 2. lack of the said Tube-like assembly to offer a space to accurate install the said may including LED, Display-units, optics lens to fix on right focus position to create clear and sharp image L 3. lack of so called optics-lens install on housing highest opening or above top of inner-housing highest tube or holders and the optics-lens which may including at least one of the said optics refractive lens, convex lens or Optics-lens assembly to make the lighted display-units' image to be magnified or refraction by the said optics-lens and show to at least 1 feet far away from the said LED light device.

L 4. Lack of adjust-kits to adjust the image's location, direction, orientation, angle, distance, colorful, size, brightness, timer or other features, functions, performance related to the image.

Figure 58:
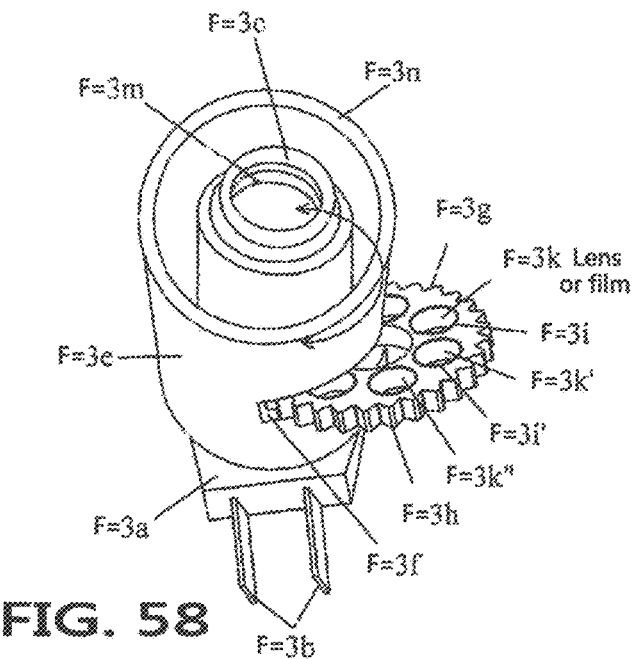

L 5. Lack of the broad application as current invention has (5a) basic 1 image projection to (5b) more than 1 image projection as FIGS. 8,9, 43, 45, 56, 58, 60 and FIG. 24, FIGS. 27 to 38, or-and (5c) Moving image projection as FIG. 24 and FIG. 58, or-and (5d) Motion picture image projection as FIG. 24 and FIG. 58, or-and (5e) Digital data image projection as FIG. 24 and FIG. 58, or-and (5f) Wireless signal image projection as FIG. 24 and FIG. 58, or-and (5g) Internet, Wife connected digital data image projection as FIG. 24 and FIG. 58, or-and (5h) More than 1 functions plus image projection as FIG. 1, 2, 3.4, or-and (5i) More than one switch, sensor, Blue tooth, remote control, wireless signal transmitting device to control the said image function, effects, performance as FIG. 1, 2, 3.4, or-and (5j) timer or other Integral circuit (IC) to make update features as FIG. 1, 2, 3, 4, or-and (5k) moveable, replaceable, changeable of the said display-unit(s), digital data storage, build-in digital data wireless connection to get continue update changeable digital data or signals, or-and (5l) movable, change position, replaceable of the said project-kits to any location of the said substrate such as FIGS. 16, 17, 18, 19 shown ball shape housing with plurality of the project-kits install compartments to load and has pre-circuit arranged to make the quickly electric connection and delivery electric signal including power or function, control signal to make the movable, changeable, replaceable project kits on different location and can change at once for multiple areas illumination by light beam or show images on many locations from one of the LED device; →All these details description as below listed.

So the current invention for many application to use (A-I) LED light as light source which has no high heat to damage the said display-unit so LED light can close to display-unit(s) and right under the display-unit(s) and will not lose the sufficient amount of light brightness to other area and make the dim or dark or not clear image projection effects.

(A-II) Tube-assembly which in any geometric shape which mainly to offer space to well install under accurate calculation for where to put the display-unit (as object) related to its optics-lens so can make desired size image basing on the physics image and refraction theory (A-III) Optics lens or lens assembly to make the LED light beam change from narrow arc emit-out angle to become all light-beam in parallel to hit the display-unit(s) and make it for good lighted object(s) to incorporate with optics-lens to make the lighted object's image present on the image output-end and further though the preferred optic-lens or lens-assembly to refraction or magnify to form desired wider size, wider image, colorful image, moving image, update digital data changeable image, time, or other art, design, characters, cartoons, sign, picture, photos, geometric design on the areas may at least shown on one or more than one of ceiling, walls, floor, ground or screen as required.

Figure 8:
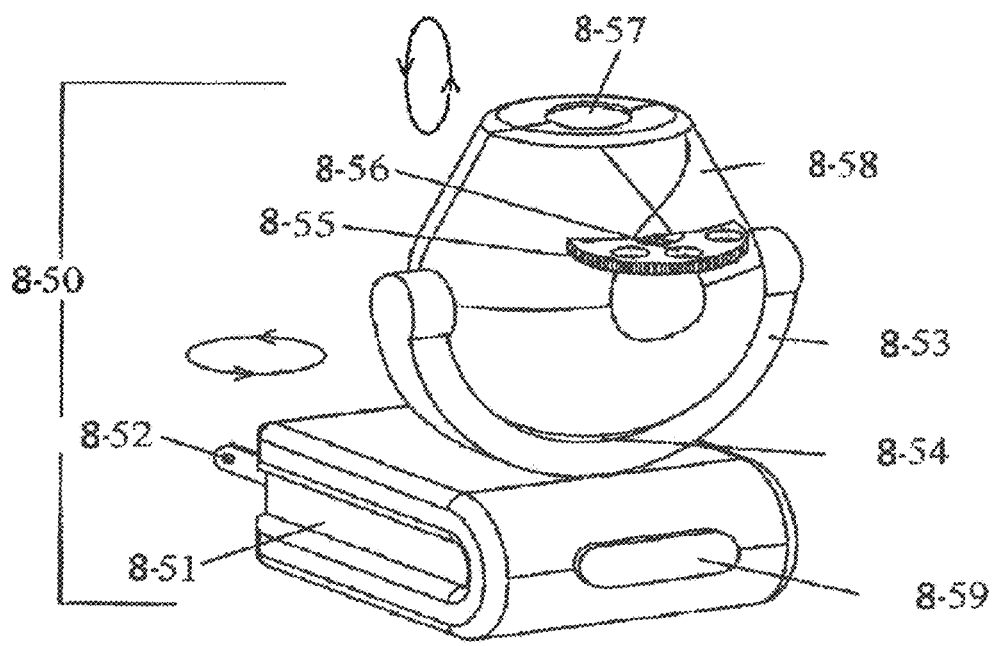
Figure 9:
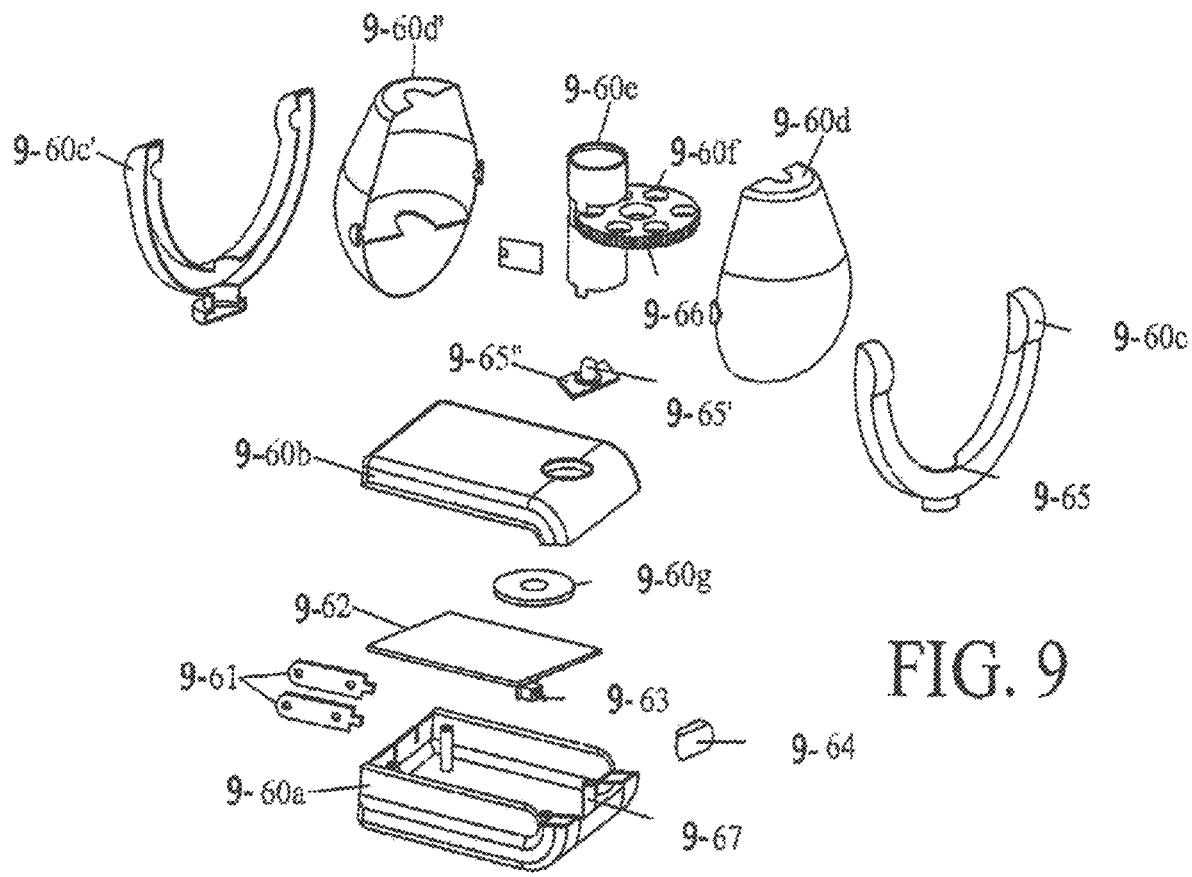

From The FIG. 8 to FIG. 68 for co-pending or co-inventor prior arts shown as features of the above discussed (a) to (l) features:

From FIG. 8 and FIG. 9 show the AC powered project LED light

Adjustable and replaceable Plurality display-units or-and optics-lens

From FIG. 8 and FIG. 9 show the one of LED light (8-50) has projection function which has base (8-51) has control switch or sensor (8-59) to control the inside LED (9-65') to turn on and turn off as desired functions which may by Blue-tooth, remote control, motion sensor, manual switch (8-59), Photo sensor, Infra-Red remote or other control available from market place. The said LED (9-65') preferred to install on small PCB (9-65") and assembly with the tube-assembly and emit the light into the tube-assembly to prevent light beam leakage out.

The tube-assembly FIG. 9 has cutout (8-56) to install the object/display-unit(s)/slide/films disc/roller/holder (8-55)(8-56) which has plurality of objects/display-unit(s)/slide/film (here as film or slide 9-60f of FIG. 9 to let LED (9-65' of FIG. 9) strong white color light beam to emit into the said colorful characters or cartoons or geometric-art design film or slide to lighten the said display-unit(s) tiny-image to become a bigger-size image which basing on the said optics theory claimed "Object" which incorporate with the said optics-lens can form the desired size of the image as copending filing of U.S. Pat. No. 8,721,160 or Ser. No. 14/275,184 or Ser. No. 14/539,267 details optics-theory of Physics. The said lighted tiny-size display-unit(s) image as lighted object which pass though the optics-lens (9-60 of FIG. 9) on above and top of the tube-assembly or on the housing highest opening can created clear and sharp and bigger-size image by the physics refraction and magnify theory which is different the PIN-HOLE image that the light beams passing through holes, opening,(s), cutout(s), film(s) without the optics-lens to act as refraction functions, the pin-holes image which cannot have clear and sharp image so it look very terrible not like current invention image shown, the bigger-size image quality is close to see Super Big TV such as 100 inch or 200 inch TV screen so clear and sharp colorful images and the bigger-size image is not able to shown on outlet's location wall surface for direct Plug-In Outlet or outdoor for night time use light, It preferred to project to top ceiling or the opposite or adjacent walls and not on the wall where the wall night light direct Plug-in.

From FIG. 8 the LED light (8-50) top frame (8-53) is rotatable for unlimited degree on the horizon axis or related to base (8-51), and has $2^{nd}$ LED (8-54) to emit the light to upper also rotatable on vertical axis oval-shape housing (8-58) to make the top oval shape-housing (8-58) to be illuminated while the circuit (9-62) deliver electric signal to the said LED (9-65') The LED light (8-50) has prong (8-52) (9-61) to supply AC power source of 120 Volt 60 Hz get into Circuit (9-62) and incorporate related electric parts & accessories (Not shown) to make the said AC 120 Volt 60 Hz input current to have LED light source operation-current form and the said Circuit has all kind of IC, sensor, control, remote control, Blue-tooth, wireless control, switch, timer to make all kind of LED light functions or power saving effects as required or same as co-inventor's other US prior arts for power saving, More than one LED light source, or more than one optics-element which all should be consider within the current patent filing for other features listed on the above Related US Application data.

Also, the FIG. 8 and FIG. 9 shown the Direct Plug-In LED Image projection light and Built-in Night Light (Simple night light) for more than one functions, But while make the Direct current powered unit, Just move out the inner 120V 60 AC-to-DC circuit and prong to add the battery related parts or accessories, then, This preferred embodiment become DC power unit so still fall within the current invention scope and claims without any argument. Or, the unit just use DC power source and no need circuit to transfer the 120 Volt 60 hz to DC power source for Just DC power source Project light which has built-in all kind of light function for lower cost version. However, Some US prior art which use the Incandescent bulb or halogen bulb to try to make image projection device but all had problem for heat issues come out from 4 Watt or 7 Watt super High temperature so all prior art have to put hot incandescent bulb on top location or side locations and work with other reflective-mirror or lens to make the light back into project tube to make projection light function. And all these prior art because light source on top (Because heat flow will move to top basing physic law), so All of the bulb application which will no way to see image on top ceiling and surround walls or adjacent walls because heat always come to up or top, so slide have to be under the light source which only application for image show on the ground or floor of lower position surface which is not good for people to see image while they take a rest or sleep or stay for kids while they lie-down or on bad for sleepy. The others page will show the brief DC power image projection light and built-in night time use light.

From FIG. 8 and FIG. 9 the LED light (8-50) has display-unit disc (8-55) (9-60) which can be moveable, changeable, replaceable and it can be use manual to make it change film or slide (8-55) (9-60f), It also can incorporate with motor, spin, clock movement, rotating to make it for automatically changing slide or film (8-55) (9-60f) as co-pending and prior arts. The further the tube-like assembly may has screw thread so can make it extend or reduce length to change the relation of (optics-lens) v.s. (display unit) to get different sharpness image which we called the adjustable focus.

So the current invention's projection LED light (8-50) major has features:

F—1: White LED light beam emit to display-unit(s) to create the image or patterns been lighted and pass though the Optics-lens to magnify (refraction) to large-size colorful image to areas away from LED light.

F—2: Has moveable, changeable, replaceable plurality of display-units (may in film or slide or digital data or other display-units discussed on above)

F— 3: Has horizon and vertical or any combination of axis for adjusting image projection directions or areas for 3 dimensional space and has any desired size, focus, angle, orientation, position of image while incorporate right optics-lens or lens assembly.

F—4: Has tube-like assembly or other device(s) to well install the said LED, Display-Unit, Optics-lens on accurate position to create nice, clear, sharp focus (adjustable focus) image to be seen.

5: Has tube-assembly has more than one of the tube or holder or frame and each has wall surround to prevent from light beam leakage-out from the LED to display-unit to top project-lens.

From FIGS. 10, 10-A, 10B, 10C show the Direct current powered image projection has adjust focus, angles, rotate, extendable, interchangeable power-source between AC and DC power source.

From FIGS. 10, 10-A, 10B, 10C show DC or-and AC powered project light for wall, surface, ceiling installation with focus adjustable features and functions.

From FIGS. 10, 10A, 10B, 10C: Disclosure the LED Projection light has Direct current power source or power compartment or circuitry (hereafter as DC power) (10-7c) inside the base housing (10-7a) and has rotating frame (10-7e) has neck (10-7f) to connect with the Base Housing (10-7a) to make the frame (10-7e) can rotating on horizon for unlimited or design degree and neck (10-7f) and frame (10-7e) has center hollow space to allow the non-twisted electric wires to install to connect with the two elastic electric connectors (10-7g) so make the ball housing (1-7d) can also rotating on the vertical axis for unlimited degree or circles and can fix on the certain degree to project the image on certain position without loosen. The inner space of ball housing has a project--assembly consist of at least one of 1. Tube-like assembly to prevent light beam leakage out and offer space to install the said 3 basic-part of projection-assembly including LED, display-unit(s), optic-lens so can keep the Optics-element(s) on precisely and accurate locations to make the tiny display-unit(s) image to magnify to super bigger-size color image to project out from the top-end of tube-like after passing though the above of top-end of tube-assembly's optics-lens (10-7j). The tube-like assembly has screw thread construction for short-type (10-7r) or long-type (10-7n) to make the tube-like assembly can change distance relation of object/display-unit/slide/film with the Optics-lens (10-7j) so can make the image focus and present on desired location with nice image and it can be adjustable at any time. The current invention preferred the LED has super brightness and white Light beam which more cool white so can make the tiny-image color of the said object/display-unit/slide/film do not have deviation or become strange color.

From FIGS. 10, 10A, 10B, 10C and FIGS. 11, 12, and FIGS. 26-43, 45 and FIGS. 47, 48, 55, and FIGS. 58, 60, 61, The current invention teach other important improvement which relate to the said tube-assembly can be one elongate piece or multiple sections or piece to from one tube-assembly (10-7h) for other consideration to install the display-unit(s), Optics Lens, LED 3 basic-parts for project-assembly or-and other optics-element(s) on right position and quickly assembly to save labor time. Some time, the One piece Tube-like assembly which is too difficult to well install the too small or too tiny slide or film which less than 3-10 mm diameter and soft so the more than one piece of the said of tube-like assembly is adapted for some consideration as above discussed.

From FIGS. 10, 10A, 10B, 10C also teach the different application for DC or-and AC power LED Projection light which may powered by any kind of Direct or-and Alternative power from the said Batteries, Solar Power, Wind power, chemical power, generator, transformer, adaptor, Energy storage, USB power, USB wired power, and it can be design to work with hook, phone holes, hanging, glue, compound, screw or other market available installation-skill so can install on desk top or surface as FIG. 10A, Ceiling or under cabinet as FIG. 10B or Walls/vertical surface as FIG. 10C not only on top of the surface as FIG. 10A.

From FIGS. 10, 10A, 10B, 10C the each of the project LED light has built-in night time use light which the said Frame (10-7e) and ball housing (10-7d) may no need to rotating because the unit is not big so can also be move the unit to make bigger-image present to other location. It can be made by housing has some tilt-surface which can let unit be put on surface and the projection direction has certain degree angle to the said desk top, wall, floor, basement surface so it can changed the projection direction by moving the unit same as preferred embodiment disclosure on FIGS. 3, 3-1, 3-2 which the project direction is not movable, changeable, rotatable.

Figure 11:
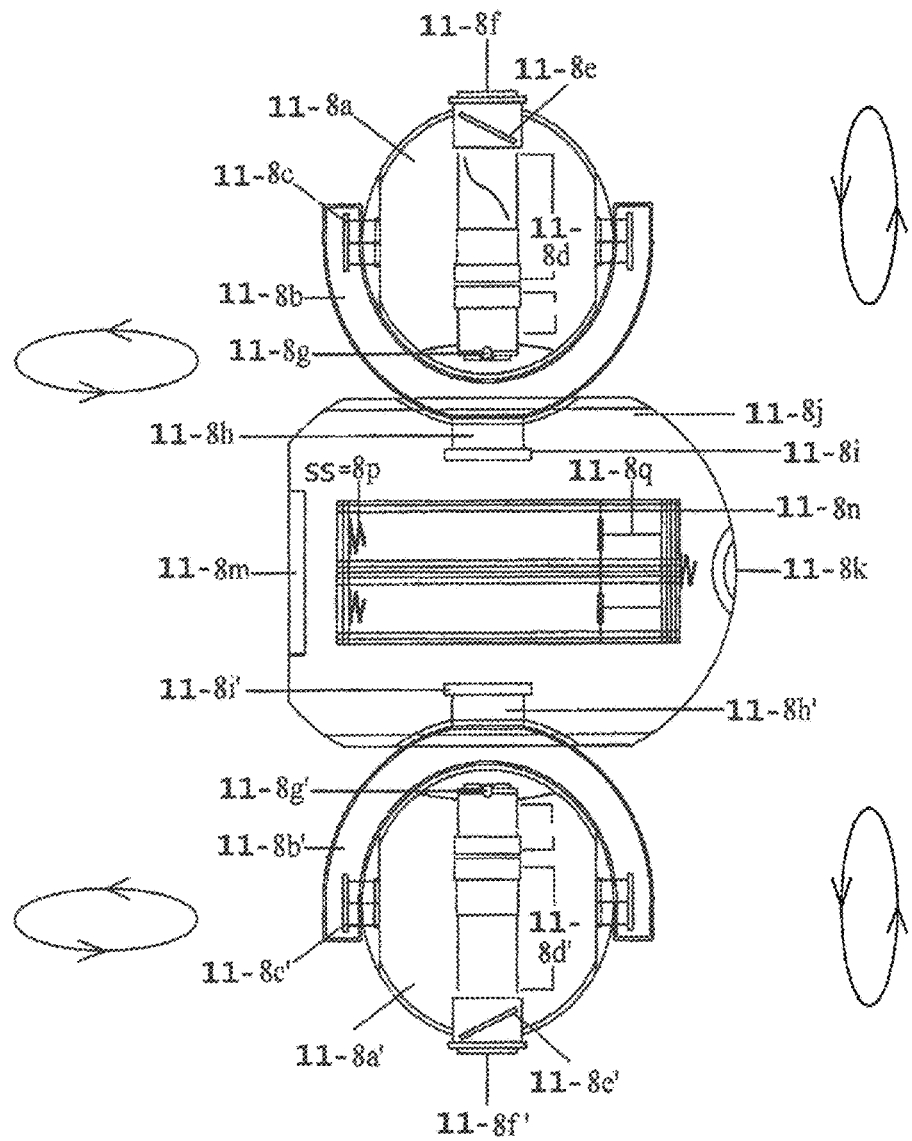

From FIG. 11 show 1. More than one function, or-and 2. More than one type of display-unit, or-and 3. More than one bigger-size image, or-and 4. More than one electric control system From FIG. 11 show→Show the LED or-and Laser project light has Plug-In conductive-metal piece without or with wires to connected and powered by AC current or DC powered LED or-and Laser projection Light More than One of the project-assembly in one unit has preferred one power source (11-8*n*) which may in a battery compartment (11-8*n*) or the Direct Plug-in conductive-metal piece with or without wire or AC sealed-unit (Not shown prong or plug-wire but it same as FIG. 64 which co-inventor CO-PENDING CASE had (#HH-09) U.S. Pat. No. 8,434,927 issued date May 7, 2013 v.s. Current parent filed on Ser. No. 12/866,832, Filed on Sep. 21, 2010. It is appreciated that the U.S. Pat. No. 8,434,927 is belong to CO-PENDING CASE (#HH-09) U.S. Pat. No. 8,434,927 issued date May 7, 2013 v.s. Current parent filed on Ser. No. 12/866,832, Filed on Sep. 21, 2010 all concept, construction, application, functions still fall within the current filing scope and claims for interchangeable power source between (1) DC power and (2) AC power.

The interchangeable power source (11-8*n*) supply the electric power to the said top and lower symmetrically and identically two project-assembly (11-8*a*) (11-8*a'*) is other feature of the current invention. It is appreciated that this FIG. 11 has each one parts from the top and lower project assembly has same Number with or without (') on following discussion;

From FIG. 11 show the LED (11-8*g*) (11-8*g'*) to emit sufficient brightness into the tube(s) (11-8*d*) (11-8*d'*) and short tubes, and lighted the inner object/display-unit/slide/film tiny image and passing through above top of tube-assembly optics-lens and emit out from the highest house opening to any direction for bigger size and shape of the image or-and patterns. Or-and the top one piece (11-8*e*) of tube-assembly below the project-lens (11-8*f*) has screw-thread construction to change the Optics-lens (11-8*f*) (11-8*f'*) distance relation with inner display-unit (as optics-theory object) so can make focus changeable for certain range to allow user to get best image to be seen.

From FIG. 11, The one end of the tube-assembly (11-8*d*) (11-8*d'*) has LED light source (11-8*g*) (11-8*g'*) to emit the narrow viewing angle LED light beam into tube-assembly and lighten the inner display-unit(s) tiny-image which maybe a or any combination selected from
(1) colorful film or
(2) slide or
(3) transparency screen or display or Lcos reflective screen has changeable or update digital data
(4) any cartoon
(5) Disney or other Characters
(6) Steady image
(7) Moving image
(8) Movie
(9) changeable update wireless connection digital data
(10) Geometric arts . . . or any other object/display-unit(s)/slide/film;

Which want to see its bigger-size, colorful image on top ceiling, adjacent walls of ceiling, opposite walls or outdoor surface those are feet away of the said LED light.

The said LED light beam passing though display-unit(s) and optics-lens to get the best colorful bigger-size image which is from 10 to ten of thousand times bigger than original display-unit's tiny-image is current invention features and not like the Epson use very expensive Glass optics-lens super high heat light source and fixed on top location or hanging on the wall with a lot of ugly wires to connect by wired-plug to get power from the outlets. The current invention use very low watt of LED from Nichia Japan which has super lower power consumer and get the brightest and bright LED Kelvin temperature to make all kind of the display-units tiny-image become super bright, and the current invention only use simple and limited piece of Lens to make nice and sharp focus bigger-size image. The current invention use Directly Plug-In by conductive-metal piece without or with wire or DC powered for such lowest power consumption LED light can get same effects or better than EPSON use wired-plug with lot of glass-optics lens which is no way to pass the US required safety standard including (a) Drop test (b) Impact test (c) Hanging (d) Load weight (e) Housing heat raising . . . testament or other safety standard which all points need to be passed with its safety certification for LED light which not only offer the Image but also offer the illumination for super power saving device.

The FIG. 11 also show the ball (11-8*a*) (11-8*a'*) can unlimited rotating on vertical axis and frame (11-8*b*) (11-8*b'*) also can rotating unlimited circles as wished basing on the two elastic-electric-contactor (11-8*c*) (11-8*c'*) and neck (11-8*h*) (11-8*h'*) this also the current inventions features and patentable construction which never had any other application or device for LED or-and Laser projection Light for indoor or outdoor applications to use such simple and unlimited rotating functions.

From FIG. 11 and FIGS. 16,17,18,19 and FIGS. 24, 27, 28, 29, and FIGS. 30 to 38, The current invention teach a one LED light has more than one bigger-size image(s) project from 1 or 2 ball-shape housing device by more than one project-assemblies FIG. 11 which is not same as the other co-inventor's FIGS. 16,17,18,19 shown that has only one ball-shape housing as plurality real and fake project-kits to has more than one of bigger-size image(s) which inside co-inventor's (#SS-10) U.S. Pat. No. 8,083,377 U.S. Ser. No. 12/876,507 (SS-2010) now U.S. Pat. No. 8,083,377 issue date Dec. 27, 2011 has all details description, construction, features. It is appreciate all the technical, concepts, acknowledgement, design, embodiment, examples, skill of the said co-inventor (#SS-10) U.S. Pat. No. 8,083,377 or its parts of skill, technical, application still fall within the current invention from the basic model only has (1) tube-assembly to install the projection-assembly 3 basic parts including (2) LED (3) object/display-unit/slide/film (4) Magnify project-lens to any other added (a) Functions, or-and (b) Features, or-and (c) More than one bigger image, or-and (d) More than one of light function, or-and (e) More than one other electric functions, or-and (f) . . . etc. should be still fall within the current invention's scope, claims without any argument.

The LED projection light of FIG. 11, also can optional incorporate with $2^{nd}$ functions device to has more features such as can add such as has more than one of Bigger-size image(s) can get from the preferred embodiment of FIG. 11 . . . or like the co-inventor's other issued or co-pending filing:

1. (#FF-1) U.S. Pat. No. 7,832,917 which has more than one functions,
2. (#AAA-10) U.S. Ser. No. 12/984,583 has project light and night time use light in variety lighting features,
3. (#TT-10) Ser. No. 12/866,832 has all kind of the changeable digital data display-units from; those has at least one of desired combination from following functions or features
   (1) Fix or-and moving for same or different size of image or images or patterns
   (2) Multiple of fixed or-and movable image has different size or timing to show out
   (3) IC or SD or video tape, memory card pre-storage fixed or changeable image
   (4) LCD, TFT, Lcos displayer, screen, reflective-lens assembly for changeable, digital data
   (5) wireless, internet, website, electric signals transmitting or receiving, changeable and update digital data displayer, screen, display-unit(s)

The said FIG. 11 unit can become different LED or-and Laser light while incorporate with different electric parts & accessories as below examples, but not limited for these embodiments, including
(1) Motion Sensor become motion sensor project light which can apply to the public building to save lighting power wastage. While people approach certain distance the two project light beam lighted the upward or downward stair and after a predetermined time the LED turn off, so this is very good application for public building such as Parking lot, Evacuation stairs
(2) Power fail while this unit has screw base and built-in battery for power fail timing, This will become power failure emergency light and it work as normal motion sensor projection light beam night time use light (No image projection as co-inventor COPENDING CASE (# QQ-10) U.S. application Ser. No. 12/771,003, filed on Apr. 30, 2010, Publication data US 2010-027-7089 date on Nov. 4, 2010 Now is U.S. Pat. No. 8,408,736 issued date Apr. 2, 2013 v.s. Current parent filed on Ser. No. 12/866,832, Filed on Sep. 21, 2010 which show on FIGS. 27 to 38 for all details, concept, construction, features still should be fall within the current inventions as the US related application data listed.
(3) Blue tooth sensor to trigger the light turn on which also good for each house owner so can turn on the front door or drive way Project Light beam (Not image or even has image) while people back to home at night time without to use any remote controller because Blue tooth can automatically detected the cell phone within the range and turn on the current invention more than one project- to project more than one areas at the same time.
(4) The co-inventor also has (# SS-10) U.S. Pat. No. 8,083,377 same as FIGS. 11, 12, 12A, 13, 14, 15, 16, 17, 18, 19 to has the multiple of project-assembly to project plurality of the light beam or image to plurality of areas with desired same or different size(s) and locations (More than 2 and up to hundred areas been lighted by the said Plurality project-assembly—to lighted plurality of areas.) Not only this features but also at least one or each project-assembly—can be moved, changed, replaced by user or mechanical design because housing has a pre-arranged circuit inside of housing so the light-beam or optic-element or display unit can moved in or move out or removed from one hole/position can insert into another hole/position and can turn on and turn off as design or market requirement.
(5) Other $2^{nd}$ functions can add (a) Built-in night time use light so not only has projection Image or light beam to other areas but also the LED unit also is turn on and let people has illumination from light device and illuminated the near-by area of the said LED light, and One of preferred night time use light can be the twinkle stars night light which can use pin-holes image for built-in project light which offer a plurality of the said moon, stars, planet image on top ceiling and all adjacent walls for 3 dimension for room and let people see night time sky full of stars, planets, moon so make people enjoy or fall asleep or not feel alone as co-inventor's (#CC-09) U.S. Pat. No. 7,832,917, (#CC-1) U.S. Pat. No. 8,128,274, (#DD-08) U.S. Pat. No. 7,871,192, (#GG-08) U.S. Pat. No. 8,002,456, (#GG-1) U.S. Pat. No. 8,231,260, (#FF-1) U.S. Pat. No. 8,721,160 and co-pending (#FF-II) Ser. No. 14/275,184, (#FF-III) Ser. No. 14/539,267; all these prior or co-pending cases disclosure the said Pin-Hole image night time use light which is one of the preferred to become $2^{nd}$ Light of the $2^{nd}$ function for add up to above discussed the BASIC-Model of the said current invention for the said LED project light.
(6) Other $2^{nd}$ functions can add any electric or mechanical other functions device
(7) Other $2^{nd}$ functions can add which may add charging device such as USB charger related device to use USB wire and Plug to charging the other electric or electric device which use for computer, communication, consumer electric device
(8) Other $2^{nd}$ function can add power source such as add the outlets—to supply power source to other electric or electronic device for computer, communication, consumer electric device while the said LED light is a plug-In conductive-metal piece without or with wire into outlet type, so it can offer at least one of outlet receiving ports to connect with LED light prong so can offer AC 120V 60 Hz electric power source though Outlet receiving ports to other device's prong or wired-prong.

Figure 12:
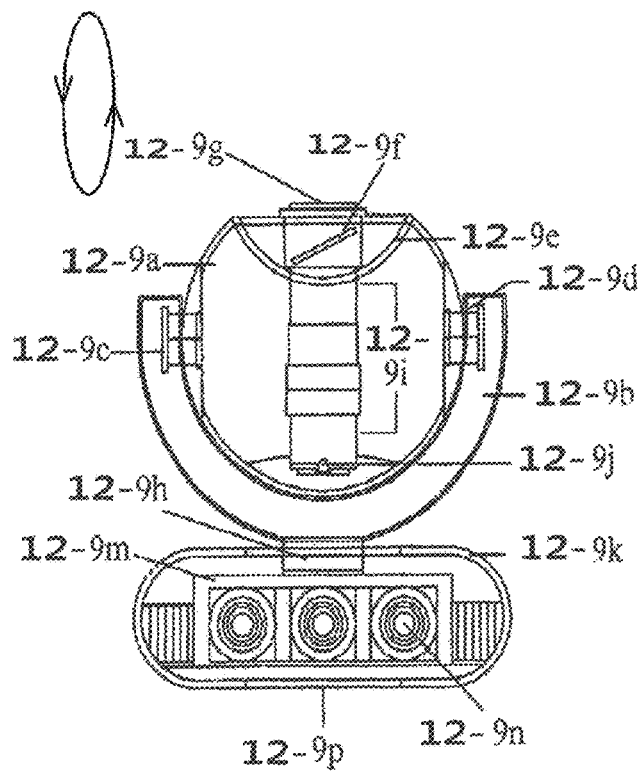
Figure 12A:
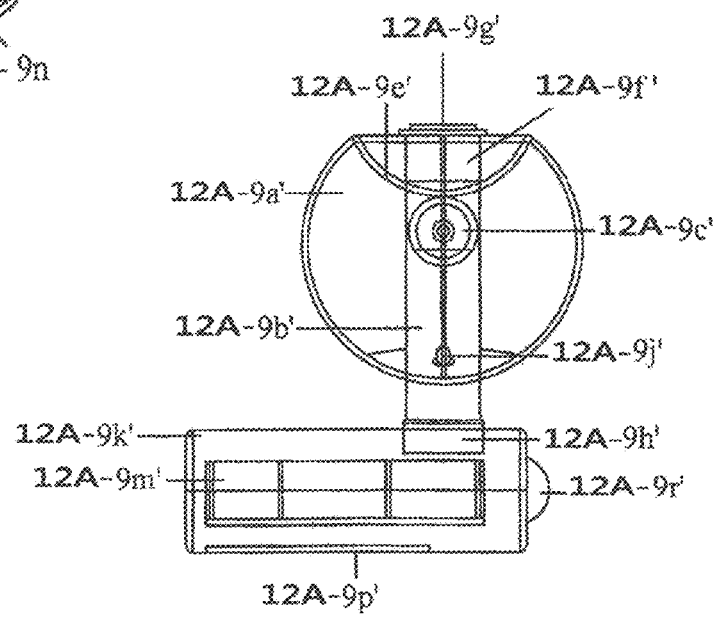

From FIGS. 12, 12A LED or-and laser Project light has DC or AC powered with x-y-z axis direction change functions.

FIGS. 12, 12A Top housing (12-9a) has Tube-like assembly (12-9i) has focus adjust (12-9f) to adjustable optics lens (12-9g) to change the distance and relation of the said display-unit(s) (not shown) which inside the number 2 or number 3 piece of Tube-like assembly (12-9i) which may on one section/location of the short-elongate tube-like tube or holder or frame or base so easily to assembly and still can assembly into whole-elongate tube-like by multiple short-tube pieces and each short-tube may install one parts and each of the short-tube can be press-tight or physic-tighten to prevent light-beam leakage out and also save a lot of installation for the parts & accessories such as Optics-Lens, display-unit which need very accurate position if has any mm distance different will cause bigger-size image is mess and not sharp image or even cannot readable for what image or data.

The said top oval-shape housing (12-9a) can rotating unlimited circles to vertical axis and the Frame (12-9b) also can rotating on horizon axis for unlimited circles by elastic-conductive contactor (12-9d) or the Neck (12-9h) so can make the LED image projection to anywhere of 3 dimensional space with adjust angle, position, orientation, size, sharpness and adjustable focus.

The FIG. 12A FIG. 9-1 is show the side view for The FIG. 12 and both preferred embodiment is powered by DC power source in all kind of type available from market place and has details listed some type on above discussion.

Figure 13:
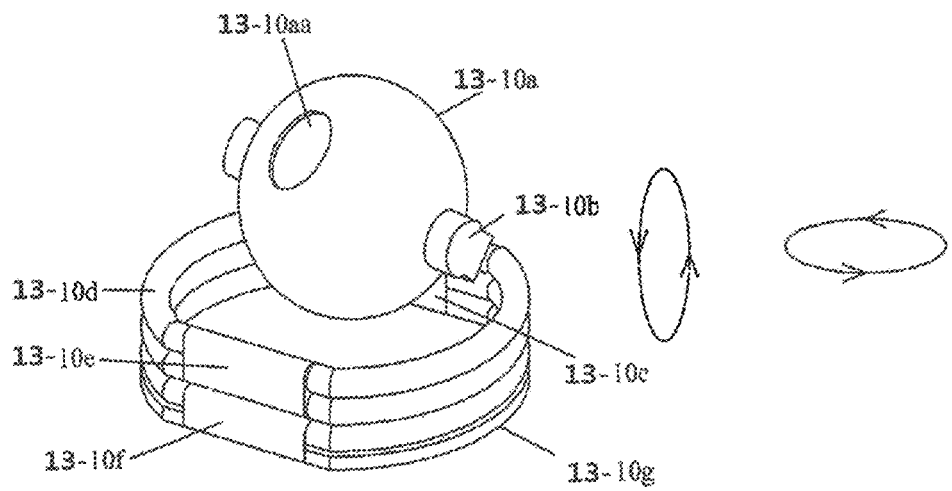
Figure 14:
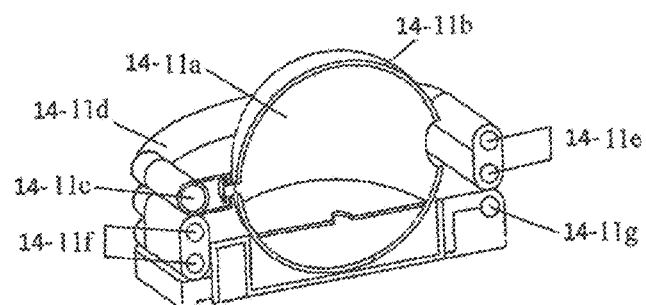
Figure 15:
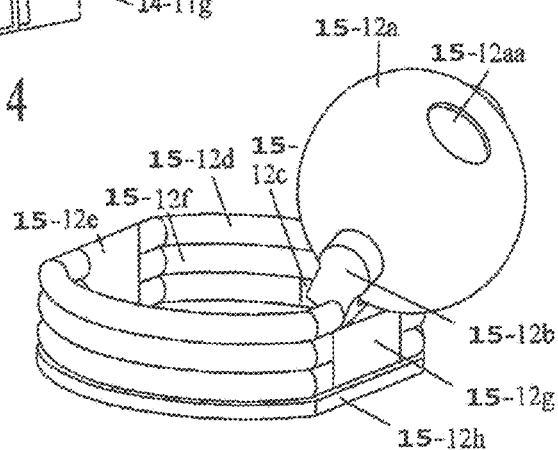
Figure 16:
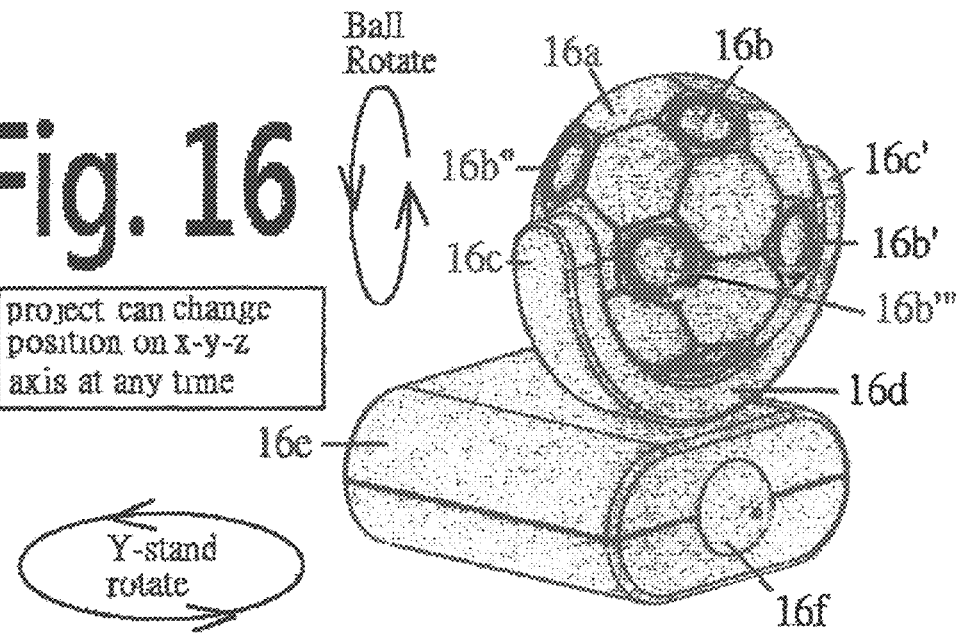

From FIGS. 13, 14, 15 show the LED or-and Laser project light has joints, arms, bars, pins, rings to have transforming function(s) to change shape for indoor or outdoor light application.

From FIGS. 13, 14, 15 show other construction for the LED or-and Laser Image projection light which has transforming features of the shape so can allow people to use for many different works. From FIG. 13 show the LED light has a base (13-10g) which has all electric parts, power source (Direct Plug-in AC or DC power source), circuit, IC, switch, sensor, control-within the base and The base (13-10g) also has certain weight or enough parts has enough weight so can let the each Ring to extend separated to linear shape or fold back to original shape for different work needed.

The ball housing (13-10a) has 2 elastic-conductive contactor (13-10b) to allow the ball can rotating on vertical axis for unlimited circles and deliver the electric signal to inner LED (not shown) and make the LED turn on as above details description to project a big size, colorful image to be seen.

The FIG. 14 shown the each ring (14-11d) has the empty or hollow tunnel (14-11c) and allow the conductive wires (14-11e) (14-11f) can passing through the tunnel (14-11c) from base to the top Ball housing (14-11b) and get into inner space (14-11a) to connect with LED (not shown).

Figure 56:
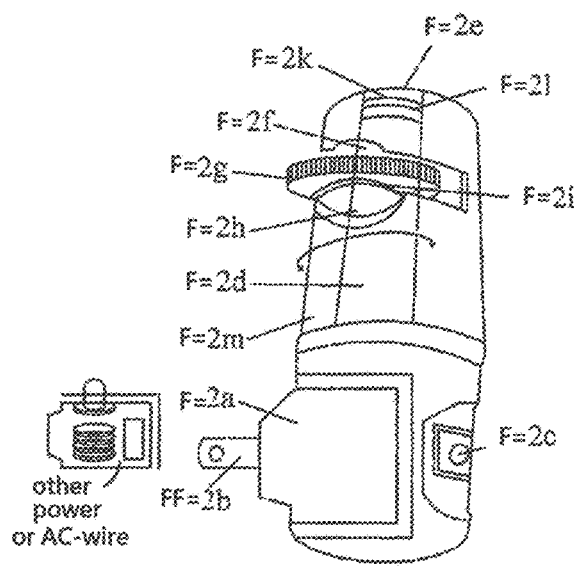
Figure 57:
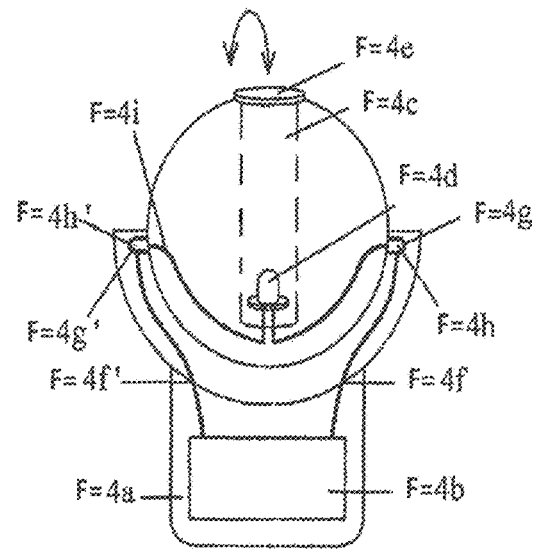
Figure 59:
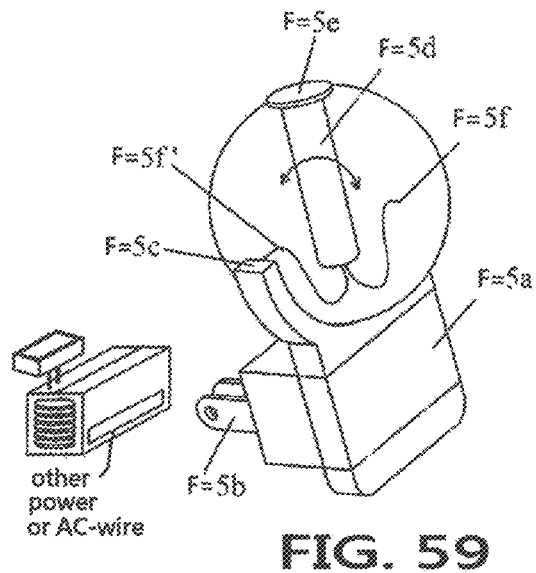
Figure 60:
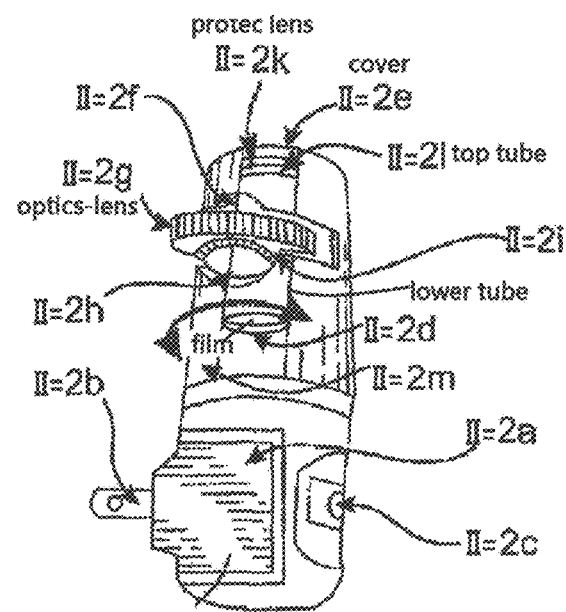
Figure 61:
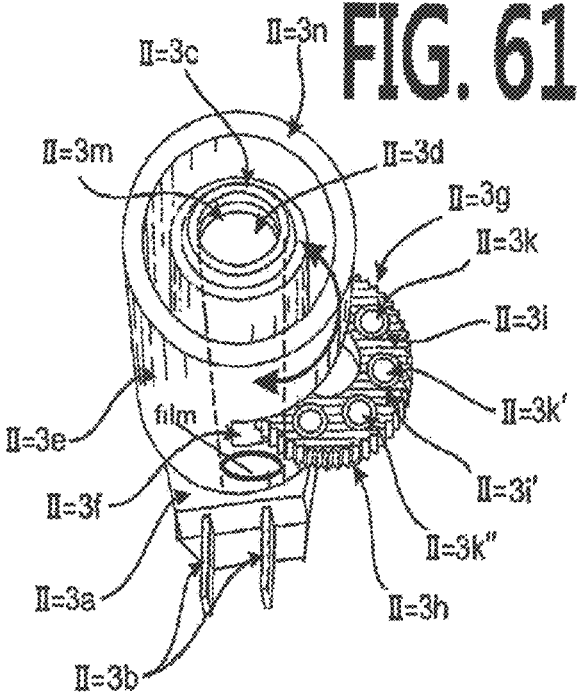
Figure 62:
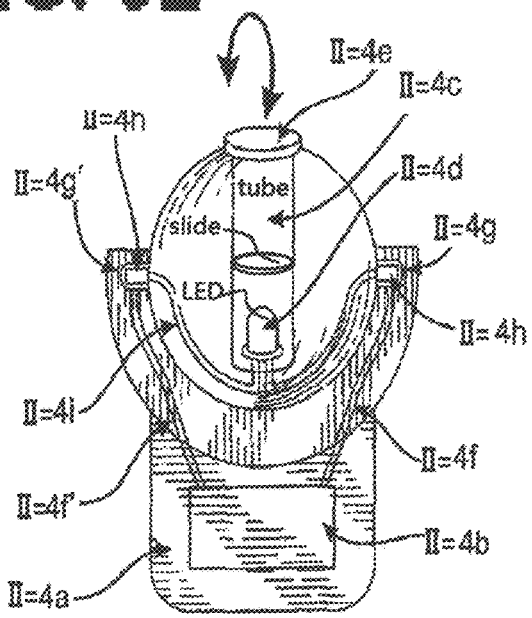
Figure 63:
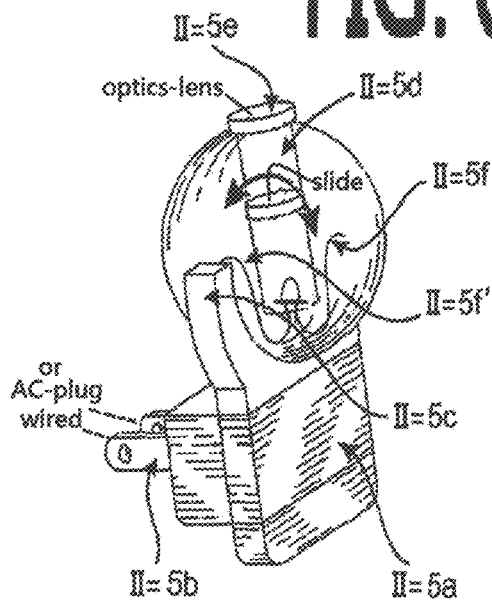
Figure 64:
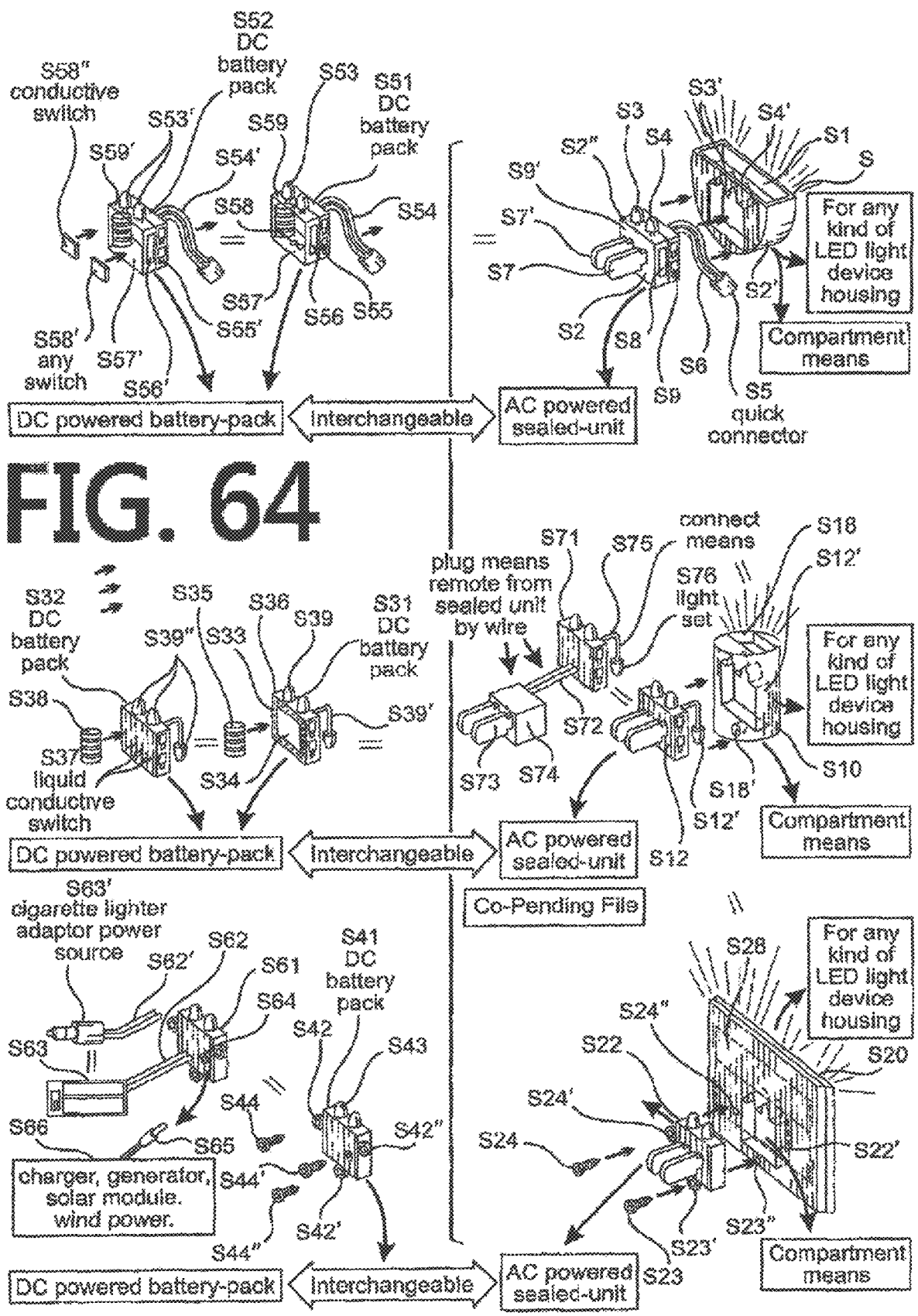

The each ring (13-10d) (14-11d) (15-12d) (15-12f) has joint-piece (15-12g) (15-12e) (14-11c) to join to different rings together and can change the angle from parallel or overlap position up to 180 degree so it can make 2 rings relation change from top-n-low to change to side-by-side, so the said indoor or outdoor application of LED or-and Laser project light has transformer features for reading light or torch light or hand held for indoor or outdoor use for different power source may be for (a) Direct plug-In FIGS. 39, 45, 4, 6 or-and
(b) DC powered as FIGS. 1, 2, 3, 11, 12, or-and
(c) Interchangeable power source as FIGS. 56, 59, 64, or-and
(d) Wired light as FIGS. 39, 43, 45, 49, 50, 51, 53;
may selected from all the different power source which disclosure by current invention drawing, Figure, content, text, words, vocabulary, sentence, meanings. It is appreciated that all the concept, drawing, design, features, function, text, disclosure of above discussed all still fall within the current invention's claims and coverage.

From FIGS. 16, 17, 18, 19 show the LED light has plurality of moveable, replaceable, changeable project-assembly or kits to fit into housing pre-arranged circuit-holes From FIGS. 16, 17, 18, 19 disclosure preferred embodiment which has a ball housing (16a) has plurality of the pre-arranged circuit holes (16b), (16b"), (16b'''), (16b"") which can load the project-assemblies—has functional kits hereof called real (17b') or same shape project-assembly but has no function kits hereof called fake (17b) into said holes to make the desire (a) Number of real project- and Fake project- (b) where need the project light beam or image from one housing LED or-and Laser project light (c). This is not same as the FIG. 8 which is one LED light has more than one housing and each housing has one projection light FIG. 8.

Figure 17:
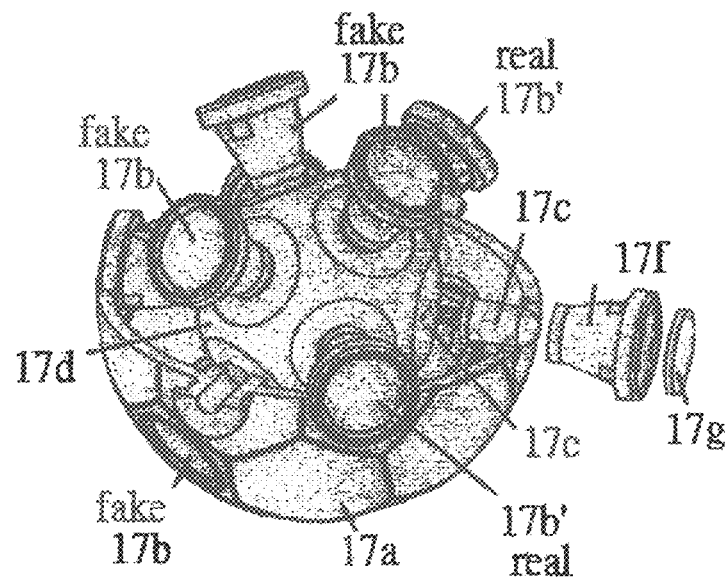

FIG. 17 show the real (17b') and Fake (17b) project-assembly which has its own LED, or/and display-unit (depend on want image or only light beam), and optics lens to make the said image or light beam project out from said Real or fake project assembly to a distance away from the LED light. The real and fake each project-assembly has certain assorted combination for color, brightness, image and each one can be movable, replaceable, changeable to others to fit into anyone of the said arranged circuit-holes which already has the electric contactors (17e) arranged and can allow LED's electric contactor (17c) to be connection and delivery the electric signal to said each real project--to work as requirement.

Figure 18:
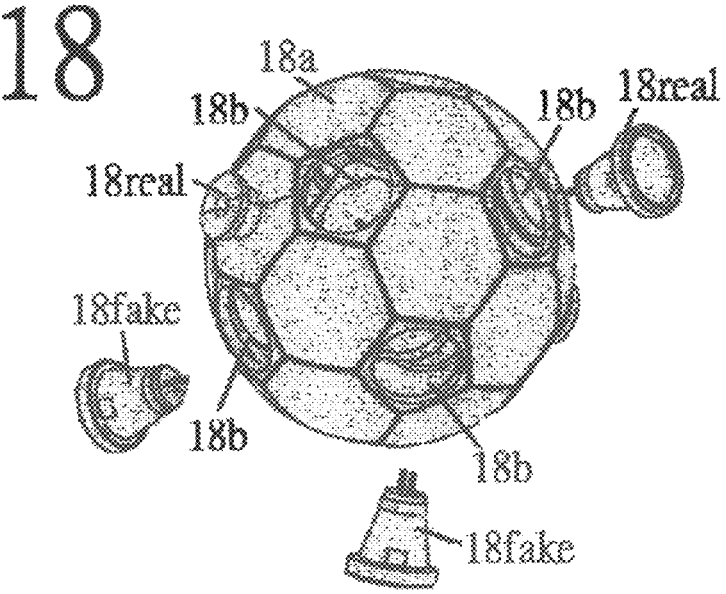

The FIG. 18 shown the pre-arranged circuit-holes (18b) can fit all same size, shape or universal real (18 real) or fake (18 fake) so can keep the good shape of the top ball housing, the preferred ball shape design is a soccer or football shape or any other shape which decide by market.

Figure 19:
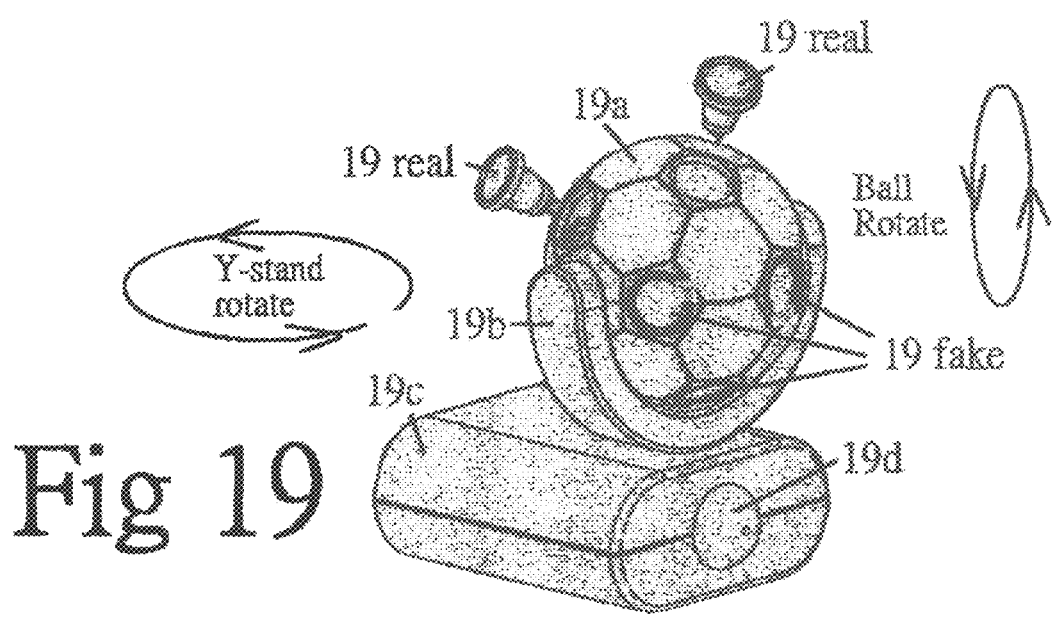

The FIG. 19 show the one of preferred for the (a) AC powered LED light has prong or plug-wire or (b) DC powered LED light has battery pack or USB wired or other energy storage-kits or (c) interchangeable power source for AC-sealed unit and DC-Power pack; for the preferred one LED light has movable, changeable, replaceable real and fake project-assemblies of the said LED image or light-beam or both of image & light-beams for different light performance of the said projection light.

Figure 20:
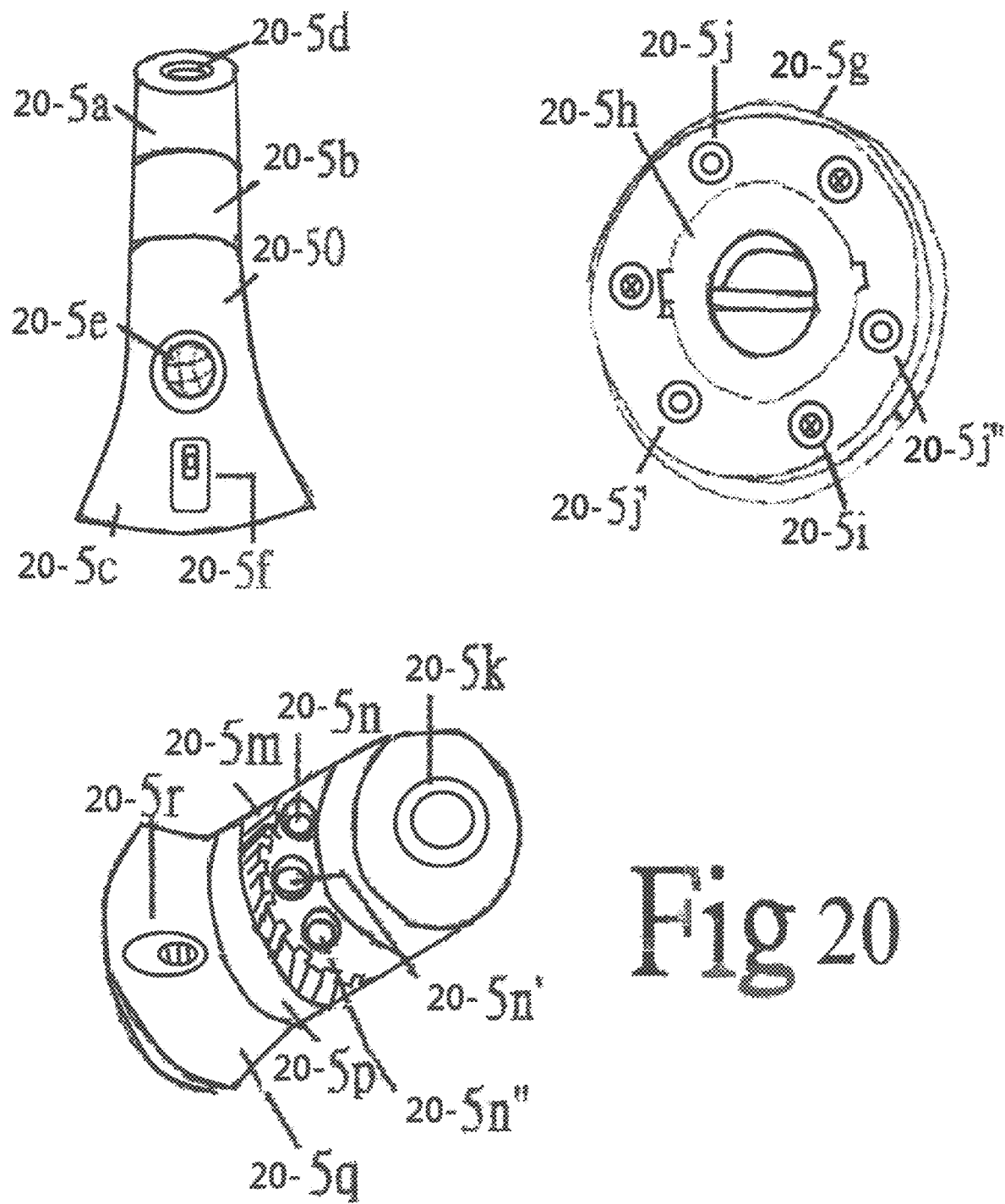

From FIG. 20 LED or-and Laser projection light has plurality LEDs for more than one functions (1) projection (2) Build-in Night time use light, power fail light, emergency light, remote control light, blue tooth light or other function $2^{nd}$ light or more lights.

From FIG. 20 show the One LED light (20-50) has plurality of LEDs to has different functions for one LED light which has one LED to offer the project-light and bigger-image come out from the opening (20-5d), one LED of plurality of LEDs for night time use Light and the light beam or image or glow character come out from side-center-wall or center-section-housing (20-5b), other one LED located on base for power fail light (20-5j), other one LED located on base for remote control light (20-5J') (5 j' of FIG. 5), other one LED located on base for Bluetooth light (20-5J") (5 J" of FIG. 5) or any combination for $2^{nd}$, $3^{rd}$, $4^{th}$ different light function for different each LED and all build in one LED light, the preferred how many function needed depend on market requirement and the each different light functions has its relative circuit and control or sensor or switch or IC to make the functions same as predetermined.

From FIG. 20, the LED light (20-50) has the top portion (20-5a) for image or light-beam projection function and has project related 3 basic parts including LED and object/slide/film/display-unit and optics-lens and assembled within or fit with tube-assembly. The $2^{nd}$ LED as built-in Night Time use Light to illuminated the 360 degree of housing light's transmittable parts to viewer on location of middle part's wall (20-5b) which may only has light output or image glows or character lighted image which light beam are supplied by the said $2^{nd}$ LED of LED light (20-5b) and the control (20-5e) for variety selection from market available piece may on base housing (20-5c) and $2^{nd}$ control (20-5f) can be also install on the base (20-5c) to connect with sensor, power fail circuit, blue-tooth circuit, remote control circuit, infra-red circuit, wireless control circuit, timer circuit, Time delay circuit, IC in all kinds models, or other control circuit available from market place.

The base (20-5c) of the unit has the anti-skip pad (20-5i) and more LEDs (20-5j) (20-5j') (20-5j") (20-5j'") for base illumination has certain functions selected from any combination for night light, power fail light, motion sensor light, emergency light, Bluetooth light, remote control light, sound active light has such as color-changing, fade-in or fade-out, chasing, random, sequential, or other function from market available LED light functions.

Figure 21:
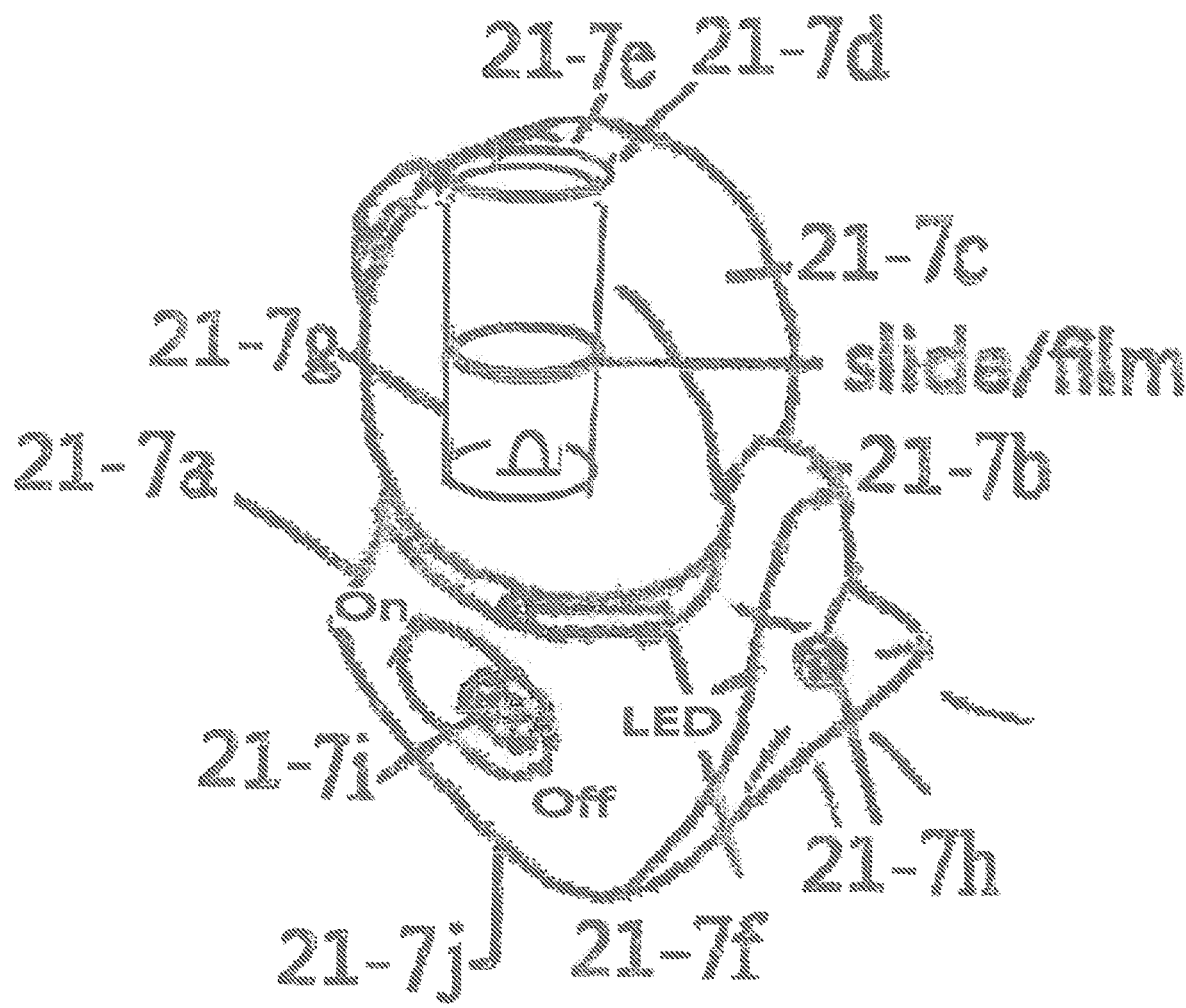

From FIG. 21, shown the similar function of the FIG. 20 preferred embodiment which has details for One of LED(s) (21-7g) as project light source on one end of the tube (21-7d) and top of the tube (21-7d) (7d of FIG.

7) has one optics-lens (21-7e) which offer the image magnify or refraction function to make the Tiny-Image of display-unit (not shown) to become super bigger-size image. The Housing (21-7a) has more LED (21-7h) (21-7f) to offer other illumination for near-by area and not belong to the project-light because it only offer the near-by illumination which the light brightness of light beam is start from LED and spread out to nearby areas, not like project-light which are the light brightness or image is to be seen only on the far-away areas and not start from LED light source location.

The definition for current invention and meaning of (Emit light or Glow-Light) and (Project Light) as below:
1. (Emit Light or glow light)—Light been seen from light source location to nearby area and graduately darker and darker because light brightness is reverse radio of 2 times of distance. V S.
2. (project light that the light source emit light beam is not seem near the light source area, but it is passing though optics-lens and let people see image or light beam only ON far-away or remote-away distance so image or light beam be seen is not from Nearby areas).

Furthermore said (Emit or Glow or lighted) lack of the following than current invention including
(1) Light beam do not passing though Optics-lens such as Convex Lens or Concave lens or any combination of market optics-lens type
(2) Light do not get together to emit into anti-leakage tube or anti-leakage housing.
(3) Light beam majority is leakage out and even passing though some openings, holes, cutouts under PIN-HOLE IMAGING theory, the image is mess and not clear, More bigger size of image will get more worse image presented.

So the definition for (Emit or Glow or lighted) is totally different for (Project Light) on concept, physic theory, parts & Accessories, construction, image forming components, image quality . . . etc.

From FIG. 21 also show the control (21-7i) has multiple selections from OFF, Auto, ON different function basing on the inner circuit or other electric control-design, or IC to get the each section with proper effects as pre-determined while designed.

From FIG. 21, the LED light (21-7a) has rotatable top ball housing while it rotated also make the said Optics-lens (21-7e) and tube-assembly (21-7d) rotated accordingly so can change image or light beam projection direction even the base (21-7b) (7b of FIG. 7) is not rotatable. However, the Earlier discussion how to make 3 Dimensional space for image or light beam projection, so do not discuss again here.

For light beam projection which the light beam cannot seen on the LED light unit. The lighted areas to be seen on the Remote-away or Distance-away areas only from the LED light unit. This definition is Projection which equivalent is (Throw-away) Image or (Throw-away) lighted-areas to distance-away areas, surface, locations, place same as co-inventor's (#QQ-10) U.S. Pat. No. 8,408,736 all details discussion, drawing, figure, embodiment, details description, text, skill, claims, construction should be still fall within the current invention scope and claims and not limited. The related of (#QQ-10) U.S. Pat. No. 8,408,736 drawing as below FIGS. 25 to 38 for variety single light-beam projection or multiple light beam projection with any type of electric functions which available from market place or/and functions are covered all above discussion.

Figure 22A:
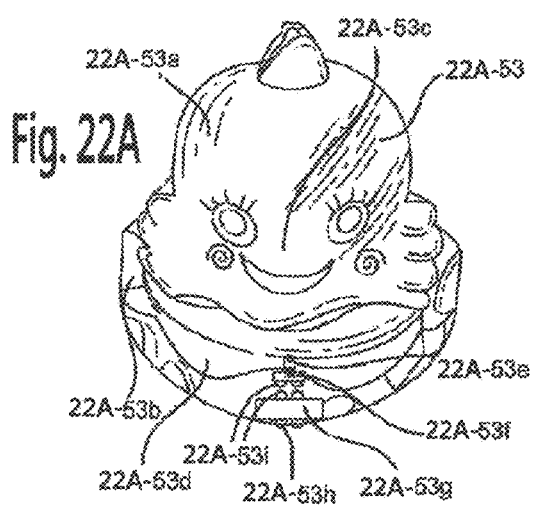
Figure 22B:
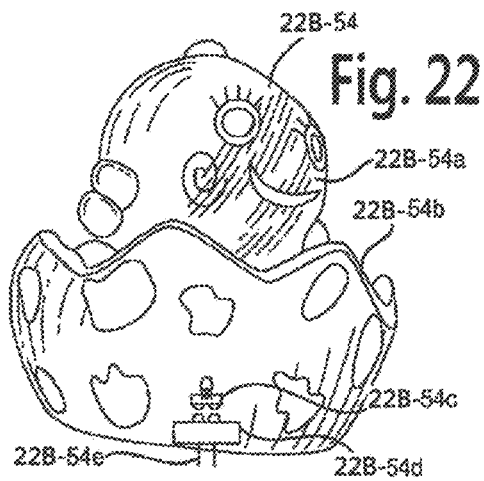
Figure 22C:
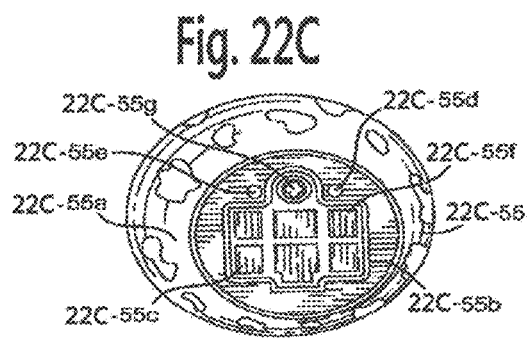
Figure 22D:
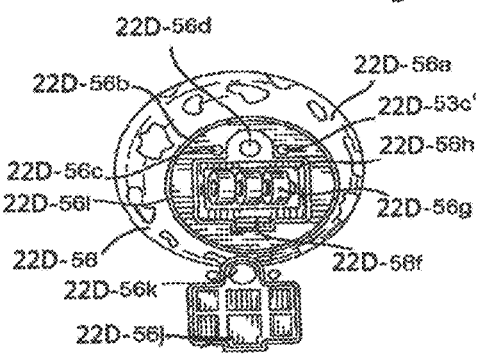
Figure 22E:
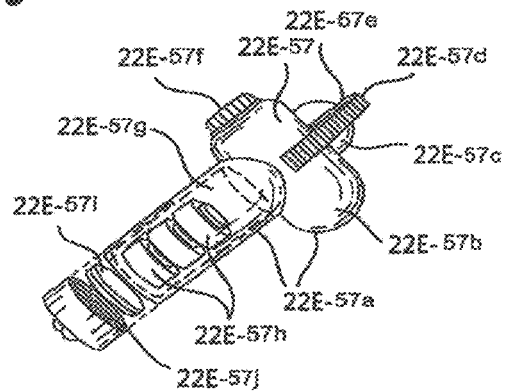
Figure 22F:
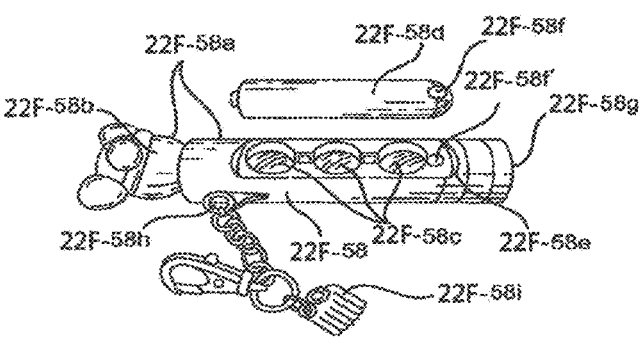

From FIGS. 22A, 22B. 22C, 22D, 22E, 22F show the compact battery pack or AC power pack From FIGS. 22A, 22B. 22C, 22D, 22E, 22F show the different DC powered FIG. 22A (53g) or AC powered FIG. 22A (54e) LED light FIG. 22A (53e) FIG. 22A (54c) (53) has project function (not shown) or-and build-in $2^{nd}$ light function for preferred toy construction for said variety indoor or outdoor lighting which may also has the co-inventor's interchangeable power source to change the power between the (DC Battery Power pack FIG. 22A (53g) and (AC Sealed-unit with Prong mean FIG. 22B (54e). The battery power pack FIG. 22C (55b) design can make it very small FIG. 22D (56h) with limited batteries power FIG. 22D (56g) incorporate with timer circuit (not shown) for each trigger only FIG. 22A (53g) and FIG. 22B (54d) so can make the whole preferred toy or other application such as outdoor lighting housing FIG. 22A (53a) and FIG. 22B (54a) be illuminated like FIGS. 22A to FIGS. 22D, the super compact battery pack FIG. 22A (53g) used so the inner space been not occupied by Bigger power pack so can use one LED FIG. 22A (53e) and FIG. 22B (54c) to make the whole housing FIG. 22A (53a) and FIG. 22B (54a) glow-up without see the some block-' shadow inside and that areas become DARK.

From FIGS. 23 to 38, The said LED or-and laser light housing has plurality of project-assembly to project plurality of image or-and light beams to plurality of areas.

From FIGS. 23 to 26 show the details construction to
1. project the light beam or colorful image or both to far-away distance area(s) for illumination or project the said image or-and patterns, or;
2. offer regular light beam emit out from LED light location to near-by areas for illumination The FIG. 23 shown the preferred LED light top view, The FIG. 24 show the multiple LEDs and has its own function, purpose to make projection for far-away areas or emit light to nearby areas from one of LED light unit. From FIG. 25 show how to make the top ball housing (25-3) to make rotating by two ears (25-3b) (25-3b') for top ball, and the frame (25-3c) (25-3c') rotating by neck (25-3a) so can make the image output-end of project-assembly also can rotate in 3 dimension to project image or light-beam to remote away distance.

The details construction of preferred projection function as above discussed so many times so not discuss again.

From FIG. 23 to FIG. 38 This is co-inventor prior art (# QQ-10) U.S. Pat. No. 8,408,736 which has all other details for this features. From FIG. 26 can see the detail construction for the basic LED light has project function has the major parts including:
a. Tube-assembly which has LED-base or holder (26-43) with wall or edge surrounded to joint with top $2^{nd}$ holder or tube or base for display-unit (26-40) and joint with top project refractive-lens (26-4n) which is above the top-tube-assembly or fit within the highest housing-opening (26-4i) (26-4i') with a refractive-lens cover to hold with the lower tube-assembly toppest-tube or holder or base or tray.
b. LED(s) which install within the wall-surrounded tube-unit or tray or base or tray and other with other-units of tube-assembly or-and housing-parts to prevent light beam leakage out.
c. Object/Display-unit/Slide/Film or changeable digital data displayer or screen in all kind to fit into or install within the wall-surrounded tube-unit or tray or base or tray and other with other-units of tube-assembly or-and housing-parts to prevent light beam leakage out.
d. Magnify optic-lens which install on highest housing opening or above the top of the highest tube-unit of said tube-assembly, and has a lens-cover to hold or join with the said one tube-unit of tube-assembly or with the parts of housing with wall-surrounded to prevent light-beam leakage out.

With optional parts selected from

Option 1: housing opening for image output end
Option 2: Housing cutouts for change, replace, switch, install for object's disc, roller, holder
Option 3: housing for any geometric-shape for all application for outdoor or indoors application LED or-and Laser light device.
Option 4: Circuit to drive LED to turn on and turn for DC powered LED light or AC powered LED light for indoor or outdoor applications with different conductive-metal-piece without or without wire.
Options 5: Control circuit such as remote control, infrared, motion sensor, photo sensor, sensor circuit, power fail circuit, emergency light circuit, or switch.
Options 6: Other plastic, conductive, resilient conductive, electric parts & accessories.
Option 7: $2^{nd}$ or $3^{rd}$ or $4^{th}$ functions circuit and kits.

From FIGS. 27, 28, 29 disclosure the one DC or-and AC power LED or-and Laser light (27-5-1)(28-6-1) has at least one of the projection-assembly such as (27-5b) (27-5d) (28-6b) (28-6d) and one of the project-assembly (27-5b) (27-5d) (28-6b) (28-6d) can be moved to change relative position with the fixed project Light (27-5b) (27-5d) (28-6b) (28-6d) so the 2 of the projection light can has certain relative position or orientation for different application on different locations. The motion sensor LED light (27-5-1) (28-6-1) can have $1^{st}$ one to act as fixed project-assembly (27-5b) (27-5d) (28-6b) (28-6d) aim to the front door entrance and set the $2^{nd}$ one of project-assembly (27-5b) (27-5d) (28-6b) (28-6d) for the living room or dining room, so while people get into house on door-entry can see details of the door entry areas and it also can see details of the $2^{nd}$ place including the living room or dining room or stair. So this is very useful and practical for people have one light to make image or light-beam for more than one place for image or illumination.

From FIGS. 25, 26 can see How to make the more than one of the project-assembly (27-5b+27-5d) (28-6b+28-6d) in one top-housing assembly (27-5)(28-6) and can change the each project-assembly (27-5b+27-5d) (28-6b+28-6d) relative position.

From FIGS. 27, 28 can see the plurality of LEDs on the base housing (27-5-1) (28-6-1) for all kind of light function as required including power fail, motion sensor, blue-tooth, infra-red, photo sensor, torch light, night light, twinkle star lighting . . . . As above discussed all kind more than one project-assembly in one LED or-and Laser project light, and more than one function.

From FIG. 29 the inner half-ball (29-7-2) has project--assembly (29-7d) well install and sealed by top half-ball (29-7-1) and rotatable by the 2 ears (29-7b) (29-7b'). The inner-half ball (29-7-2) has one arc-cutouts (29-7e) which allow the project--assembly (29-7d) to fit within and move forward or backward around 90 degree for each direction so can change the relative position of the said project--assembly (29-7f) (7d) and (29-7d) (7f). The outside half-ball (29-7-3) (7-3) also assembled with the 2 ears (29-7b) (29-7b') so make a finished top-housing with 3 half-ball and 2 project--assembly.

From FIGS. 30, 30A, 30B, disclosure the LED light (30-8) has 3 project--assembly (30-8a) (30-8b) (30-8c) and only project--assembly (30-8a) is fixed on the housing (30-8-2) and the movable/changeable position project--assembly set (30-8b) (30-8c) has horizon moving arc around 90 degree for each directions so can have at least 3 positions, locations, areas been projected the images or light-beam. The LED light (30-8) also has plurality of other LEDs for make different light functions which may as above discussion all market available light functions with preferred control, sensor, switch device. The FIG. 30 shown the LED light (30-8) on the desktop and has image or light beam project to top and two horizon areas. The FIG. 30A shown the LED light hang, install, fix on the walls to has opposite wall and top ceiling and floor image or light-beam illumination. The FIG. 30B shown the LED light is fix, install on top ceiling or top of door to make image or light beam for Floor or walls illumination.

The FIG. 31 disclosure details construction how to make the 3 project-sets within one of top housing. The one project--assembly (31-9d) with preferred tube length so will not touch or blocked to other project sets (31-9b) (31-9c) and fit within the inner half-ball. The $2^{nd}$ and $3^{rd}$ project-set (31-9b) (31-9c) also fit within the inner half-ball and covered by the $2^{nd}$ and $3^{rd}$ half-ball (31-9-2) (31-9-2') where has the arc-cutouts (31-9-4) (31-9-4') to allow the project-set (31-9b) (31-9c) to change position while the move the inner-half ball. The 2 arc-cutout half-ball assembled with the frame (31-9-1) (31-9-1') by 2 ears (31-9-5) (31-9-5') (31-9-6) (31-9-6') with the base (31-9g) and the base has one more LED (9h) to emit light to the top ball housing for glow in the dark.

The said 3 project-set (31-9d) (31-9b) (31-9-2) (31-9c) can project image or light-beams for 3 locations so can make user to have one light for 3 areas illumination or image(s). The each project-set can has its own focus adjustment construction so can make the said image or light-beam projection has nice, clear, sharp, right size as requirement.

The unit can be powered by the DC or AC powered with desired control, switch, sensor kits to help to get desired functions.

From FIGS. 32 to 38 has very detail notes on each drawing to teach each features, each control, switch, trigger device and preferred application, design.

Figure 32:
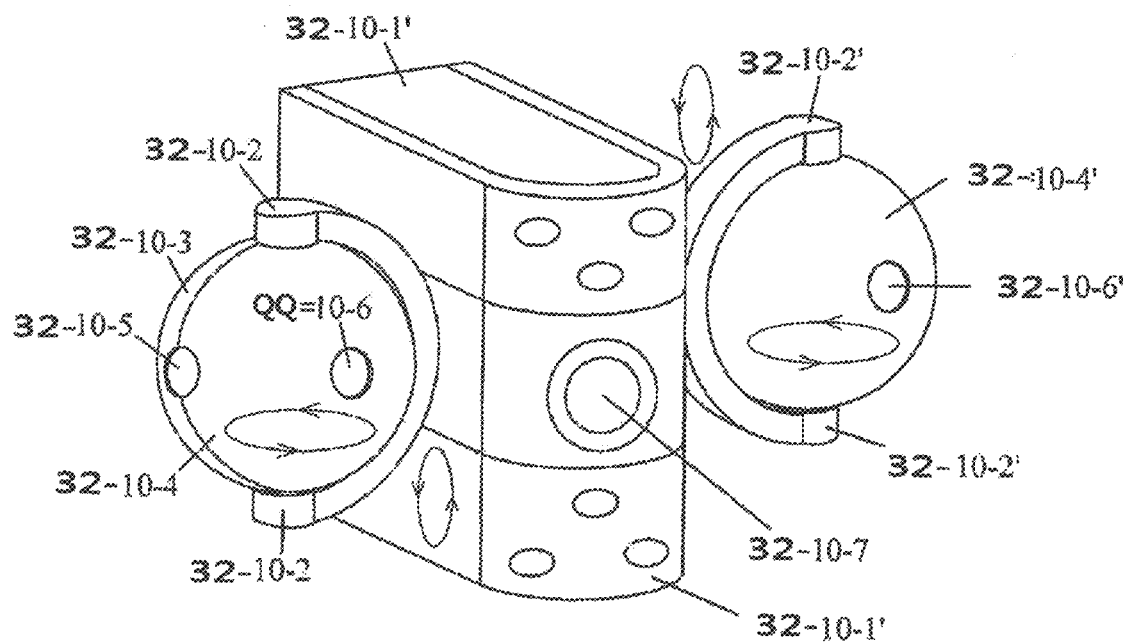

From FIG. 32 the power source can from any type available from market place. The sensor (32-10-7), control (32-10-7), switch (32-10-7), trigger (32-10-7) can be any type available from market place to make the LEDs (On front of the surface which shown at least 6 LEDs) and each LED may has its own functions such as power fail, emergency light, night light, flashing light, infra-red light, blue-tooth light. Remote control light, motion sensor light. The project-set (32-10-5) (32-10-6) (32-10-5') (32-10-6') can also work for light source for Security light like Zenith company did while the LED inside the Project-sets use high power LED with super brightness.

From FIG. 3, The same as FIG. 32

The difference for all these design and housing and installation location such as FIG. 32 design good for wall, fence, post, bar installation.

Figure 33:
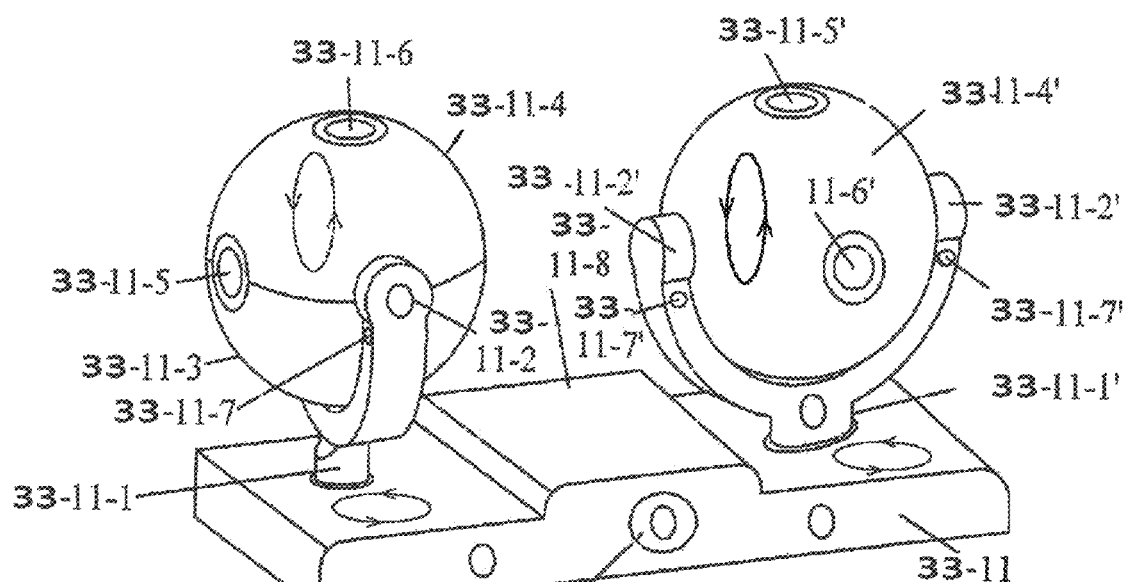
Figure 34A:
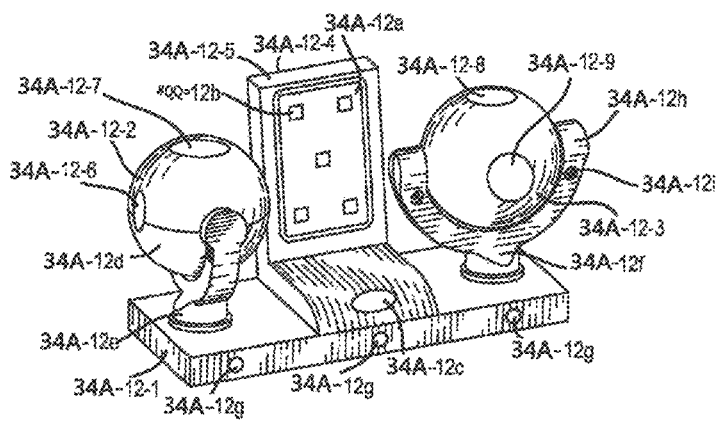
Figure 34B:
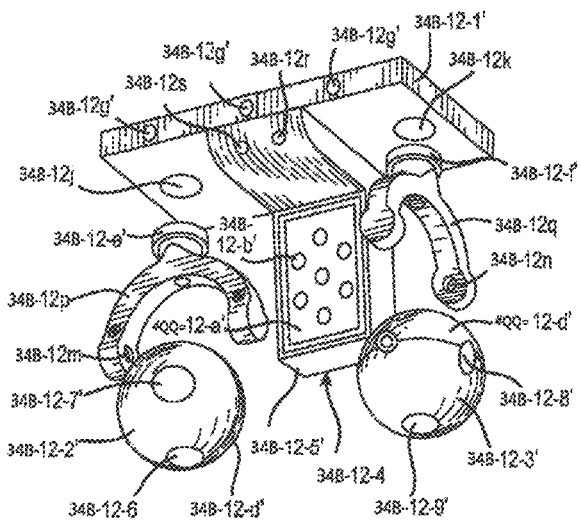
Figure 35:
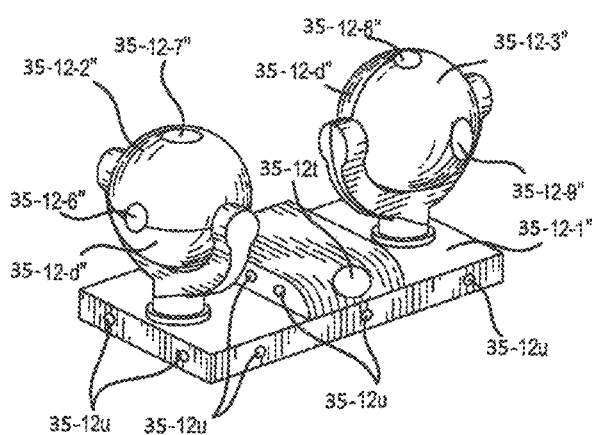
Figure 36:
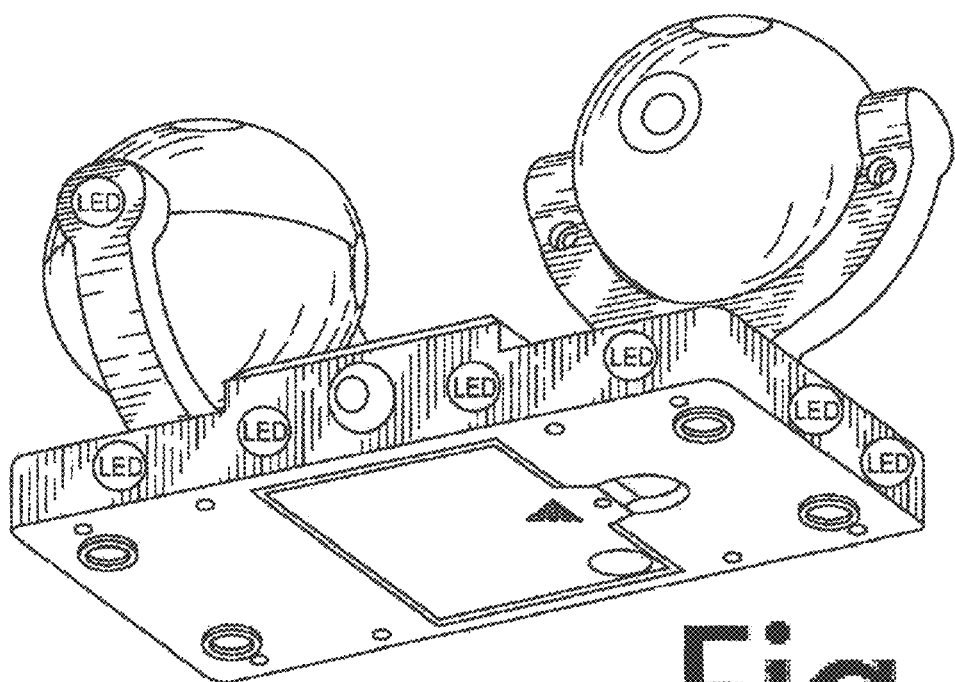
Figure 37:
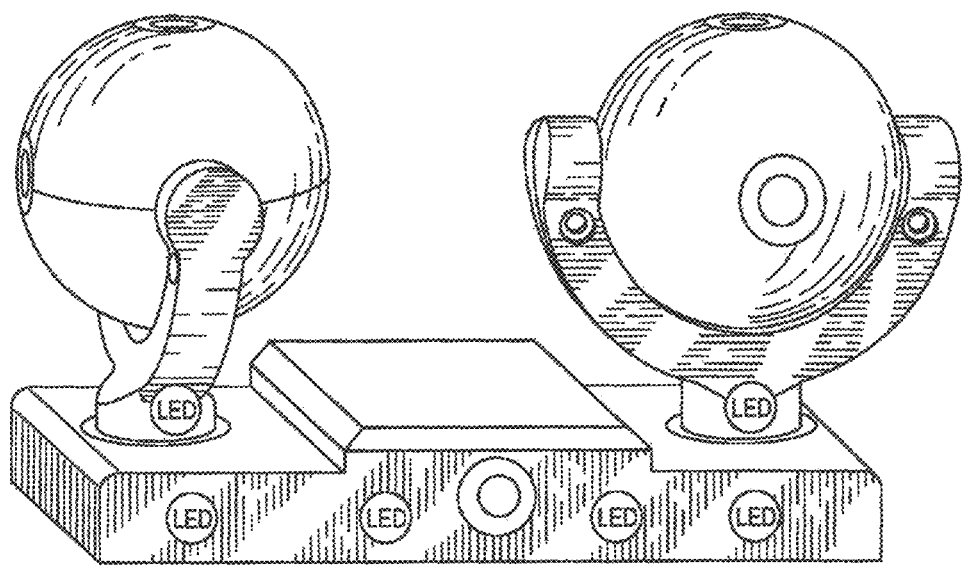

The FIG. 33 is good for surface top installation.

All other features same and offer people more than one project-assembly to make more than one (Actually this maybe more than 6 project light and 4 other LEDs for different functions lighting.

From FIG. 34A and FIG. 34B and FIG. 34C and FIG. 36 and FIG. 37 FIG. 38 all drawing teach the other design and housing construction for all possible or other functions as the brief notes on each drawing.

Figure 38:
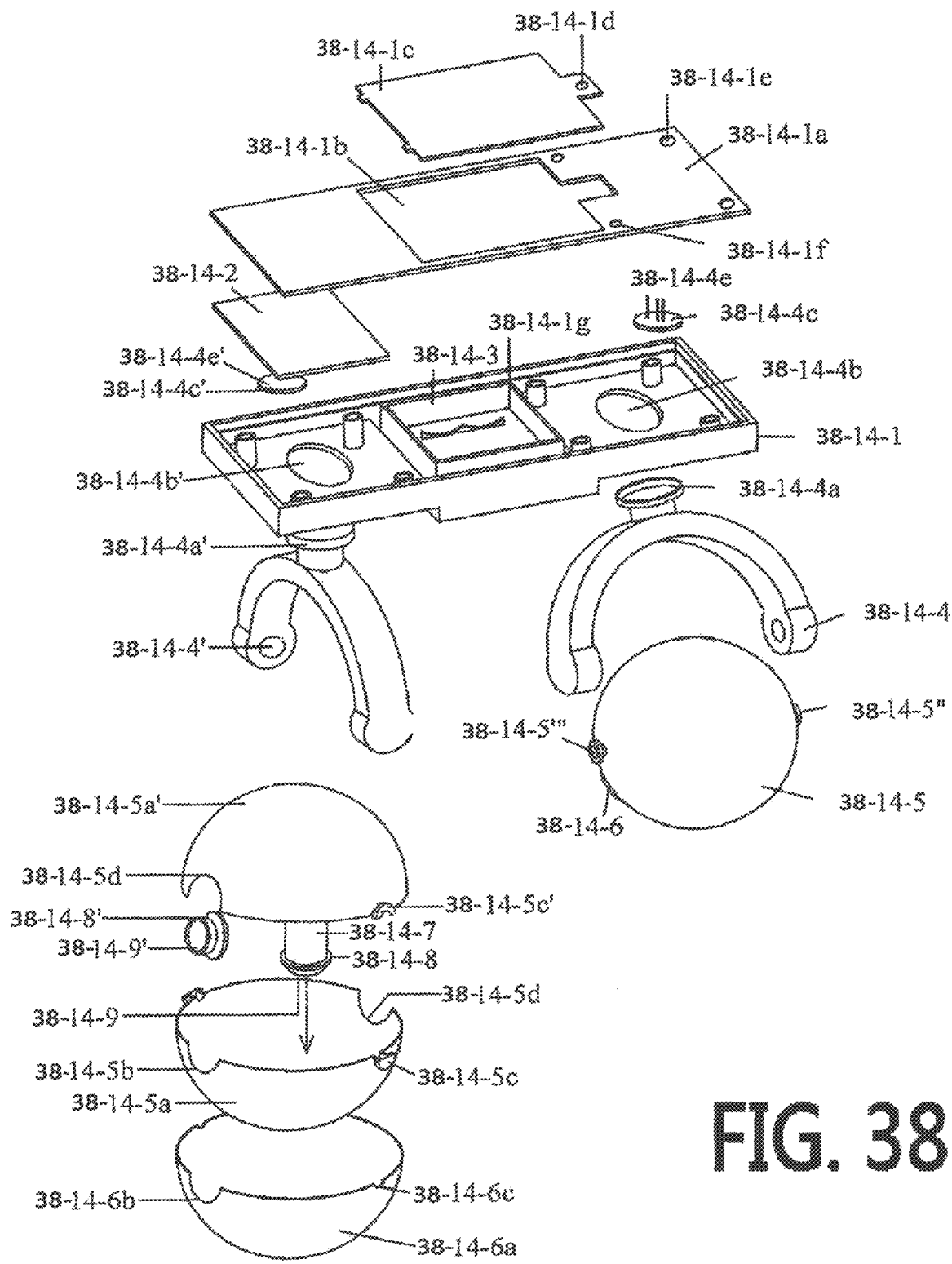

From FIG. 38 show the details construction for one of the DC or-and AC Power LED or-and Laser light has 2 ball housing (38-14-5a) (38-14-5a')—and its own frame (38-14-4) (38-14-4') and neck (38-14-4a) (38-14-4a') and ball housing, frame, neck all can moveable or rotating. The Base (38-14-1) has all control, switch, sensor, remote control, wireless transmitter and receiving parts, blue-tooth, wife connection to make the said LED or-and Laser light can has more than 4 project-assemblies and at any time has more than one (Actually is 4 project-assemblies) to make at least 4 locations has image or light-beams. This is more practically than the other any current light device. Not only more than one locations has image or light-beam but also has other LEDs or-and Laser for near-by areas for other functions or more than one functions LED or-and laser light for not only projection for indoor or outdoor application but also can work for other application for having more than one of light beam emit out from said light device on current invention unit.

From FIGS. 39 to 54 are the co-pending filing case (# II-Family) related including (#II-2) U.S. application Ser. No. 13/540,689 filed on Jul. 3, 2012. Publication data US 2012-026-8668 dated on Oct. 25, 2012, Now is U.S. Pat. No. 8,511,877 issued date Aug. 20, 2013 v.s. Current invention U.S. application Ser. No. 12/866,832, Filed on Sep. 21, 2010, so the (#II-2) is still co-pending case, not prior-art;

This is continue in part of (# II-1) U.S. application Ser. No. 13/534,611 filed on Jun. 27, 2012, publication data US 2012/026-8947 dated on Oct. 25, 2012, now is U.S. Pat. No. 8,714,799 issued date May 6, 2014 v.s. Current invention U.S. application Ser. No. 12/866, 832, Filed on Sep. 21, 2010, so the (# II-1) is still co-pending case, not prior-art;

This is continue in part of (#II-2009) U.S. application Ser. No. 12/624,621 filed on Nov. 24, 2009, publication data US2010/0214541 date Aug. 26, 2010, now is U.S. Pat. No. 8,303,150 Issued on Nov. 6, 2012 v.s. Current invention U.S. application Ser. No. 12/866, 832, Filed on Sep. 21, 2010, so the (#II-2009) is still co-pending case, not prior-art;

Same as above listed (#II-2009) (#II-1) (#II-2) issued date, here show these co-pending related drawing as above listed filed date, public-date, issued date v.s. current invention to show LED or-and Laser project-assemblies or project-sets to use for outdoor projection lighting or-and seasonal projection light application including garden light, outdoor lighting, seasonal garden light, seasonal outdoor light, seasonal indoor light, Christmas lighting, light set for built-in or add-on construction.

From FIGS. 39 to 54 also show the different conductive metal-piece without wire or with wire to build the electric delivery from the power-source to LEE or-and Laser project light device as FIG. 39, FIG. 43, FIG. 45, FIG. 46, FIG. 48, FIGS. 49 to 54.

Figure 39:
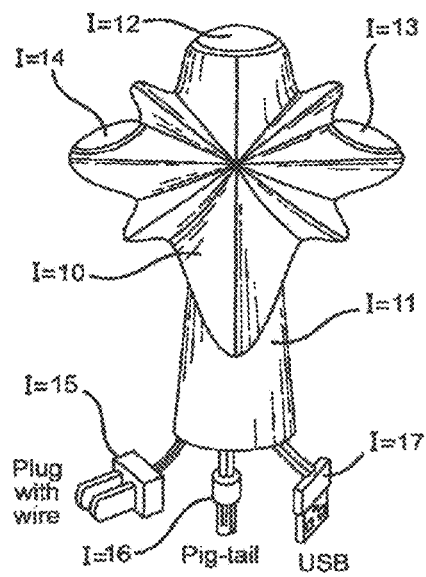

From FIG. 39 Shown the Seasonal Light (I=10) has different power source (AC or-and DC power) and connectors (conductive-metal-piece with or without wire) for indoor or-and outdoor light application including (1) AC plug-wire (I-15) or-and Pig-tail wire-set (I=16) or-and USB wire-set (I-17) or other wires or other conductive-kits as FIGS. 49 to 54 show some of market available conductive-piece for all the said LED or-and laser light device for indoor or outdoor use or applications. Here preferred light is including a USB related-parts (I=17) or Pig-tail related parts, or AC Plug-wire for indoor or outdoor light applications for desired light shape or-and construction to connect with USB, or AC-or-and-DC, or AC power source such as from computer, USB wall power source, USB energy storage power unit, USB backup power unit or AC or-and DC wired power source to supply the electric power to said the one of preferred LED or-and Laser project light device here is a Tree top Lighting (I=10) which is belong to one of the seasonal lighting. The other connect-kit or conductive-metal-piece without or with wire is a pig-tail (I=16) male-connector to connect with light-set's female pig-tail socket to get power from seasonal light set, or light string. Or other connector-kit or conductive-metal-piece without or with wire such as wired-plug (I=15) to get power from outlets including wall outlets or the power strip's outlet or generator's outlets. The project-assemblies or project kits (I=11) (I=12) (I=13) is fit within all kind of indoor or outdoor the seasonal lighting (I=10) including tree-top lighting which has many different designs such as star (I=10), angel . . . etc. The power source can be selected from any type available at market place for AC or DC power source with proper connector to deliver power to the said project--assemblies or project kits (I=11) (I=12) (I=13).

Figure 40:
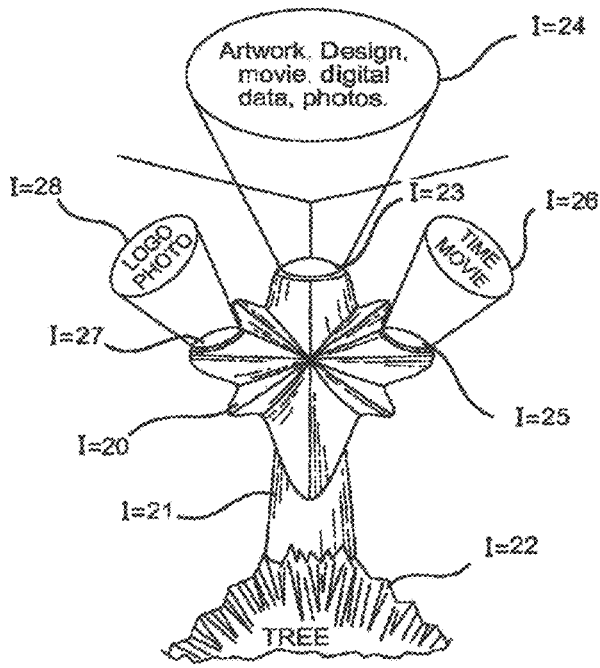

From FIG. 40 Shown the more than one project--assemblies or project kits (I=23) (I=25) (I=27) for one of the LED or-and Laser indoor or-and outdoor project light, here is a seasonal tree top (I=20) which has 3 different project bigger-size image to be seen as (I=24) (I=26) (I=28) which has different (1) greeting words or (2) art design or (3) seasonal drawing with full colorful or (4) changeable or moving or update digital data display to be magnified or refracted by optics-lens so let people enjoy the good bigger-size image shown on the top ceiling (I=24) or adjacent walls (I=26) (I=28) or opposite walls (not shown) or away from the tree location. Again, the power source for these projection tree top as the above discussed for many selections. The project-assemblies or project kits (I=23) (I=25) (I=27) (23) (25) (27) can be any number to add on the said seasonal lighting or seasonal items.

Figure 41:
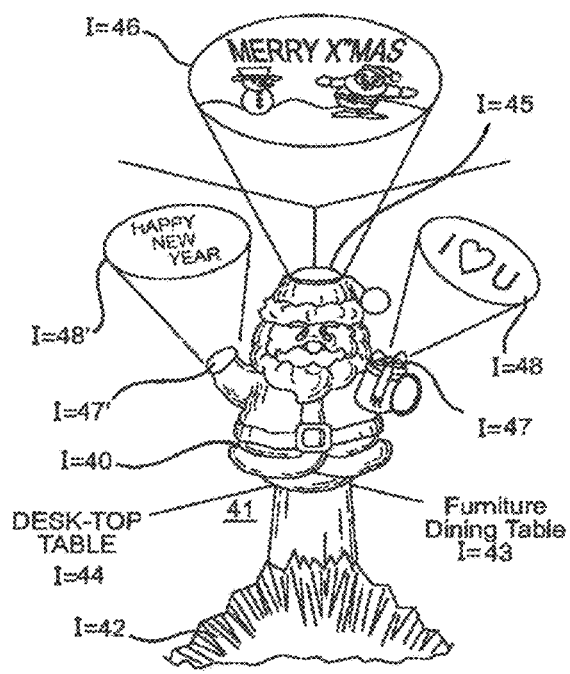
Figure 42:
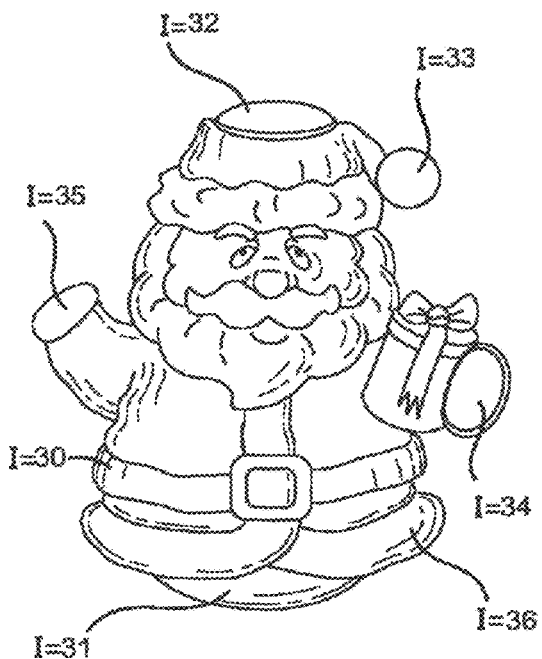

From FIG. 41 and FIG. 42 shown the different seasonal products has different construction has desired 3 or more bigger-size image been projected and shown on remote-away surface from one seasonal lighting (I=30) (I=40) which in a shape of santa-clause which has the two arms (I=34) (I=35) has project--assemblies or project kits and top (I=32) has $3^{rd}$ project-kits. The key for these FIG. 41 and FIG. 42 the current invention is not limited for the LED or-and Laser project indoor or-and outdoor light but also it has very industrial grade for outdoor environment or weather-protection products, It also can apply to all kind of Seasonal products, toy, decorative, common products which people use at certain time. The current invention just add the said project-kits or project-assembly for build-in or add-on into existing lighting or any products can upgrade the simple and traditional products into built-in bigger-image projection unit has good application and increase original product value.

From FIGS. 43, 44, 45, 46 show the different housing design or construction for outdoor or indoor LED or-and Laser project light for everyday applications including AC plug-wire garden light, or outdoor light to project one or more than one image or patterns on the said desired surfaces including ceiling or building or housing parts.

From FIG. 43 show the LED light (I=50) has changeable and replace the display-unit wheel (I=57) from the housing cutout (I=58)—so can manual to change or replace the whole of the display-unit disc or change the said one of the display-unit (as object of the optics-theory) from plurality of the said display-unit of one the said disc. The display-unit disc which incorporate with top location's optics-lens to allow light-beam to pass through to form the bigger-size image. The LED light (I=50) has USB or AC-Plug-wire wired connector to get power from all kind of USB or AC-outlet device as above discussed. Also, The said LED light (I=50) has bigger-size image output-end (I=55) on top of LED light so the bigger-size image can at least project to the top ceiling or front of outdoor or indoor surface which is never can do by out-of-date Incandescent bulb (very hot heat flow to top and damage the top plastic film, slide, object, display-unit and no any possible can get while color light beam from filaments inside incandescent bulb).

if use current invention simple only one LED direct under of the said one tiny display-unit (Preferred is film or slide which made by Plastic) and pass though only one optics-lens has refractive property with properly tube-assemblies because heat always flow to top so current invention is never can use for out-of-date incandescent bulb at least has 4 Watt or 7 Watt bulb which the heat will melt the film or slid instantly or cause FIRED.

From FIG. 44 show the other preferred embodiment has battery powered, or outside transformer powered which has female-receiving port to let outside transformer's male plug and wire to insert to build the electric delivery.

From FIG. 45 shown very clear for the project-assemblies construction is different with the said project-kits (I=76) (I=76') (I=76"), the project-kits has no built-in light-source as project-assembly has 3-basic-parts LED and display-unit and top refractive-lens. Hereafter, show all preferred project-kits for all kind of different construction or-and features to incorporate with all existing seasonal light device already has light-source(s), such as (1) Simple construction of project-kits (I=76') which may has no LED inside as light source and use the seasonal or other existing light-set's LED as light source so can make the light set (I=70) has number of bigger-size image or light beam to be projected and shown on the remote away area(s), location(s) from the existing seasonal lighting or other any market available light sets (I=70). This is typical for project-kits which do not has its own light source. The said project-assembly has 3 basic-parts including its own light source such as LED or-and Laser light source and display-unit(s) and top project-lens incorporate with wall surrounding tube-assembly or trays or holders to prevent from light-source(s) light-beam leakage out from tube-assembly or trays or holders. or (2) the upgrade project-kits (I=76) which has changeable display-unit(s) (I=78) and can change image while moved the wheel (I=78) so the display-unit (I=78) been changed and image can changed from time to time and the said tube-assembly is assembled from more than one parts (I=76*a*) (I=79*a*) to allow light source (I=72') insert-into and fit the front refractive-lens (now shown) tightly on toppest-location (I=77) of project-kits. or (3) more optics-element(s) of the project-kits (I=76") where inside the more than one piece of the said tube-like assemblies (I=78") (I=76") (I=79") has more than one optics-element(s) to make the better light beam spread from narrow emitting-angle white or multiple colors LED light-beam become all parallel light beams into the display-unit(s) and go through the top refractive-lens to create a big image come out on every points is same brightness with visible see darker or dim or brighter difference while compare the brightness from center to edge, or (4) The angle or further focus adjustable project-kits from FIG. 46 (I=17-1*a*) show the swivel arm (I=17-1*c*) (I=17-1*d*) (I=17-1*e*) (I=17-1*f*) to connect with light kits set and the fix-kit(s) for added on type of project-.

From FIG. 45 show these preferred embodiment of the application for existing all kind of LED light set (I=70) or light string (I=70) already has light-source(s) can has either (A) permanent fixed which built-in by manufacture or (B) Do-it-yourself which is add-on by consumer; so the non-image or non-patterned existing seasonal light string or light-set or patio-light can add the image or patterns for non-art's light beam projection features on these seasonal light-set (I=70) or light string (I=70) or any lighting device from market place which has its own light-source functions and the current invention add the project-kits without the light-source (I=76*a*) (I=76*a'*) (I=76*a"*) so make the original or existing products become more value and increase bigger-size image projection features. However, The project-assembly has all 3 basic-parts including light-source and display-unit and refractive-lens can fit into any preferred housing for all indoor or outdoor seasonal lighting, seasonal garden light, outdoor lighting, outdoor garden light, outdoor patio-light, café-light, light-string which all has the project-assembly as above discussed all FIGS. (before FIG. 45) and those are not the same as FIG. 45 disclosure for project-kits.

Figure 47:
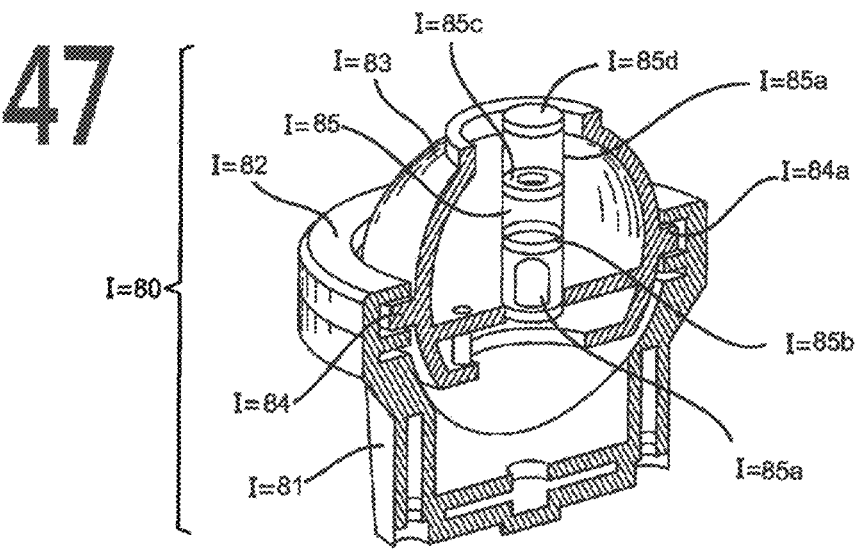
Figure 48:
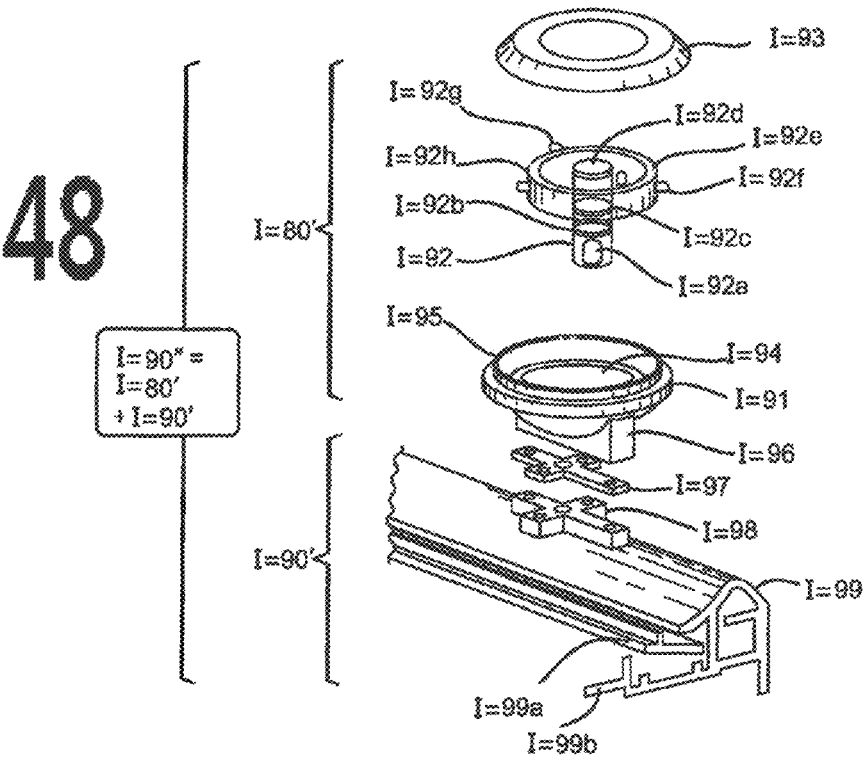

From FIG. 47 and FIG. 48 show basic project light construction and further application for other LED light device such as track-lighting application and all has the basic project-assembly which has 3 basic-parts light source and display-unit and refractive-lens not like FIG. 45 for project-kits.

From FIG. 47 shown the another preferred embodiment has 3 basic parts of project-assembly for LED image projection light (I=80) in different construction has a base (I=81) and base has one groove (I=84*a*) or ditch (I=84*a*) or tunnel (I=84*a*) to allow two arms (I=84) to freely rotating and tilt angle because the top housing (I=83) is round so can tilt along the two arms (I=84) for certain degree. The top housing (I=83) are install on the base housing (I=81) and all circuit and control-kits and electric parts & accessories fit within the space between the top and base. The project-assembly has LED (I=85*a*) install into lower-end of tube-like assemblies (I=85*a*) and light beam passing though the optional 1$^{st}$ optics-lens (I=85*b*) to make the narrow emitting-angle or spot LED light beam to spread out to all parallel light beam to hit the display-unit (I-85*c*) and lighted the colorful tiny-image on the display-unit (I=85*c*) and tiny lighted image of display-unit passing though the top optics-lens (I=85*d*) which has refraction optics-properties and has details, precisely, accurate distance relation with the said display-unit(s) so can project the clear, sharp focus, enough bigger-size image to shown a certain distance such as 3 to 18 feet top ceiling or building or housing to be seen with nice and clear and bright and enough big image to viewer.

This is the typical upgrade model than basic project kits because add one more 1$^{st}$ optics-lens between the display-unit and LED light source. In order to save the cost, the 1$^{st}$ optics-lens is no need to add for some applications discussed on above.

However, (1) The number of optics-lens used for current invention or
(2) what type of optics-lens assembly or
(3) What kind of LED
(4) What kind of Display-unit
(5) What kind of tube-assemblies;

These 5 what specification for 3 basic-parts of the project-assembly need to use or need to apply to the current invention, that is depend on what requirement from market place.

(A) For example, some requirement need super brightness so can see the image under day time indoor, that will need use super brightness or high-power LED or LEDs.

(B) For example, the requirement need super fine image so need use Kodak film or more good TFT screen or excellent Lcos reflective lens assembly to make the high quality of the display-unit so can project good Quality image.

(C) For some requirement need super compact size so need to use shorter tube-like assemblies for more than one tube, tray, holder with wall surrounded, and redesign lens and display-unit distance to get shorter tube—but still project nice image. So any requirement will make the little change for add or reduce or change some parts & accessories, However, as long as has the LED, Display-unit, Optics lens, and the tube-like assemblies, these (3) basic parts and the tube-like assembly to assembled into desired geometric housing to project bigger-size image should fall within the current invention. And more parts such as (a) adjust device so can change project image or (b) more than one of light-beam or other more than one function, or (c) more than one LEDs or-and laser light source(s), or (d) more than one bigger-size image projected out with different or same size(s), or (e) one products has more than one housing (f) has more than one control circuit, and all above discussed embodiment and co-inventor issued or pending filing features, still should be all fall within the current invention scope for Plug-In AC outlet or DC power unit.

From FIG. 48, this is other alternative application for LED track-light device (this is similar with co-inventor's prior art U.S. Pat. Nos. 7,726,839, 7,722,230, 7,726,841, 7,726,869, 8,393,755 for LED track light device) which the said movable LED unit(s) (I=91) (91 of FIG. 9) has the project-kits (I=92*a* to I=92*h*) well install on the movable LED-unit housing (I=91) and has its circuit (I=97) and the electric conductive (I=98) for build electric delivery for LED-unit (I=91) to track-unit (I=99) electrodes (I=99*a* and I=99*b*). The project-assembly—has LED (I=92*a*) connect with the circuit (I=97) to turn on the LED (I=92*a*) and LED light beam emit to the 1$^{st}$ optics-lens (I=92*b*) and display-unit (I=92*c*), then magnified and refracted by top optics lens (I=92*g*) which is on top end of the tube-like (I=92) low-end has LED (I=92*a*) and top end has Optics lens (I=92*g*) so can project the enlarge, clear, sharp focus, colorful image. The said the LED-unit (I=91) can movable along the whole length of the track (I=90). This is typical other application to add the Project- or kits into existing standard LED track light LED-unit so increase LED Track light for home, office, show, shop, chain stores has image or words shown on the floor, ceiling, walls, sign, screen, scene to increase value of the said LED Track light. This is other evidence the current invention for Project-kits can add-on or built-in for any market existing lighting device so can make the said original or existing lighting device upgrade to keep (1) original function+(2) upgrade to has add-on or built-in bigger-image projection light which is made by the compact-size projection-kits as this embodiment and FIG. 39 to FIG. 46 show same drawing of co-pending patent filed case which has same as (#II-2009) (# II-1) (#II-2) text and claims for indoor or outdoor light, seasonal garden light, everyday outdoor light, seasonal light or light sets and this LED track light applications all has the project-assembly with special arrange for LEDs, display-unit, and located on top of housing opening refractive-lens.

Figure 49:
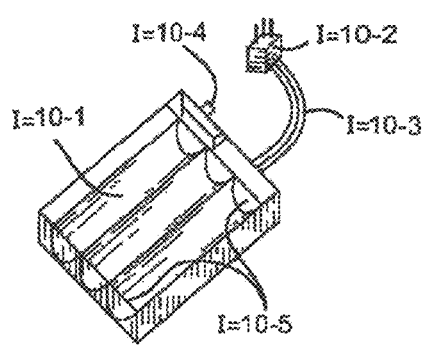
Figure 50:
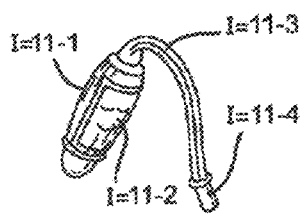

From FIG. 49 to FIG. 54 show the some of different power source such as FIG. 49 is a battery power pack with quickly connector (I=10-2) to export the electric current. The FIG. 50 show the bottom cells (I-11-2) batteries compartments with the pig-tail connector (I=11-4) to supply the power out.

Figure 51:
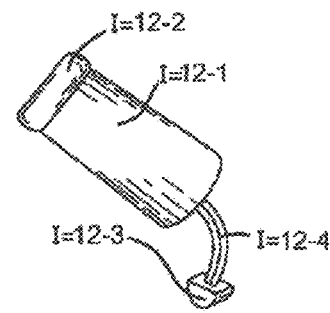
Figure 52:
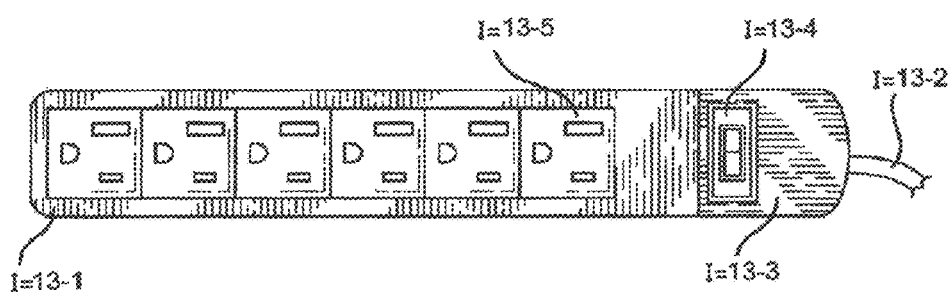

The FIG. 51 show the outlets of the power strips (I=13-3).

Figure 53:
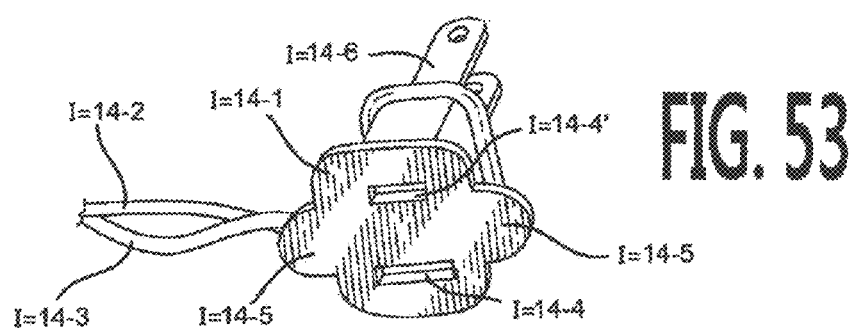

The FIG. 53 shown the AC-Plug-wire which connect with the seasonal lighting for indoor or outdoor variety light including garden light or outdoor light applications or seasonal light-sets to any kind of outlets to delivery power to the said indoor or outdoor light device. The AC-plug wire can be traditional AC-Plug-wire with or without the linkable-receiving-ports (I=14-4) (I=14-4') for linking other male-plugs same as Plug (I-14-6) to next AC-plug wire system. It also can be the AC-to-DC transformer with wire (not shown) which change the AC current into DC current and deliver the power to said indoor or outdoor lighting.

Figure 54:
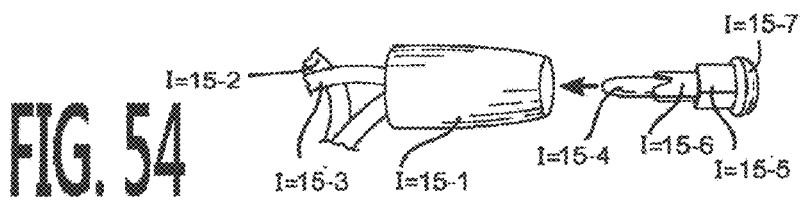

The FIG. 54 show the pig-tale mail connector (I=15-4) and female socket (I=15-1) to make electric connection by the 2 metal conductive piece (I=15-6) so can supply the power from light sets to the male connect's loaded products or project-assembly or project-kits for illumination.

Figure 55:
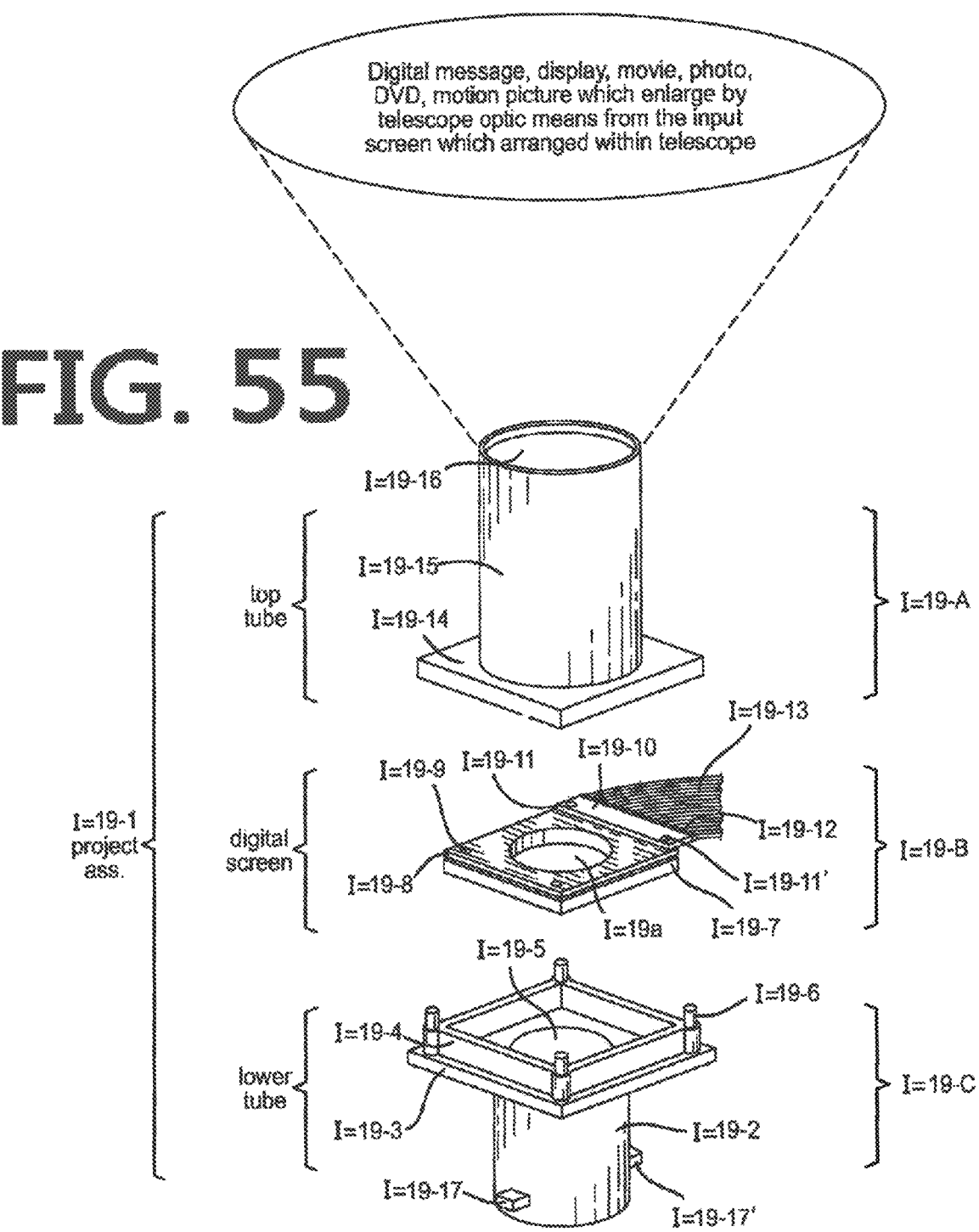

From FIG. 55 shown LED or-and laser project indoor or outdoor light project the image has changeable, moving, motion, movie, video functions from the update digital data screen or display of LCD, TFT, Screen of Digital data displayer, wireless transmitting device and its displayer From FIG. 55 shown the details construction to project the bigger-size image such as changeable time image which is always changeable, moving, motion at any time. The said time image mainly has 2 types (1) one is analog dial face or (2) digital number such as (88:88) both need to project from the screen, or displayer for these seconds changing digital-data. The digital-data may come from different source such as (1) Camera (2) Video Camera (3) Communication equipment such as smart phones camera (4) Internet or wireless transmitting to get image (5) IC has digital-data (6) Wireless download (7) Computer related equipment (8) Communication equipment (9) Consumer electric equipment;

which may has below arrangements;

(A) directly connect with display/screen system or (B) storage into digital data storage device(s) or (C) input from Memory storage unit(s) incorporate with optic-lens assembly to shown the display/screen unit(s) which including (I) LCD display (II) TFT displayer (III) Lcos display depend on the detail pixel/particles density, cost, image quality, color finesse to make proper combination.

From FIG. 55 show the project-assembly which has 3 basic-parts including its own light source and display-unit and refractive-lens not like the project-kits which do not has own light source, and incorporate with tube-assemblies has the multiple section of the tube-like assemblies (I=19-1) including lower-tubes (I=19-2) p-tube (I=19-15) or-and center display-unit holder (I=19-7) or-and holders (I=19-12) or tray (I=19-4) which lower-tube (I=19-2) has lower-end for light-source insert-into so the LED or-and Laser light beam to emit into, the top end is a substrate or base (I=19-3) has walls or fence (I=19-4) to hold and allow well install the displayer or screen (I=19-7) within the walls (I=19-4) so no deviation, or movement happened for the said displayer or screen of the said digital-data will present within. The said wall or fence (I=19-4) which also for join-function tightly with the top tray (I=19-7) so the light-beam will not leakage from light-source to the top display-unit. The said Digital-data displayer or screen may variety choice for colorful, finesse, pixel, particle density. However, the current invention preferred to use the simple and low-cost LCD display has to time displayer for application. The time shown on LCD displayer or screen (I=19-$a$) has plurality of the signal wires (I=19-13) to deliver the digital-data into displayer (I=19$a$) so can show the changeable, moving, update changeable digital-data including second, minutes, hours, date, weather, temperature, humility or other combination as market required. The changeable, moving, update changeable digital-data shown on the screen or displayer (I=19$a$) and then, the lower white LED light beam hit the digital-data displayer or screen (I=19$a$), so the changeable digital-data image will be lighted and go through the top section of tube-like top-tube (I=19-15) and pass tough the above the top of the top-tube (I=19-16) optics-lens (I=19-17) and magnify or refracted to become bigger-size image to project out from image output-end where is located on above the top tube-like top-tube (I=19-16). The key points for Lower tube-like lower-tube (I=19-2) its square base (I=19-3) and top tube-like top-tube (I=19-15) its square substrate or base (I=19-14) both has to be very tightly get together to prevent from any LED light beam be leakage. Also, the image of the said displayer or Screen (I=19-7) has to on right position (I=19$a$) so all the LED light beam will hit very accurate and precisely to show all image of displayer or screen (I=19-7). Even, the tube-like has 3 sections (I=19-A) (I=19-B) (I=19-C) but all the light beam traveling to passing the display-unit (screen or displayer), optic-lens, the light beam always is perpendicular or vertical with the LED light beam so can get best bigger-image with low-cost, no deviation for image ratio which happen always for the image parallel to the LED light beam.

Furthermore, the said the LED (not shown) may need have some optics-lens or lens assembly between the (LED and displayer) so make the all LED light beam is very evenly emit on the anywhere of the area of the said displayer or screen so digital-data can clear and no any darker or brighter area show out.

Also the LED light beam has to match the screen or displayer properties so the image shown out will not be strange color, brightness.

While use the high power LED which up from 1 Watt to N-Watt which also need consider the heat issues with preferred heat-sink or ventilation.

From FIG. 56 to FIG. 59 show LED project light has slide changeable, adjust image position, angle, orientation, plurality of slide disc for Plug-In AC outlet or DC power or interchangeable power source From FIGS. 56 to 59 and FIGS. 60 to 64 show all features discussed on above for LED or-and laser project light has slide or grating-piece or film changeable, adjust image position, angle, orientation, plurality of slide or grating-piece or optics-lens fit-into disc for (1) Plug-In (AC powered) or (2) DC power or (3) interchangeable power source, More details can see co-inventor's (# FF-4) U.S. application Ser. No. 14/968,862, Filed on Dec. 14, 2015 which is Continue in Part of
(# FF-3) U.S. application Ser. No. 14/539,267, Filed on Nov. 12, 2014 which is Continue in Part of
(# FF-2) U.S. application Ser. No. 14/275,184, Filed on May 12, 2014 which is CIP for filing of
(#FF-1) U.S. application Ser. No. 12/914,584 filed on Oct. 28, 2010 now is U.S. Pat. No. 8,721,160 which is CIP for filing of
(#FF-2008) U.S. application Ser. No. 12/318,470 filed on Dec. 30, 2008 now abandoned, which is Division for filing of which is Division for filing of
(#Q-2007) U.S. Application Ser. No. 11/806,284 Filed on Dec. 15, 2007 now is U.S. Pat. No. 7,630,004

From Fig S=all features discussed on above for LED project light has (1) Plug-In by prong, or by AC-plug-wire, or by AC-connector-wire, or other; or-and (2) DC power; or-and (3) interchangeable power source.

Figure 65:
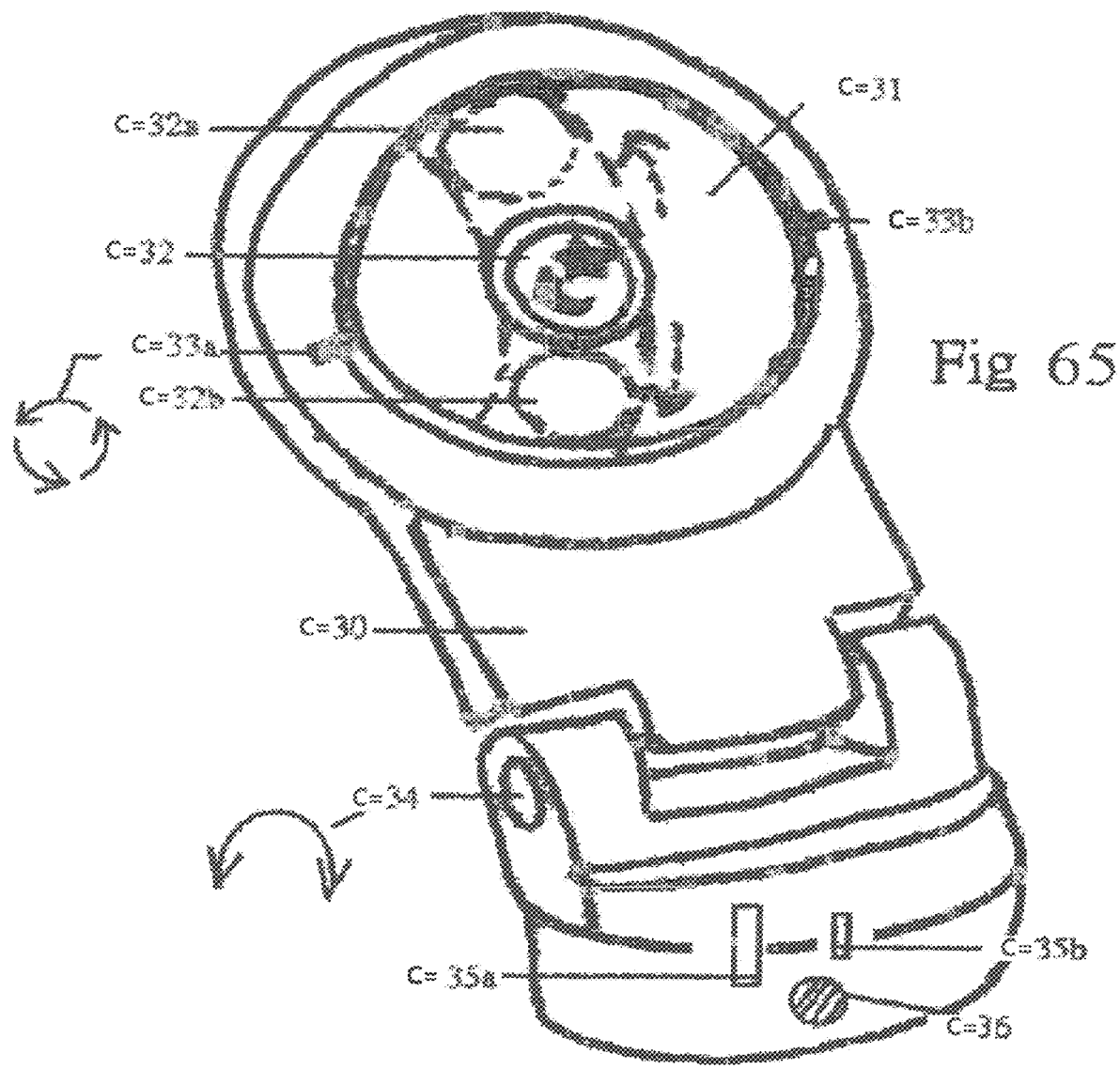

From FIG. 65 show disclosure the plug-in AC outlet night time use light by prong or AC-plug-wire LED light (C=30) has movable project-assembly from location (C=32) can move to top location (C=32$a$) or lower position (C=32$b$), This is similar with the other co-inventor's patent filed case as above listed. The difference is the LED light, total has three major parts (C=33$a$) (C=34) can make the movable, rotate, bend to change the bigger-image (not shown) location, position, orientation so can make the bigger-image shown to anywhere as requirement. The three major parts including (a) project-kits (C=32) which has tiny-image within the tube can movable along arc-cutout.
(b) Ball Housing (C=31) can rotate by 2 ears pole (33$a$) (33$b$)
(c) Ball holder (C=30) can bend by revit (34)

It is appreciated all kind of skill, method, construction, combination to make the housing parts, project-kits to make move, rotate, bend, twist, transforming to make the Bigger-image or light beam to present to far-away distanced locations, positions, orientations still fall within the current invention scope for LED light has projection features.

Figure 66:
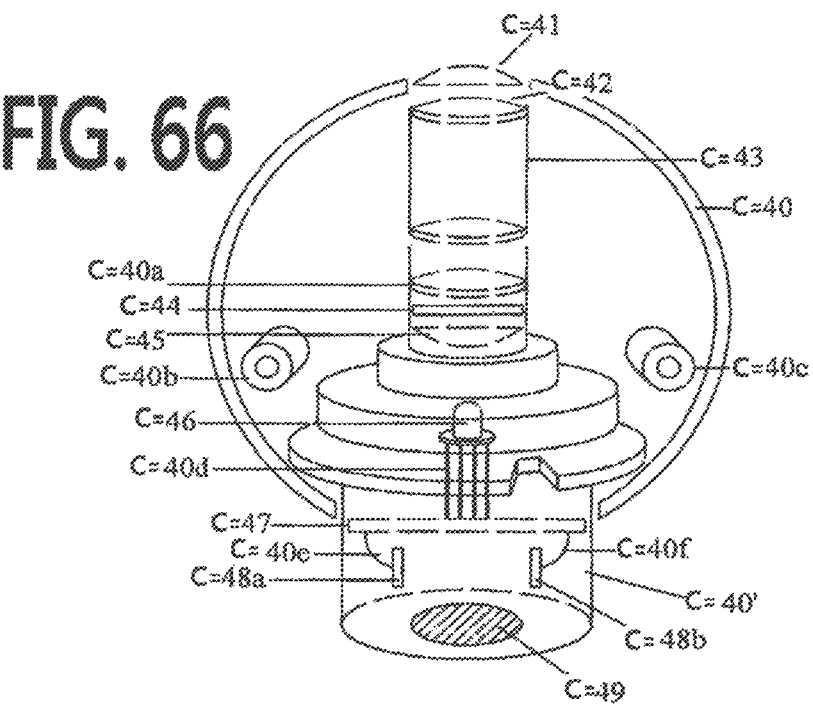

From FIG. 66 show the other embodiment which also belong to basic model

LED light has prong or alternative AC-plug-wire (C=48$a$) (C=48$a'$) to allow directly plug-in AC outlets including wall outlets or power strip's outlets or any other outlets which delivery the AC current should be fall within the current definition for outlets. The prong (C=48$a$)(C=48$a'$) connect with AC power source and connect with the LED light circuit (C=47) by conductive wire (C=40$e$) (C=40$f$) to deliver the power to circuit (C=47) and circuit (C=47) has its electric parts & accessories to make pre-determined control, sensor, motion sensor, blue-tooth, wifi, wireless functions as market required. The circuit also connect with one LED (C=46) which is insert-into en the one end of the lower-tube assemblies (C=40$a$) and LED light beam emit into the lower-tube (C=40$a$) to make the inner display-unit (C=44) tiny-image been lighted and the lighted tiny-image been passing though the top optics-lens (C=41) which located above top-of-the top-tube for the opening-of-housing to make the tiny-image be magnify or refracted to bigger-size image or light beam (While the Slide or Film has no tiny-image on it, It will be just a light beam to passing though and become a bigger-Light beam instead of Bigger-size image).

The said optional choice of the said $2^{nd}$ Optics-lens (C=45) which fit into the lower-tube main purpose is work to make the narrow emit-angle and spot-light (Light center is super bright and area is darker) to become the same brightness and parallel emitting forwarder/surface light beam. This the $2^{nd}$ optics-lens can make the narrow spot light beam to become a lot of light beam each are parallel to each other and also from narrow viewing angle to wider Area or wider surface light source).

The LED has other parts can incorporate including (1) Ball Housing to load the project-kits and related parts (2) Base to has conductive-metal-piece without wire include prong or AC-plug-wire (3) Ball housing in a 2 half-ball or sphere-balls construction so can easily install all parts as FIG. 66. Then, use screw or other fasten or holder mean to make a full ball.

Figure 67:
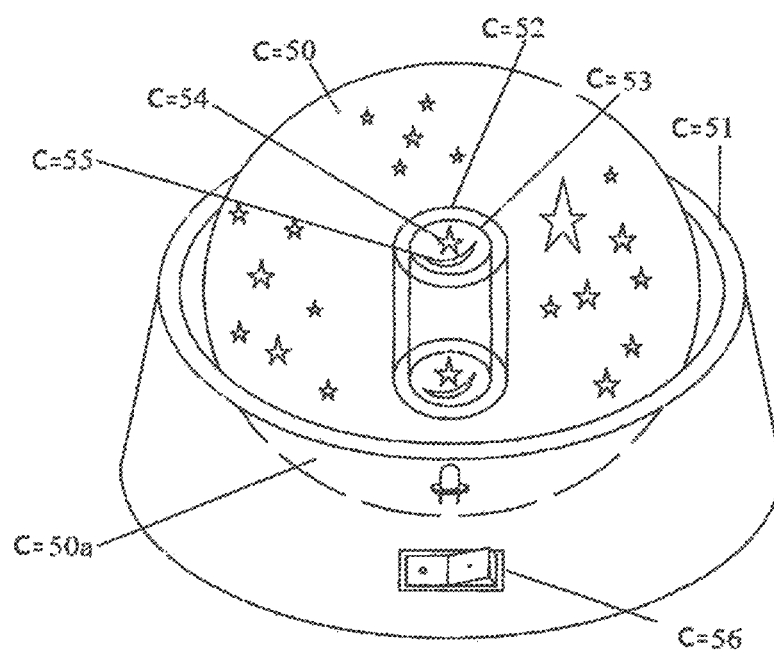

From FIG. 67 show the similar of FIG. 66 show the project-assembly (C=52) not project-kits is install on the center of a sphere (C=50) or ball (C=50) or half-ball (C=50) substrate or cover to project bigger-size image to be seen. Not only the LED has the Bigger-image projection features (C=52) but also has the $2^{nd}$ light function on sphere cover or ball cover or half-ball cover which may selected by night time use light, tap light, pin-holes imaging tap light, Pin-Hole image switch light which has built-in other LED (not shown) to make the said Sphere, ball, half-ball (1) to lighted and Glow or (2) the inner LED light beams passing through a lot of pin-holes, opening, shaped holes to emit the shaped bigger-image to the all surround walls+ceiling. The device is preferred to install on the desk beside the kids bed. The more than one function LED light (project light or-and night time use light or pin-hole night time use light) made by non-textile or wooden or garments and not for people to hold it to prevent kids allergy for the textile, garment, wooden, weaving material which too easily to accumulate the dust, ash, bugs . . . . So the current invention for more than one function LED night is very practically and has manual switch to allow people (1) Directly to turn on and turn off (directly=People touched the switch directly)
(2) In directly to push or touch the top sphere or ball or half-ball cover to turn on an turn off (The indirectly=People do really to touch the switch (C=56) but touch/push other housing parts to make the switch to activated)
(3) Remote control or wireless control or wife or blue-tooth or remote control or motion sensor
(4) Incorporate with Integrated IC and timer or time-delay to make the light can turn on and turn off and automatically countdown a period of time to turn off.
   All switch (C=56) (56) and control can be any market available type and these are common so do not discuss here for more details.

From FIGS. 68, 68A, 68B show all features discussed on above for LED or-and laser project light has slide changeable, plurality of slide or film or grating-piece or optics-lens fit-into disc for AC-plug-In or DC power or interchangeable power source. It teach the detail alternative basic tube-like assembly has accurate position to install the said display-units/Slide/Film. And $1^{st}$ optics lens between the LED light source and display-unit for better image quality, and $2^{nd}$ optics lens on other end of the tube-like assembly to magnify by refraction theory so can created the good size image shown on far-away surface or areas. The LED (not shown) but is located right under the display-units but it will not any harm because LED has no sufficient heat to damage the said display-unit. For more details discussion, Please refer to co-inventor's
(# FF-4) U.S. application Ser. No. 14/968,862, Filed on Dec. 14, 2015 (Still Pending) which is Continue in Part of
(# FF-3) U.S. application Ser. No. 14/539,267, Filed on Nov. 12, 2014 (Still Pending) which is Continue in Part of
(# FF-2) U.S. application Ser. No. 14/275,184, Filed on May 12, 2014 (Still Pending) which is Continue in Part of
(#FF-1) U.S. application Ser. No. 12/914,584, Filed on Oct. 28, 2010, Publication data 2011-008-5323 public-date Apr. 14, 2011, Now is U.S. Pat. No. 8,721,160 issued date May 13, 2014 v.s. Current parent filed on Ser. No. 12/866,832, Filed on Sep. 21, 2010-which is Continue in Part of
(#FF-2008) U.S. application Ser. No. 12/318,470 filed on Dec. 30, 2008 now abandoned Numerous additional modifications of the invention may occur to those skilled in the art, including modifications that utilize concept disclosed in the above-cited applications and patents of the inventor. All such modifications are intended to fall within the scope of the present invention.

From above 36 pages drawings, Hereof show the major parts and brief features in order to check each current invention claim coverage with clear FIGS show below with brief explanation for features without missing from above description as below:

(1) Non-leakage light-beam assembly: show on FIGS. 3, 4, 6, 7, 7-2, 10, 10A, 10C, 11, 12, 26, 47, 48, 55, 66 especially FIG. 55 has tray, holder, and other FIGS. Tube, tubes, housing parts those all has wall to prevent light-beam leakage out while traveling.
(2) AC plug wire: Show on FIGS. 39, 53, FIG. 64 to connect with outlet of extension cord for indoor or outdoor LED project light application.
(3) DC Plug wire: Show on FIGS. 39, 43, 49, 50, 51, 54 connect with DC power source.
(4) Project Lens install on "Opening of LED light highest housing part" or "Above the inner (non-leakage light-beam assembly) TOP": Show on FIGS. 3, 25, 26, 57, 59, 62, 63 show very clear (3c)(25-3e)(26-4h) (F4e) (F5e) (II4e)(II-5e) is on top opening or Above Top of Inner assembly.
(5) Battery Powered: Show on FIGS. 3, 11, 12, 22c, 22D, 22E, 22F, 44,
(6) Interchangeable Power source: Show on FIGS. 56, 59,
(7) Rotating disc or holder for plurality of Slide, display-unit, project-lens: Show on FIGS. 3, 8, 9, 56, 58, 60, 61, 68, 68B to change or rotating to make image changed or moving effects.
(8) wireless or changeable or LDC Digital data: Shown on FIG. 4, 55 to project wireless or changeable time, movie, internet, You-Tube movie or show or films.
(9) Adjustable Focus: Show on FIGS. 10,10A, 10B, 10C, 10D, 11, 12 to make focus adjustable along the quickly trace or track which similar enlarge thread-groove.
(10) Replaceable Project-set or non-leakage light-beam assembly: Shown on FIGS. 16, 17, 18, 19 movable or detachable assembly from one location to others.
(11) Sensor, motions sensor, wireless controller, switch: Shown on FIGS. 3-2, 20, 21, 27-38 to make change, adjust, select, operate LED light source or other electric-parts for the functions, brightness, color, focus for desired peformance.
(12) $2^{nd}$ LEDs or Other light source: Shown on FIGS. 2, 2-1, 2-2, 2-3, 3, 3-1, 3-2, 5, 5-1, 7, 7-1, 7-2, 20, 21, 27-38 to offer not only projection light but also other functions including night time use light, nightlight, power fail light, motion sensor light, accent light, color change light or any LED functions other light effects.
(13) More than One projection light: Shown on FIGS. 16-19, 24, 27 to 38 to shown the projection or-and just touch light for more than one location or areas.

(14) Application for Seasonal, holiday indoor or outdoor or garden light by AC Plug wire plug-in Extension cord outlet or other connector-sets: Show on FIGS. 39, 40, 41, 42, 45, 46, 49, 50, 51, 52, 53, 54
(15) Project LED light install on the Track: Shown on FIG. 48 to easily fit into all kind of track-light device without purchase other track and its system.
(16) Angle adjustable: Shown on FIGS. 2, 2-2, 4, 5-1, 6, 8, 10-15, 21, 24, 25, 23-38 to make desired areas, location. Position has present the projection or-and torch light for image viewing or-and illuminations,

The invention claimed is:

1. An LED projection light, comprising:
at least one LED light source;
at least one display-unit including at least one film, slide, digital-data device, display element compartment, or changeable display element installed within a light-leakage preventing assembly formed by at least one tube, tray, holder, or housing; and
a projection lens positioned above or at a top end of the light-leakage preventing assembly, the projection lens enlarging and projecting an image or light pattern formed by the at least one display-unit for projection onto a ceiling, wall, building, garage-door, fence, or surface located approximately three to 100 feet away from the LED projection light,
wherein the light-leakage preventing assembly has two sections, including a lower section for the LED and a top section, the projection lens being installed in one of (A) an opening at the top of the light-leakage preventing assembly, and (B) above a top end of the light-leakage preventing assembly so the light-leakage preventing assembly does not limit a size of the enlarged and projected image or light pattern,
wherein the enlarged and projected image or light pattern includes at least one of a (1) time, (2) date, (3) weather, temperature, or humidity, (4) motion picture, (5) photo, (6) digital data, (7) cartoon, (8) digital memory data, (9) digital file storage data, (10) image on the display-unit, and (11) light-pattern, the enlarged and projected image having a predetermined color, brightness, size, intensity, clarity, or resolution,
wherein the LED projection light is adapted to enable changing a position or orientation of the enlarged and projected image or light pattern by touching, moving, or pushing on the light-leakage preventing assembly or another housing part of the LED projection light,
wherein the LED projection light is an AC powered light that is plugged into an AC outlet by prongs or an AC cord and plug for indoor or outdoor application.

2. An LED projection light, comprising:
at least one LED light source; and
at least one display-unit including at least one film, slide, digital-data device, or changeable display installed within a light-leakage preventing assembly formed by at least one tube, tray, holder, or housing; and
wherein the light-leakage preventing assembly has two sections, including a lower section for the LED and a top section that forms an enlarged and projected image or light pattern,
wherein the enlarged and projected image or light pattern includes at least one of a (1) time, (2) date, (3) weather, temperature, or humidity, (4) motion picture, (5) photo, (6) digital data, (7) cartoon, (8) digital memory data, (9) digital file storage data, (10) image on the display-unit, and (11) light-pattern, the enlarged and projected image having a predetermined color, brightness, size, intensity, clarity, or resolution,
wherein the LED projection light is powered by an AC or DC power source and includes AC-DC or DC-DC circuitry for supplying a DC current to the at least one LED light source to enable the LED projection light to serve as at least one of the following types of lighting device:
a: desk top light:
b: garden light:
c: emergency light;
d: safety light;
e: anti-theft light:
f: entrance light, stair light, evacuation light,
g: underwater light; street light; reading light;
h: night light, light fixture: motion sensor light;
i: power failure light: photo sensor light:
j: dimmable light; spotlight; seasonal light;
k: Christmas light; Christmas ornament light;
l: licensee product light; cartoon character related
m: promotion light; commercial light; sign;
n: motion sensor light; blue tooth light; moving device
o: car light; vehicle; boat light; aircraft light; or
p: multi-purpose LED flashlight.

3. The LED projection light as claimed in claim 1, wherein the light-leakage prevention assembly is a multiple piece assembly.

4. The LED projection light as claimed in claim 1, wherein a size of the enlarged and projected image or light pattern is determined by a relative position of the display-unit and the projection lens.

5. The LED projection light as claimed in claim 1, wherein the display-unit includes compartments, slides, or films installed within a disc that is movable to cause respective ones of the compartments, slides, or films to move into a path of light beams emitted by the LED light device and thereby form an image or light pattern to be enlarged and projected by the projection lens.

6. The LED projection light as claimed in claim 1, wherein the display-unit has a texture, silkscreen, printing, painting, sticker, film, pin-holes, or a finish that causes light beams from the LED light source to form colorful light-patterns, glow-effects, lighted character images, art designs, geometric shapes, words, messages, or twinkling stars in three-dimensional space.

7. The LED projection light as claimed in claim 1, wherein the LED projection light has projection angle that is manually adjustable or adjustable by a motor that causing a part of the LED projection light to move, rotate, spin, tilt, bend or swing.

8. The LED projection light as claimed in claim 1, wherein the LED projection light has an adjustable focus.

9. The LED projection light as claimed in claim 1, wherein the LED projection light includes multiple projection assemblies whose relative positions or orientations is adjustable.

10. The LED projection light as claimed in claim 1, wherein the LED projection light includes multiple projection assemblies in a single housing.

11. The LED projection light as claimed in claim 1, wherein the LED projection light has more than one housing part and each housing part has at least one projection assembly to provide multiple projection assemblies.

12. The LED projection light as claimed in claim 1, wherein the LED projection light has a plurality of pre-wired compartments to interchangeably install real projection assemblies and dummy projection assemblies to vary a number and types of images or light patterns that are projected.

13. The LED projection light as claimed in claim 1, wherein the LED projection light is adapted to use interchangeable AC and DC power sources.

14. The LED projection light as claimed in claim 1, wherein the AC power source is one of a wall outlet, power strip outlet, or seasonal light-set plug's outlet.

15. The LED projection light as claimed in claim 1, wherein the LED projection light is adapted to be installed in a track light fixture.

16. The LED projection light as claimed in claim 1, further comprising an optics-lens positioned in front of the LED light source to cause light beams emitted by the LED light source to cover an entire area of the display-unit without causing dark and bright areas resulting from incomplete coverage to appear in the enlarged and projected image or light pattern.

17. The LED projection light as claimed in claim 1, the display unit includes a manual or automatic display changing assembly including at least one of a moving device, motor and gear set assembly, animation device, and electric parts and accessories for changing the display unit.

18. The LED projection light as claimed in claim 1, wherein the display unit includes a digital memory storage device, memory card, SD card, or memory stick that enables the enlarged and projected image or light pattern to be changed or updated.

19. The LED projection light as claimed in claim 1, wherein the display unit includes one of an LCD, TFT, or other digital display device.

20. The LED projection light as claimed in claimed in claim 1, wherein the display unit includes a digital data device supplied with digital data that controls the image or light pattern to be enlarged and projected by the projection lens.

21. The LED projection light as claimed in claim 20, wherein the digital data is provided by one of a digital camera, video camera, digital video, computer equipment, communications equipment, an MP4 device, and a cellular phone.

22. The LED projection light as claimed in claim 20, wherein the digital data is wireless digital data selected from changeable update data, a message, information, a drawing, a photo, an illustration, an image, a motion picture, moving data, computer system data, and data transmitted by a cellular phone though Wifi, the Internet, cellular wireless, Bluetooth, or infrared data transmission.

23. The LED projection light as claimed in claim 1, wherein the LED projection light further comprising an adjustment assembly for changing a location, orientation, focus, clarity, distance, and/or colors of the enlarged and projected image.

24. The LED projection light as claimed in claim 1, wherein the digital data is displayed on a TFT or LCD or Leos or other display an assembly to show the digital data(s).

25. The LED projection light as claimed in claim 1, the projection light has at least one slot for receiving a digital memory card, digital memory stick, or memory storage device.

26. The LED projection light as claimed in claim 1, wherein the LED light source includes at least one white color LED whose beams form a colorful image or light pattern upon passing through the display unit.

27. The LED projection light as claimed in claim 1, wherein the LED projection light further includes at least one of the following:
 a. an assembly for changing a position of the enlarge and projected image or light pattern along x, y, or z coordinate axes;
 b. an assembly for fixedly mounting the LED projection light mount on a wall, ceiling, ground, or floor;
 c. additional projection-kits for increasing a number of enlarged and projected images or patterns in three-dimensional space;
 d. an assembly for rotating a housing or housing parts of the LED projection light;
 e. an assembly for tilting a housing or housing parts of the LED projection light;
 f. an assembly for adjusting a distance between the projection lens and the display-unit to change a focus of the LED projection light;
 g. an assembly for changing or replacing the display-unit or a disc in which the display-unit's is installed;
 h. an assembly for moving or changing a digital image on an LCD or TFT of the LED projection light;
 i. a digital memory or data storage assembly for storing a plurality of images;
 j. an assembly for projecting multiple images or lighted-patterns from a single said LED projection light;
 k. a tubular assembly for installing the display-unit;
 l. at least one of an LCD display, TFT display, film, slide, paper, transparent material, translucent material, photo display and disc pack included in the display-unit;
 m. a wireless data display unit for displaying data received over a wireless data connection,
 n. a small size TFT included in the display-unit and having a size of 1, 1.5, 1.8, or 2.4 or smaller inches and a high resolution to provide a clear image when magnified by projection, and
 o. an OEL or OLED display screen included in the display-unit.

28. The LED projection light as claimed in claim 2, wherein the LED projection light is a night light having a top cover, and the top cover is one of (a) a sphere, (b) a ball, (c) a half- ball shape, or (d) a dome-like shape with different curves or arcs extending over 180 degrees, the top cover having (a1) pin-hole size openings, (b1) holes, (c1) a textured lens or lens with different thicknesses, (d) shaped cut-outs, or (e) windows through which light beams from the LED light source pass to form an enlarged and projected image or light pattern on a ceiling, walls, and/or outdoor surfaces at locations higher than and surrounding the LED projection light.

29. The LED projection light as claimed in claim 2, wherein the second function kit is a (1) safely light, or (b) a motion sensor light, or (c) emergency light, or (d) anti-burglar light, or (e) entrance light, or (f) stair light, or (g) evacuation light, or (h) power tail flashlight, or (i) flashlight.

30. The LED projection light as claimed in claim 2, further comprising a second LED light source that serves to provide a backlight, accent light, or glow light effect on a predetermined part of a housing of the LED projection light.

31. The LED projection light as claimed in claim 2, further comprising at least one housing part arranged to be manually or automatically rotated, tilted, or moved to change a position or orientation of the enlarged and projected image or light pattern.

32. The LED projection light as claimed in claim 2, wherein the LED projection light is a DC powered light arranged to be installed on one of a desk top, wall, or ceiling.

33. The LED projection light as claimed in claim 2, wherein LED projection light is a DC powered light having a light source assembly supported by extendable or flexible connection-arms, rods, or jointed-parts.

34. The LED projection light as claimed in claim 2, wherein the LED projection light is a DC powered connected to the DC power source by a conductor, wire, quick connector, pig-tail, USB wires, or a USB connector.

35. An LED projection light having more than one function, comprising:
- an LED light source arranged to supply a majority of light beams to a light-leakage preventing housing, an image or light pattern forming display-unit installed in the housing, and a projection lens installed at a top of or above the housing for enlarging and projecting the image or light pattern; and
- a AC or DC power source incorporated with a switch, sensor, control circuit, integrated circuit, or timer for causing the I .ED light source to turn on and off according to predetermined functions and thereby supply said light beams to the light leakage prevention housing for passage through the display-unit and projection by the projection lens to a remote surface,
- wherein the LED projection light is one of a desk top light, floor light, garden light, emergency light, safety light, anti-burglar light, underwater light, street light, reading light, night light, light fixture, motion sensor light, power fail light, photo sensing light, dimmable light, spotlight, seasonal light, Christmas light or ornament, cartoon character light, promotion light, commercial light, sign, motion sensor light, Bluetooth light, car light, vehicle light, boat light, and aircraft light, and
- wherein the AC or DC power source is selected from (a) a 120 Volt AC outlet and plug or prongs, (b) a battery, (c) an adaptor, (d) a USB power source, (e) an outside separate transformer, and (f) a generator, solar cell, wind power, or chemical power source.

36. An LED projection light including;
- a white LED light source, an image or light pattern forming display-unit, and a projection lens installed at a top of or above a housing for enlarging and projecting the image or light pattern, the display-unit being installed within the housing; and
- an AC power source supplied with AC power through prongs and/or AC wires, or a DC power source installed in a compartment of the LED projection light,
- wherein the AC power source or DC power source are incorporated with a switch, sensor, control circuit, integrated circuit, or timer for causing the LED light source to turn on and off according to predetermined functions and thereby supply said light beams to the light leakage prevention housing for passage through the display-unit and projection by the projection lens to a remote surface.

* * * * *